(12) United States Patent
Mochizuki et al.

(10) Patent No.: US 11,324,001 B2
(45) Date of Patent: May 3, 2022

(54) MOBILE COMMUNICATION SYSTEM, SOURCE BASE STATION, TARGET BASE STATION AND USER EQUIPMENT

(71) Applicant: Mitsubishi Electric Corporation, Tokyo (JP)

(72) Inventors: Mitsuru Mochizuki, Tokyo (JP); Miho Maeda, Tokyo (JP); Shinsuke Uga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/597,621

(22) Filed: Oct. 9, 2019

(65) Prior Publication Data
US 2020/0112958 A1 Apr. 9, 2020

Related U.S. Application Data

(63) Continuation of application No. 15/628,976, filed on Jun. 21, 2017, now Pat. No. 10,512,085, which is a (Continued)

(30) Foreign Application Priority Data

Aug. 2, 2012 (JP) .................................. 2012-171871

(51) Int. Cl.
*H04W 72/04* (2009.01)
*H04W 72/12* (2009.01)
(Continued)

(52) U.S. Cl.
CPC ........... *H04W 72/0453* (2013.01); *H04L 5/00* (2013.01); *H04L 5/001* (2013.01);
(Continued)

(58) Field of Classification Search
CPC ......... H04W 72/0453; H04W 72/1226; H04W 72/1263; H04W 16/14; H04W 36/06;
(Continued)

(56) References Cited

U.S. PATENT DOCUMENTS 8,427,976 B1* 4/2013 Dinan .................... H04W 36/06
370/252
8,588,185 B2 11/2013 Jung et al.
(Continued)

FOREIGN PATENT DOCUMENTS

CN 102415205 A 4/2012
EP 2 306 769 A1 4/2011
(Continued)

OTHER PUBLICATIONS

Office Action issued in European Application No. 13 825 742.3 dated Mar. 12, 2020 (6 pages).
(Continued)

*Primary Examiner* — Mong-Thuy T Tran
(74) *Attorney, Agent, or Firm* — Oblon, McClelland, Maier & Neustadt, L.L.P.

(57) ABSTRACT

Provided is a communication system that can be normally and efficiently operated in the case where existing carriers and new carrier types coexist. A base station device and a communication terminal device are configured to perform communication in cells of legacy carriers LC1 to LC3 being existing carriers. When the base station device starts operating new carrier types NCT1 and NCT2, the NCT1 and NCT2 are associated with legacy carriers belonging to the same frequency band. For example, the NCT2 is associated with the LC2 or the LC3 and is not associated with the LC1. The legacy carriers LC1 to LC3 associated with the NCT1 and the NCT2 notify the communication terminal device of the information on the NCT1 and NCT2. This allows the
(Continued)

communication terminal device to communicate with the NCT1 and the NCT2.

9 Claims, 32 Drawing Sheets

Related U.S. Application Data continuation of application No. 14/419,139, filed as application No. PCT/JP2013/070983 on Aug. 2, 2013, now Pat. No. 9,713,148.

(51) Int. Cl.
| | |
|---|---|
| H04L 5/00 | (2006.01) |
| H04L 1/18 | (2006.01) |
| H04W 48/08 | (2009.01) |
| H04W 16/14 | (2009.01) |
| H04W 36/06 | (2009.01) |
| H04W 88/08 | (2009.01) |

(52) U.S. Cl.
CPC ... *H04W 72/1226* (2013.01); *H04W 72/1263* (2013.01); *H04L 1/1812* (2013.01); *H04L 5/0048* (2013.01); *H04L 5/0053* (2013.01); *H04L 5/0098* (2013.01); *H04W 16/14* (2013.01); *H04W 36/06* (2013.01); *H04W 48/08* (2013.01); *H04W 88/08* (2013.01)

(58) Field of Classification Search
CPC ........ H04W 48/08; H04W 88/08; H04L 5/00; H04L 5/001; H04L 5/0048; H04L 5/0053; H04L 5/0098; H04L 1/1817
USPC ..................................................... 455/452.1
See application file for complete search history.

(56) References Cited

U.S. PATENT DOCUMENTS

| | | | |
|---|---|---|---|
| 8,676,201 B2* | 3/2014 | Kazmi .............. | H04W 36/0077 455/436 |
| 8,792,381 B2 | 7/2014 | Wei | |
| 9,131,491 B2 | 9/2015 | Lee | |
| 9,185,728 B2 | 11/2015 | Moon | |
| 9,271,278 B2 | 2/2016 | Heo | |
| 9,350,501 B2 | 5/2016 | Maeda et al. | |
| 9,629,028 B2 | 4/2017 | Meylan | |
| 2005/0130662 A1 | 6/2005 | Murai | |
| 2009/0239537 A1 | 9/2009 | Iwamura | |
| 2010/0173637 A1 | 7/2010 | Damnjanovic | |
| 2011/0250891 A1 | 10/2011 | Zou | |
| 2011/0292911 A1* | 12/2011 | Uemura ............ | H04W 36/0072 370/331 |
| 2011/0317742 A1 | 12/2011 | Kawakatsu | |
| 2012/0002843 A1 | 1/2012 | Chung | |
| 2012/0021753 A1* | 1/2012 | Damnjanovic ... | H04W 72/1289 455/450 |
| 2012/0044910 A1 | 2/2012 | Maeda et al. | |
| 2012/0087257 A1 | 4/2012 | Larsson | |
| 2012/0093128 A1* | 4/2012 | Song .................... | H04W 36/14 370/331 |
| 2012/0099466 A1 | 4/2012 | Aoyama et al. | |
| 2012/0142354 A1 | 6/2012 | Ahluwalia | |
| 2012/0165034 A1 | 6/2012 | Boudreau | |
| 2012/0176958 A1* | 7/2012 | Queseth ............ | H04B 7/15542 370/315 |
| 2012/0287886 A1 | 11/2012 | Fukuoka | |
| 2012/0294694 A1 | 11/2012 | Garot | |
| 2013/0003673 A1 | 1/2013 | Dinan | |
| 2013/0003872 A1 | 1/2013 | Dinan | |
| 2013/0083753 A1* | 4/2013 | Lee ...................... | H04L 1/0026 370/329 |
| 2013/0100931 A1* | 4/2013 | Kim .................. | H04W 36/0027 370/331 |
| 2013/0163538 A1 | 6/2013 | Kuo | |
| 2013/0176952 A1 | 7/2013 | Shin | |
| 2013/0229953 A1 | 9/2013 | Nam | |
| 2013/0242729 A1 | 9/2013 | Chen | |
| 2013/0250882 A1* | 9/2013 | Dinan ................... | H04L 5/0032 370/329 |
| 2013/0029431 A1 | 11/2013 | Malladi | |
| 2013/0301491 A1 | 11/2013 | Bashar | |
| 2014/0010086 A1 | 1/2014 | Etemad | |
| 2014/0045504 A1 | 2/2014 | Jung et al. | |
| 2014/0099962 A1* | 4/2014 | Capdevielle ...... | H04W 36/0066 455/441 |
| 2014/0133477 A1 | 5/2014 | Siomina | |
| 2014/0302854 A1 | 10/2014 | Wei | |
| 2015/0071146 A1* | 3/2015 | Wei ........................ | H04W 72/12 370/311 |
| 2015/0208388 A1* | 7/2015 | Chen ...................... | H04B 7/024 370/329 |
| 2016/0255518 A1 | 9/2016 | Maeda et al. | |
| 2017/0338923 A1 | 11/2017 | Prasad et al. | |

FOREIGN PATENT DOCUMENTS

| | | |
|---|---|---|
| JP | 2011-244196 | 12/2011 |
| JP | 2012 70134 | 4/2012 |
| JP | 2017-212733 A1 | 11/2017 |
| WO | WO 2007/105625 A1 | 9/2007 |
| WO | WO 2010/024315 A1 | 3/2010 |
| WO | 2010 150462 | 12/2010 |
| WO | 2011 134337 | 11/2011 |
| WO | 2012 008739 | 1/2012 |
| WO | WO 2012/066676 A1 | 5/2012 |
| WO | WO 2011/052643 A1 | 3/2013 |
| WO | WO 2014/021447 A1 | 2/2014 |

OTHER PUBLICATIONS

International Search Report dated Oct. 22, 2013 in PCT/JP13/070983 Filed Aug. 2, 2013.
TSG-Ran WG1 #67 R1-113889, "Discussion on time frequency synchronisation for the extension carrier", NEC Group, pp. 1-4. (Nov. 14-18, 2011).
3GPP TSG-RAN WG1 Meeting #67 R1-113974, "Overall design of additional carrier types", LG Electronics, Total 6 Pages, (Nov. 14-18, 2011).
3GPP TSG-RAN Meeting #66bis R1-113117, "Extension carder for Rel. 11", Panasonic, pp. 1-3, (Oct. 10-14, 2011).
3GPP TS 36.300 V1.2.0, "3rd Generation Partnership Project; Technical Specification Group Radio Access Network; Evolved Universal Terrestrial Radio Access (E-UTRA) and Evolved Universal Terrestrial Radio Access Network (E- UTRAN); Overall description: Stage 2 (Release 11)", LTE Advanced, pp. 1-201. (Jun. 2012).
3GPP TS 36.331 V11.0.0, "3rd Generation Partnership Project; Technical Specification Group Radio Access Network; Evolved Universal Terrestrial Radio Access (E-UTRA); Radio Resource Control (RRC).; Protocol specification (Release 11)", LTE Advanced, pp. 1-302, (Jun. 2012).
3GPP TS 36.304 V11.0.0, 3rd Generation Partnership Project; Technical Specification Group Radio Access Network; Evolved Universal Terrestrial Radio Access (E-UTRA); User Equipment (UE) procedures in idle mode (Release 11), LTE Advanced. pp. 1-33, (Jun. 2012).
3GPP TR 23.830 V9.0.0, "3rd Generation Partnership Project; Technical Specification Group Services and System Aspects; Architecture aspects of Home NodeB and Home eNodeB (Release 9)", LTE, pp. 1-55, (Sep. 2009).
3GPP TSG-SA1 #42 S1-083461, "LS on HNB/HeNB Open Acess Mode", 3GPP SA WG1, Total 2 Pages, (Oct. 13-17, 2008).
3GPP TSG-RAN WG2 meeting #62 R2-082899, "LS on CSG cell identification", RAN2, pp. 1-2, (May 5-9, 2008).

(56) References Cited

OTHER PUBLICATIONS

3GPP TR 36.814 V9.0.0. "3rd Generation Partnership Project; Technical Specification Group Radio Access Network; Evolved Universal Terrestrial Radio Access (E-UTRA); Further advancements for E-UTRA physical layer aspects (Release 9)", LTE Advanced, pp. 1-104, (Mar. 2010).
3GPP TR 36.912 V10.0.0, "3rd Generation Partnership Project; Technical Spscification Group Radio Access Network; Feasibility study for Further Advancements for E-UTRA (LTE-Advanced) (Release 10)", LTE Advanced, Total 253 Pages, (Mar. 2011).
3GPP TS 36.101 V11.0.0, "3rd Generation Partnership Project; Technical Specification Group Radio Access Network; Evolved Universal Terrestrial Radio Access (E-UTRA); User Equipment (UE) radio transmission and reception (Release 11)", LTE Advanced, pp. 1-316, (Mar. 2012).
3GPP TR 36.819 V11.1.0, "3rd Generation Partnership Project; Technical Specification Group Radio Access Network; Coordinated multi-point operation for LTE physical layer aspects (Release 11)", LTE Advanced, pp. 1-69. (Dec. 2011).
3GPP TSG RAN WG1 Meeting #67 R1-114352, "Final Report of 3GPP TSG RAN WG1 #66bis V.1.1.0 (Zhuhai, P. R. China, Oct. 10-14, 2011)", MCC Support. Total 234 Pages, (Nov. 14-18, 2011).
3GPP TSG RAN WG1 Meeting #68 R1-110424, "Simuitansous transmissions in multiple TA groups", LG Electronics, Total 9 Pages, (Feb. 6-19, 2012).
3GPP TSG RAN WG1 Meeting #70 R1-12xxxx, "Draft Report of 3GPP TSG RAN WG1 #69 v0.2.0 (Prague, Czech Republic, May 21-25, 2012)", MCC Support, pp. 1-153, (Aug. 13-17, 2012).
3GPP TSG RAN WG1 Meeting #68bis R1-121231. "On synchronized new carriers", Alcatel-Lucent, Alcatel-Lucent Shanghai Bell. pp. 1-3. (Mar. 26-30, 2012).
3GPP TS 36.423 V11.1.0, "3rd Generation Partnership Project; Technical Specification Group Radio Access Network; Evolved Universal Tersstrial Radio Access Network (E-UTRAN); X2 application protocol (X2AP) (Release 11)", LTE Advanced, pp. 1-134, (Jun. 2012).
3GPP TS 36.413 V11.0.0, "3rd Generation Partnership Project; Technical Specification Group Radio Access Network; Evolved Universal Terrestrial Radio Access Network (E-UTRAN); S1 Application Protocol (S1AP) (Release 11)", LTE Advanced, pp. 1-258, (Jun. 2012).
3GPP TSG RAN WG1 Meeting #66bis R1-121466, "Views on Synchronized New Carrier", NTT DOCOMO, pp. 1-2, (Mar. 26-30, 2012).
3GPP TSG-RAN WG1 Meeting #69 R1-122175. "Channels and signals for additional carrier type", Panasonic, pp. 1-3, (May 21-25, 2012).
3GPP TS 36.213 V10.6.0. "3rd Generation Partnershio Project; Technical Specification Group Radio Access Network: Evolved Unsversal Terrestrial Radio Access (E-UTRA); Physical layer procedures (Release 10)", LTE Advanced, pp. 1-125, (Jun. 2012).
3GPP TS 36.211 V10.5.0, "3rd Generation Partnership Project; Technical Specification Group Radio Access Network; Evolved Universal Terrestrial Radio Access (E-UTRA); Physical Channels and Modulation (Release 10)". LTE Advanced, pp. 1-101. (Jun. 2012).
3GPP TSG RAN WG2 Meeting #78 R2-122180, "Initial Consideration on NCT", CATT, pp. 1-3, (May 21-25, 2012).
3GPP TSG RAN WG1 Meeting #68 R1-120001, Final Report of 3GPP TSG RAN WG1 #67 v1.0.0 (San Francisco, USA, (Nov. 14-18, 2011), Total 123 pages, (Feb. 6-10, 2012).
International Preliminary Report on Patentability and Written Opinion dated Feb. 12, 2015 in PCT/JP2013/070933 (with English Translation).
Extended European Search Report dated Feb. 12, 2016 in European Patent Application No. 13825742.3.
Discussion on time and frequency synchronization for the Additional Carrier type, Feb. 2012, NEC Group, R1-120247, pp. 1-4.
Japanese Office Action dated May 23, 2017, issued in Japanese Patent Application No. 2014-528235 (with English translation).
Samsung, Proposal of Call Deactivation Request Operation in intra-LTE Energy Saving [online], 3GPP TSG-RAN, WG3#70 R3-103576, internet. URL:http//www.3gpp.org/ftp/tsg_ran/WG3_lu/TSGR3_70/Docs/R3-103576.zip> Nov. 19, 2010.
Nokia Siemens Networks. Cell being Out of Service [ontine], 3GPP TSG-RAN WG3#76 R3-121088, internet. URL:http://www.3gpp.org/ftp/tsg_ran/WG3_lu/TSGR3_76/Docs/R3-121088.zip > May 25, 2012.
Combined Office Action and Search Report dated Oct. 27, 2017 in Chinese Patent Application No. 201380041140.7 (with English translation).
Office Action dated Aug. 20, 2019; in Japanese Patent Application No. 2018-194814 (w/English-language translation), 10 pages.
Office Action dated Jun. 6, 2019, in Europe Patent Application No. 13 825 742.3-1215. (6 pages).
Office Action dated May 10, 2018, in Chinese Patent Application No. 201380041140.7 (with English language translation), 9 pages.
Office Acton dated Nov. 8, 2017 in European Patent Appication No. 13825742.3, 7 pages.
Office Action dated Oct. 12, 2018 tn Chinese Patent Application No. 201380041140.7 (with English translation).
Indian Office Action dated Oct. 15, 2019 in Indian Patent Application No. 613/CHENP/2015 (With English translation).
Office Action dated Sep. 15, 2020 in Japan Patent Application No. 2018-194814 (with Unedited-Computer Generated English translation); 9 pgs.
Office Action dated Jan. 12, 2021 in Japan Patent Application No. 2020-3145 (with English translation); 11 pgs.
Office Action dated Mar. 9, 2021 in Japan Patent Application No. 2020-038471 (with English translation); 9 pgs.
Extended European Search Report dated Jul. 22, 2021 in European Patent Application No. 21177975.6, 11 pages.
Indian Office Action dated Feb. 3, 2022 in Indian Application No. 202048025167 with English translation, 7 pgs.
Indian Office Action dated Feb. 3, 2022 in Indian Application No. 202048024756 with English translation, 7 pgs.
Second Notice of Reasons for Refusal dated Mar. 3, 2022 in corresponding Chinese Patent Application No. 201910547543.8 (with English translation)(20 pages).

* cited by examiner

FIG. 5
BACKGROUND ART
(A)
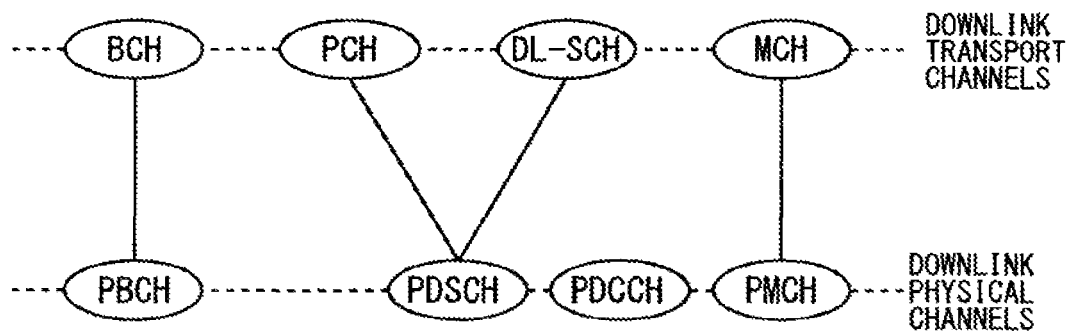
(B)
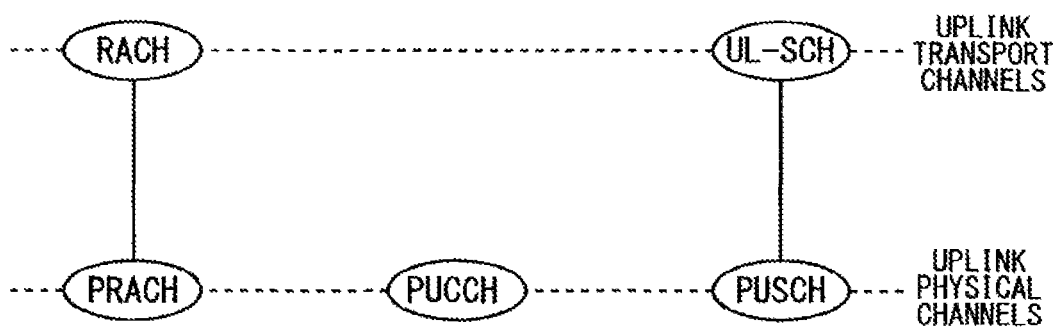

FIG. 6
BACKGROUND ART
(A)
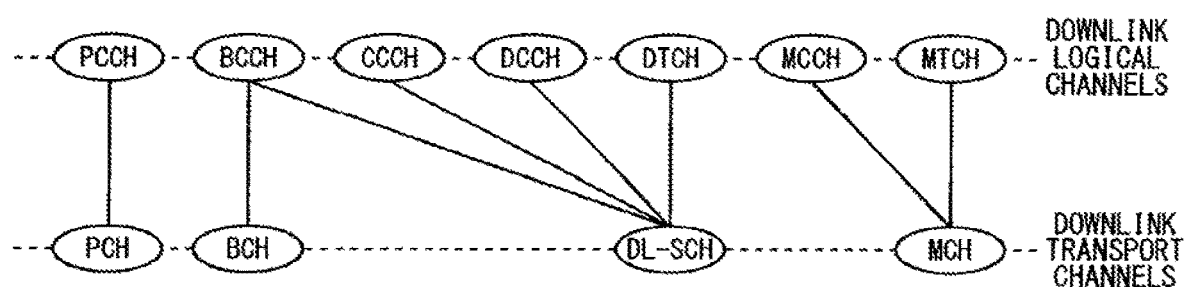
(B)
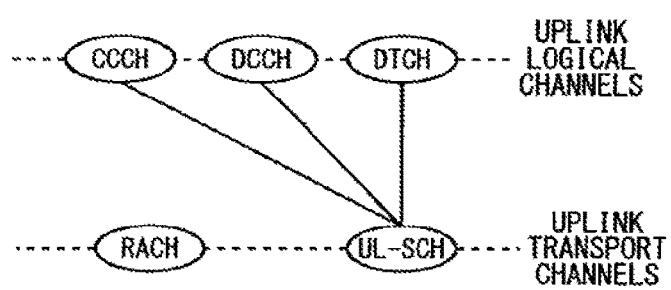

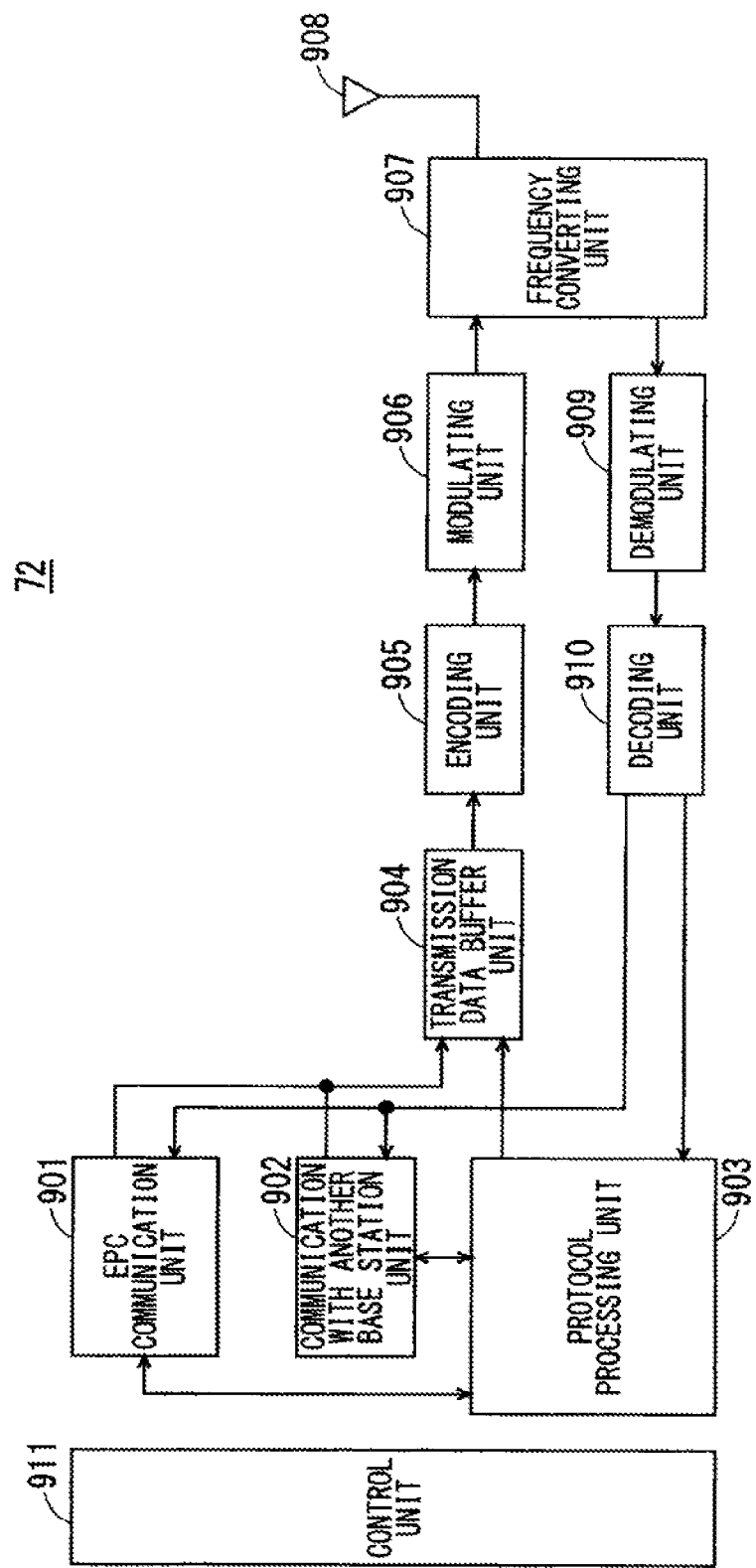

F I G . 1 0
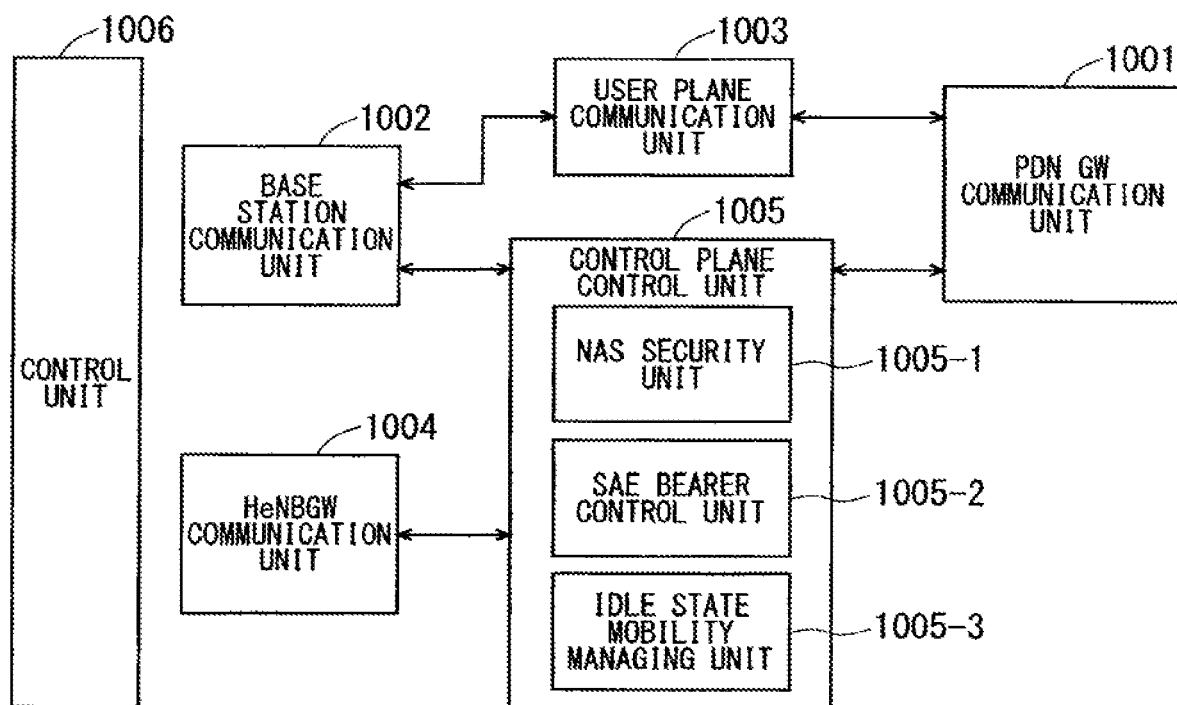

F I G. 1 1
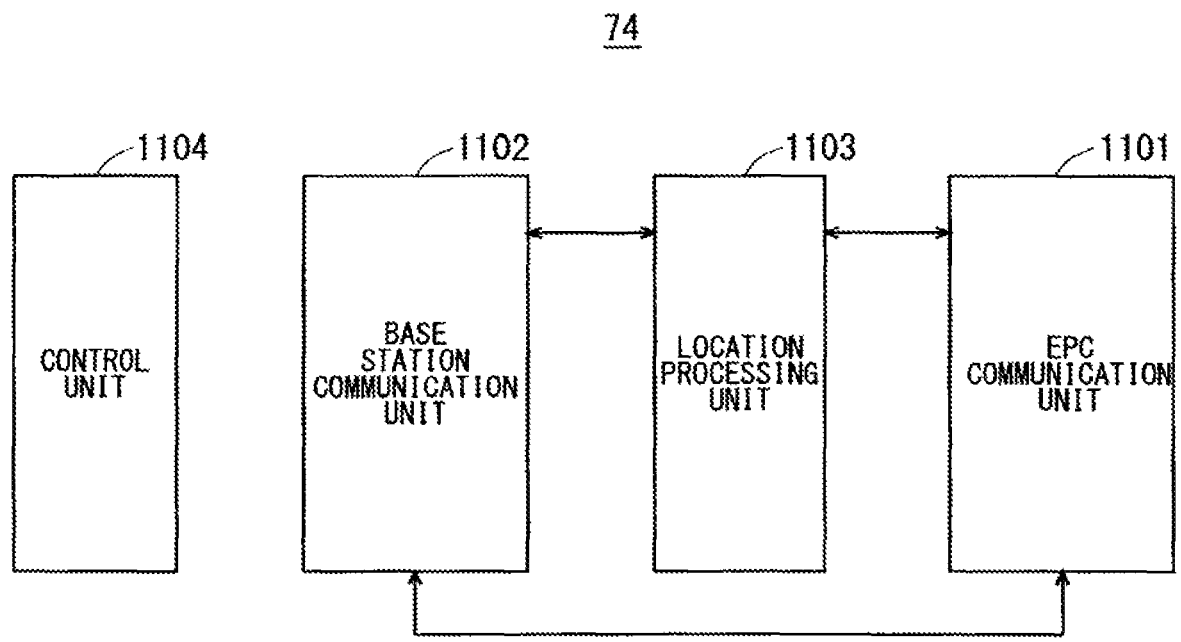

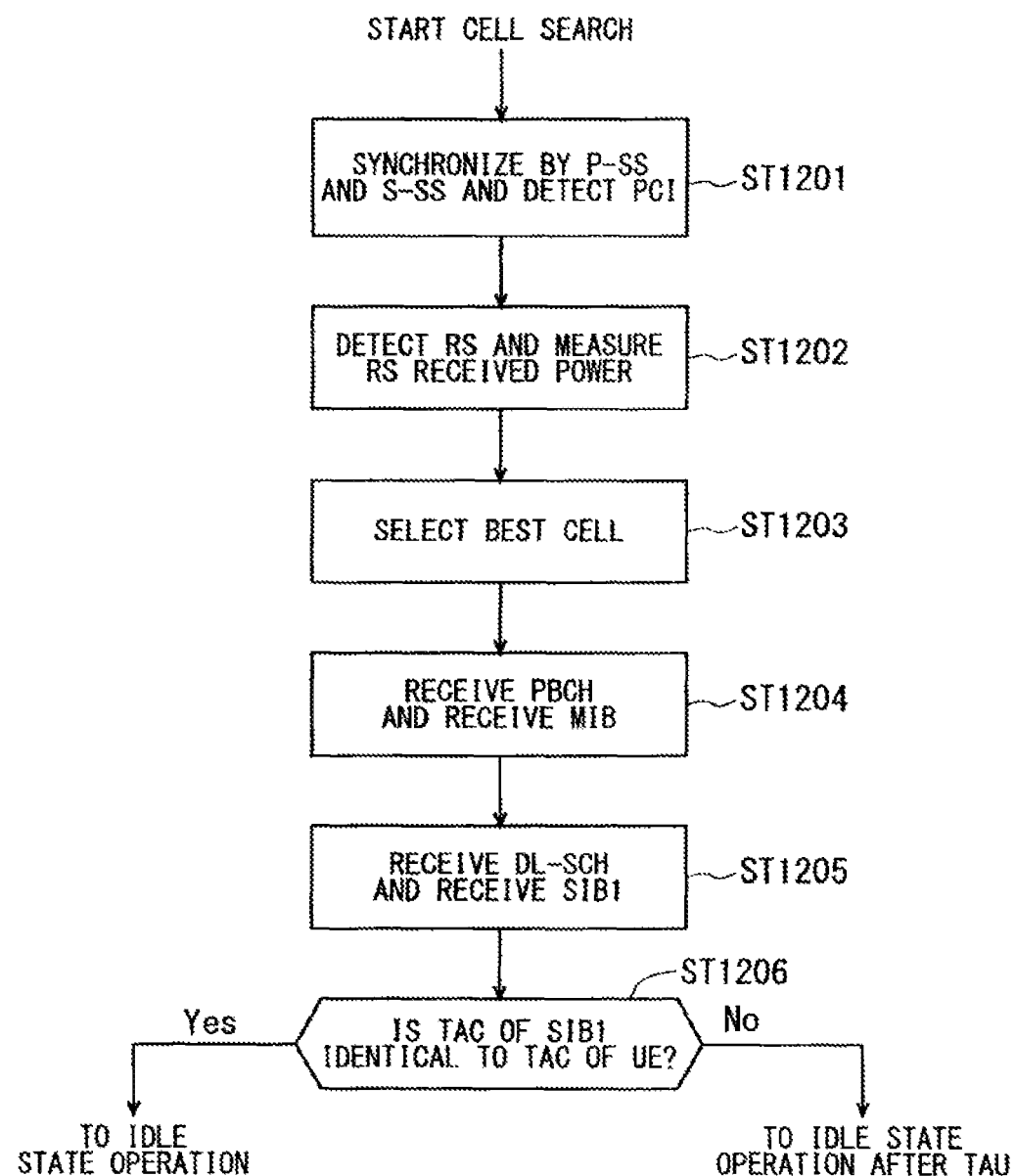
F I G . 1 2

F I G. 1 5
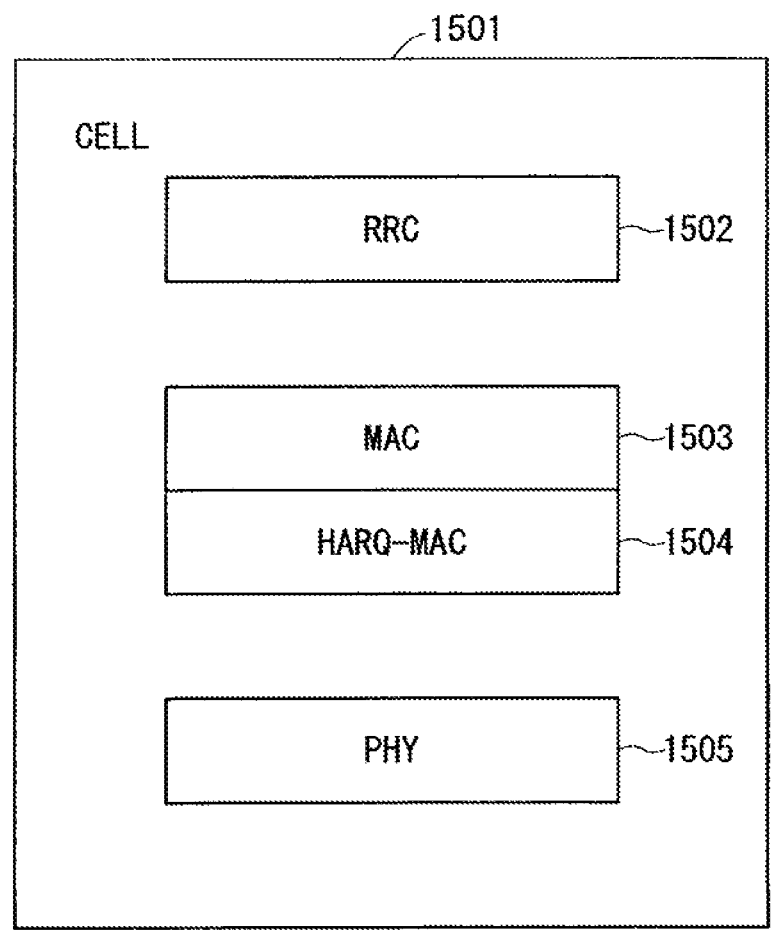
F I G. 1 6
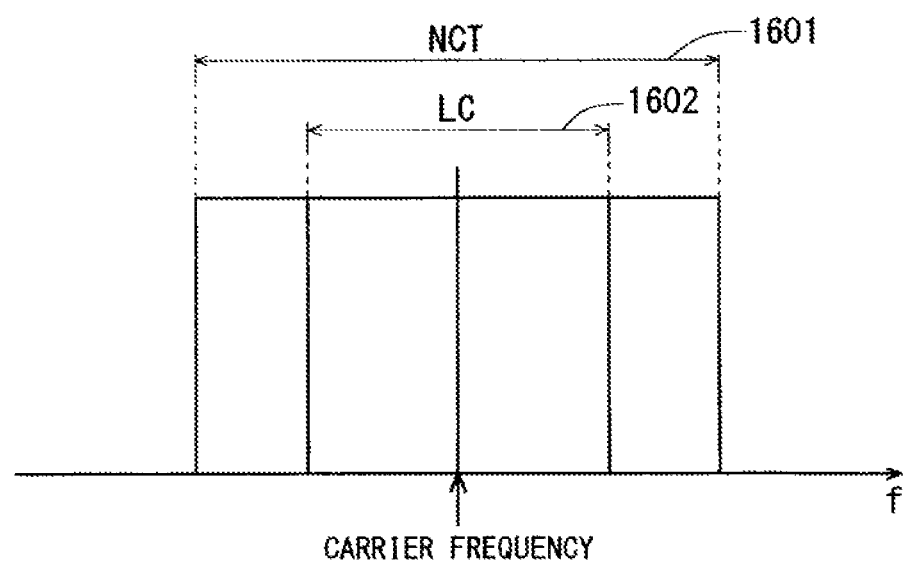

F I G. 2 0
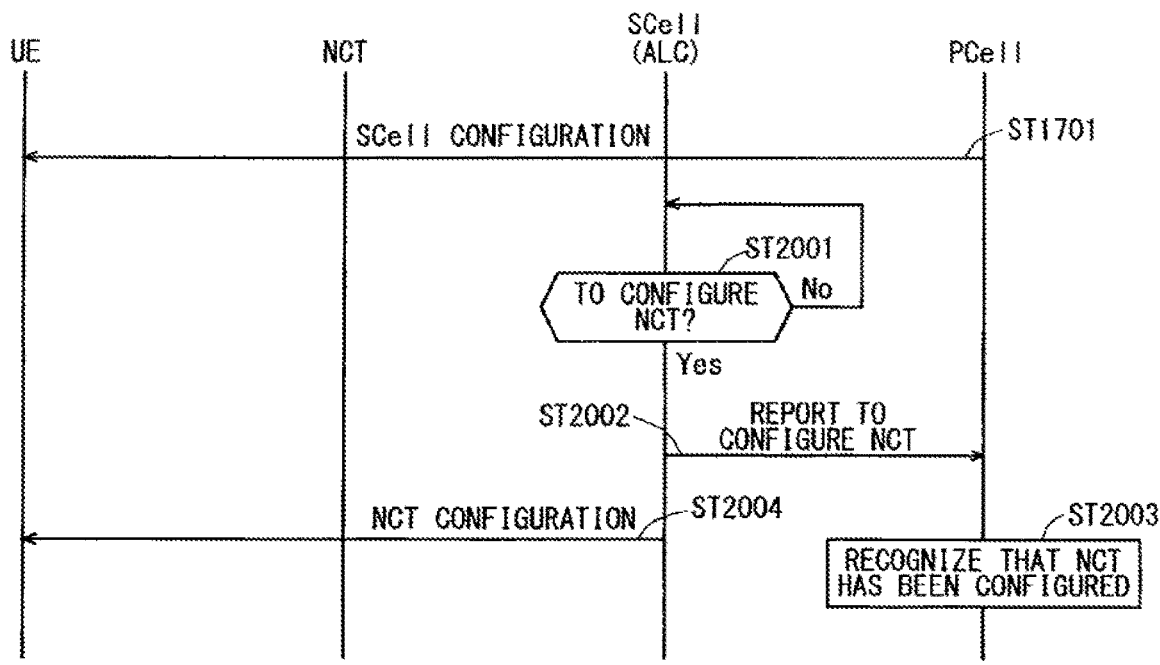
F I G. 2 1
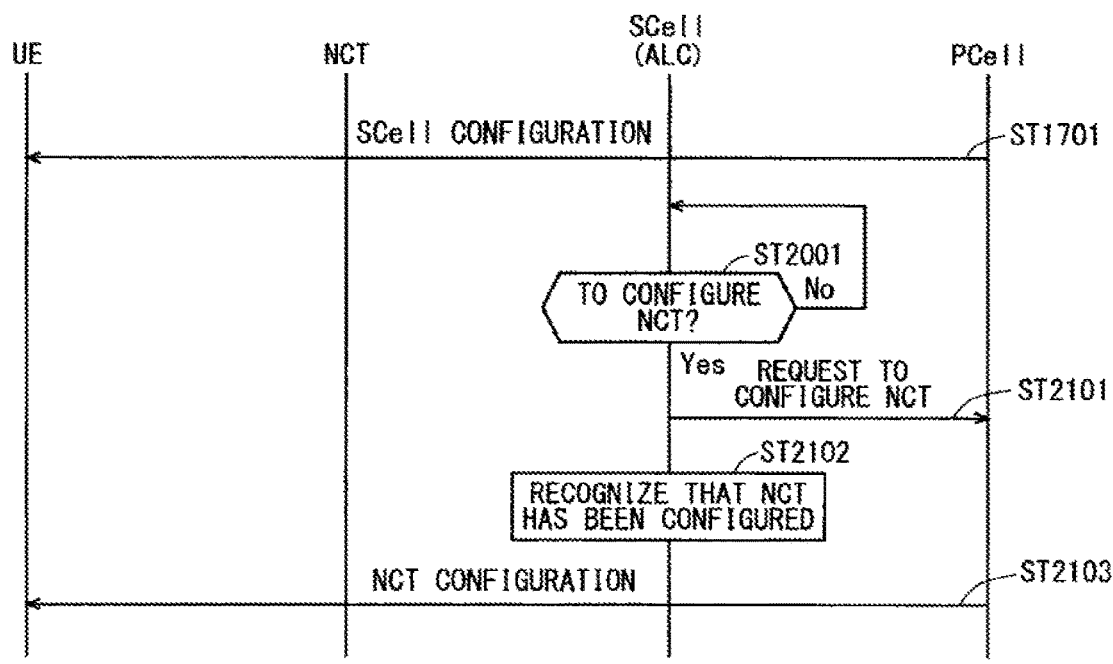

F I G. 2 3
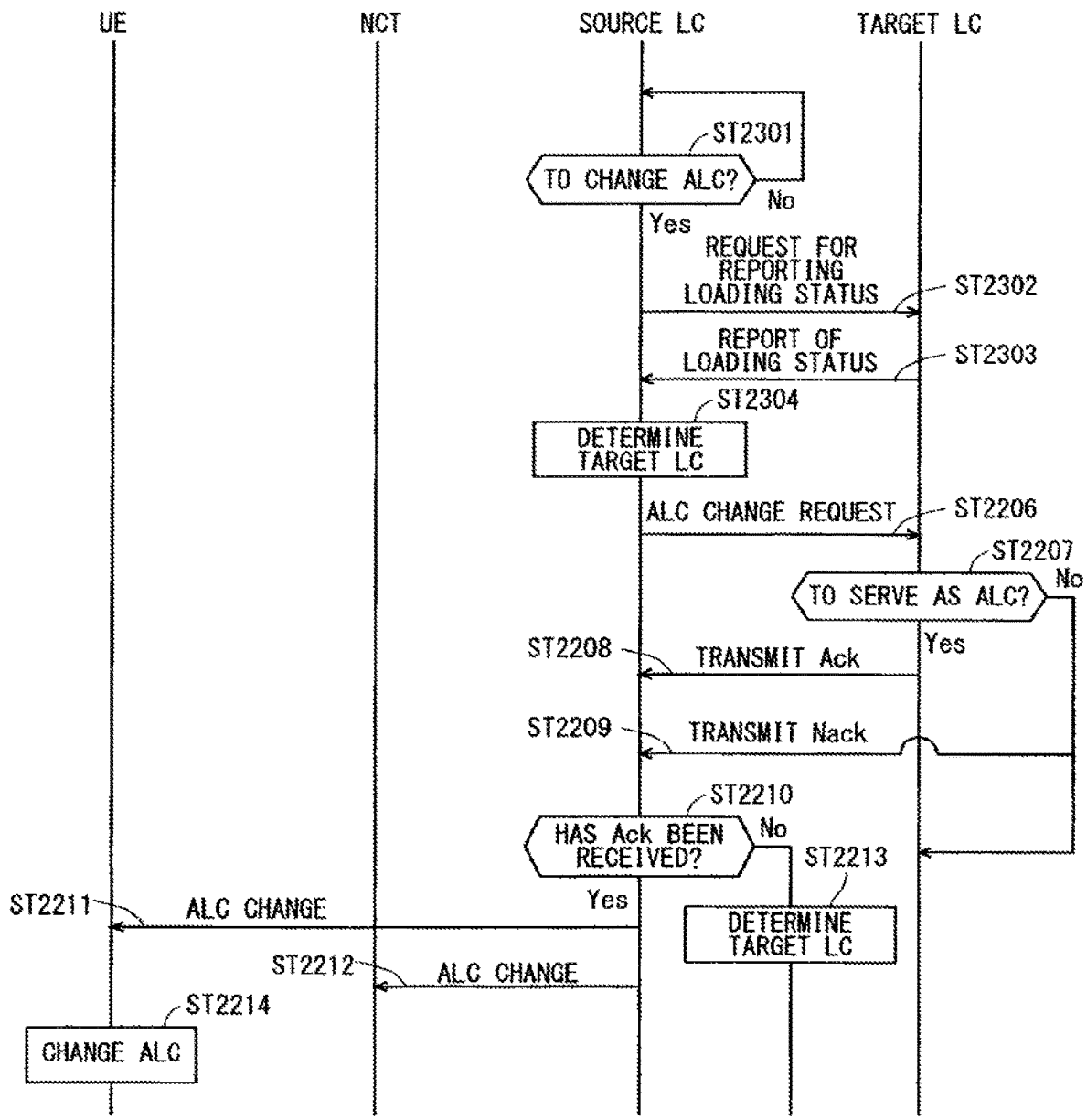

F I G. 2 5
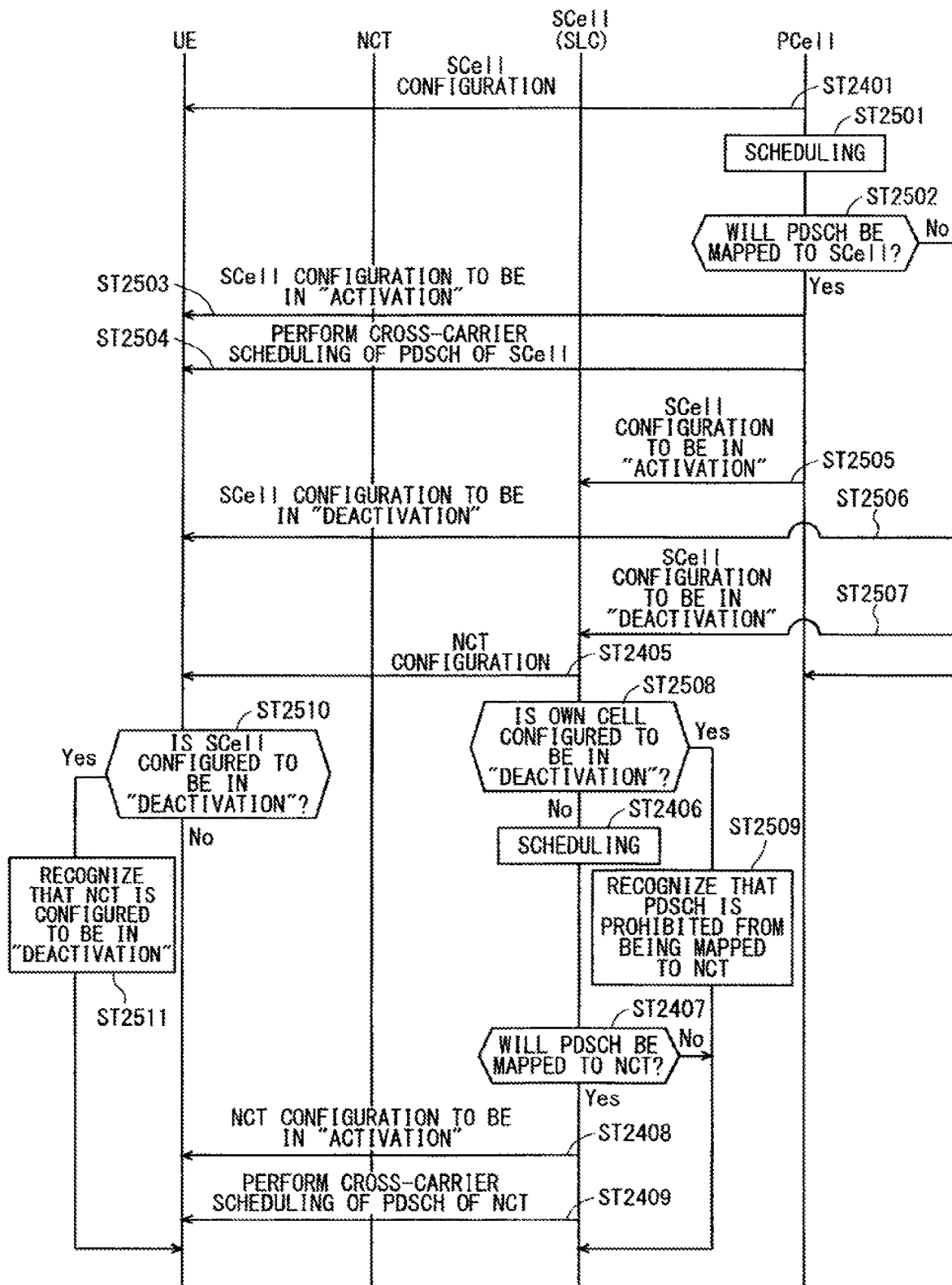

F I G . 3 1
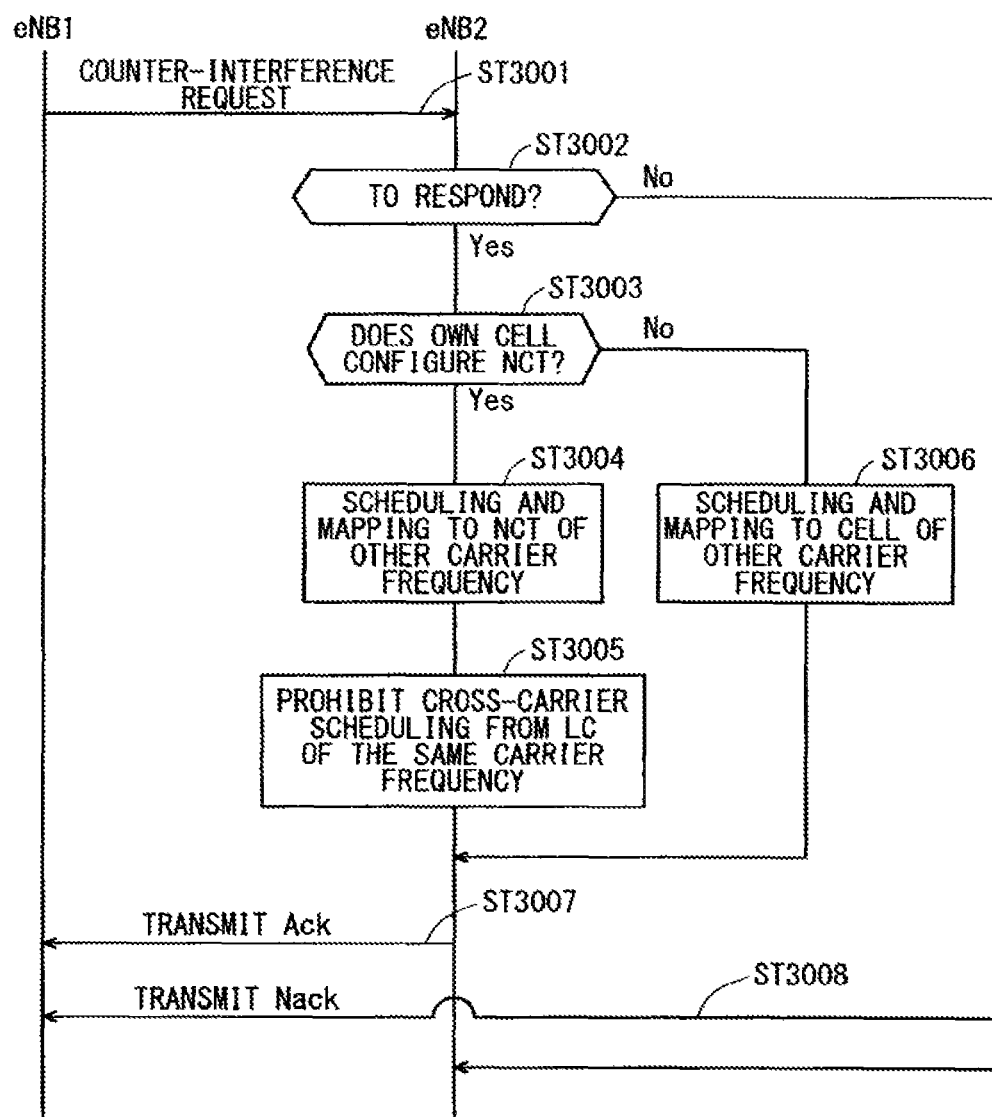

F I G. 3 5
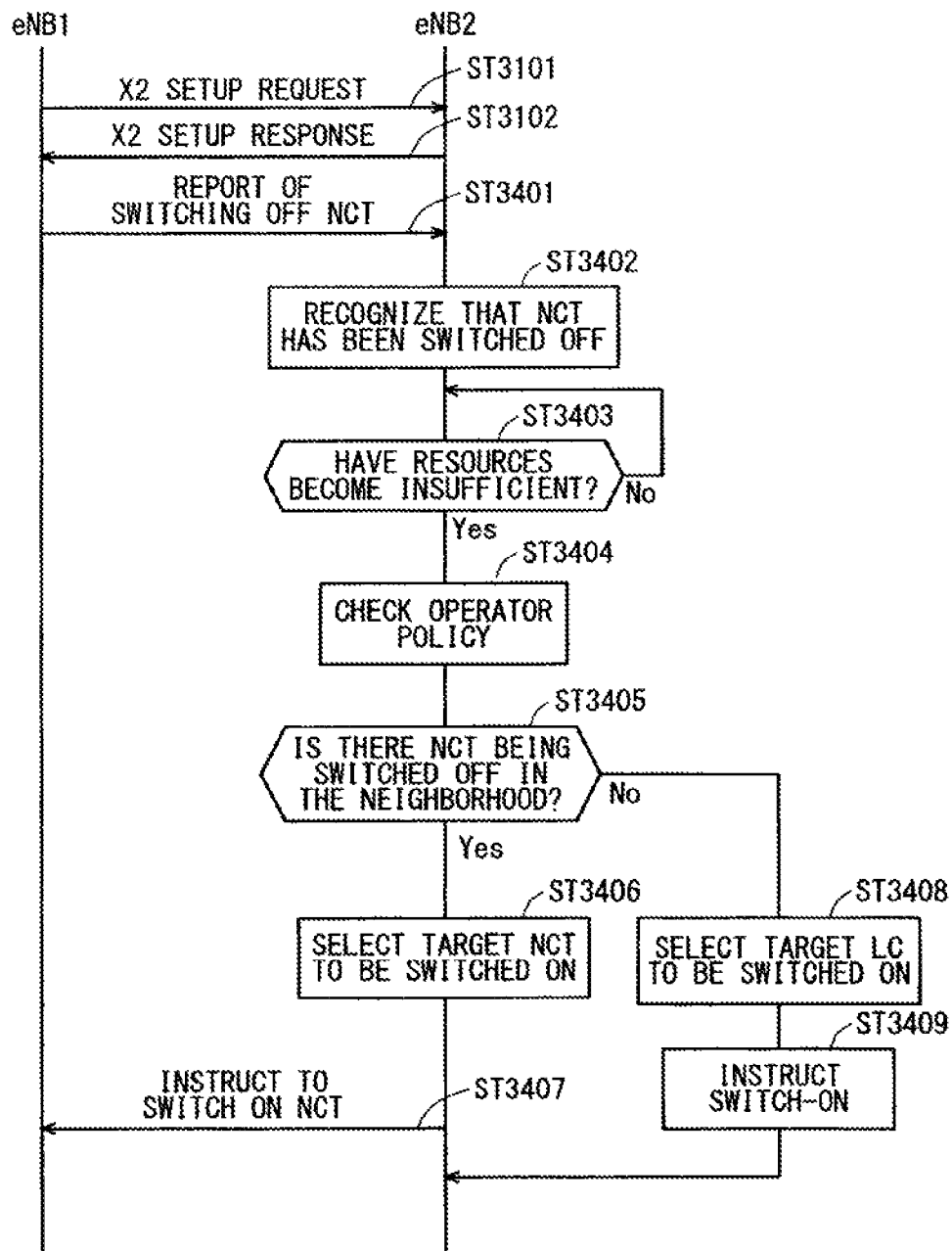

F I G . 3 6
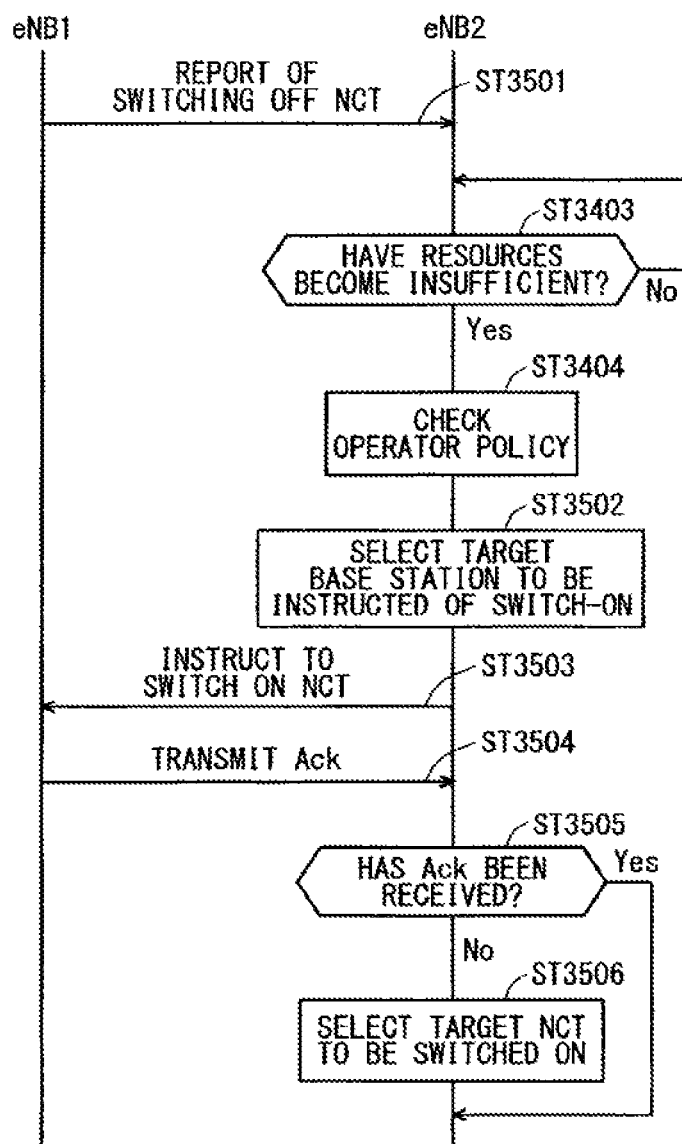

F I G. 3 7
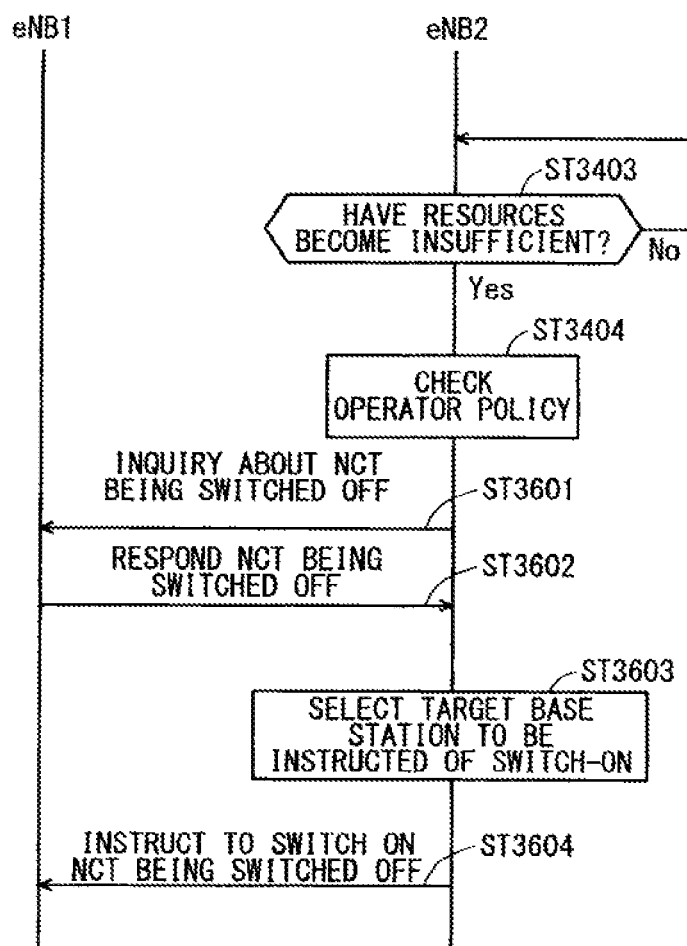

MOBILE COMMUNICATION SYSTEM, SOURCE BASE STATION, TARGET BASE STATION AND USER EQUIPMENT

CROSS-REFERENCE TO RELATED APPLICATIONS

This application is a continuation of and claims the benefit of priority from U.S. patent application Ser. No. 15/628,976, filed Jun. 21, 2017, herein incorporated by reference, which is a continuation of U.S. Pat. No. 9,713,148, issued Jul. 18, 2017, which claims the benefit of prior International Application No. PCT/JP13/070983, filed Aug. 2, 2013, which is based upon and claims the benefit of priority from Japanese Patent Application No. 2012-171871, filed Aug. 2, 2012; the entire contents of which are incorporated herein by reference.

TECHNICAL FIELD

The present invention relates to a communication system including a base station device and a communication terminal device capable of radio communication with the base station device.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio areas and system architecture evolution (SAE) regarding the overall system configuration including a core network and a radio access network (hereinafter, collectively referred to as network as well) as communication systems independent of W-CDMA. This communication system is also referred to as 3.9 generation (3.9 G) system.

In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access (E-UTRAN), respectively, in the LTE communication system. Also in the radio access network, the base station that communicates with a mobile terminal (a user equipment (UE)) being a communication terminal device is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in this LTE communication system. The E-MBMS service is broadcast multimedia service. The E-MBMS service is merely referred to as MBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (S1) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The decisions by 3GPP regarding the frame configuration in the LTE system described in Non-Patent Document 1 (Chapter 5) will be described with reference to FIG. 2. FIG. 2 is a diagram illustrating the configuration of a radio frame used in the LTE communication system. With reference to FIG. 2, one radio flame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit in FIG. 3 defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIG. 5 described below, resource allocation information for a paging channel (PCH) being one of the transport channels shown in FIG. 5, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in the LTE communication system. The following five types of downlink reference signals are defined: cell-specific reference signals (CRS), MBSFN reference signals, data demodulation reference signal (DM-RS) being UE-specific reference signals, positioning reference signals (PRS), and channel-state information reference signals (CSI-RS). The physical layer measurement objects of a user equipment include reference symbol received power (RSRP).

The transport channels described in Non-Patent Document 1 (Chapter 5) will be described with reference to FIG. 5. FIG. 5 is a diagram illustrating transport channels used in the LTE communication system. FIG. 5(A) shows mapping between downlink transport channels and downlink physical channels. FIG. 5(B) shows mapping between uplink transport channels and uplink physical channels.

A broadcast channel (BCH) among the downlink transport channels shown in FIG. 5(A) is broadcast to the entire coverage of a base station (cell). The BCH is mapped to the physical broadcast channel (PBCH).

Retransmission control according to a hybrid ARQ (HARQ) is applied to a downlink shared channel (DL-SCH).

The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in FIG. 5(B). The UL-SCH supports dynamic or semi-static resource allocation. The UL-SCH is mapped to the physical uplink shared channel (PUSCH).

A random access channel (RACH) shown in FIG. 5(B) is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission, Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIG. 6. FIG. 6 is a diagram illustrating logical channels used in an LTE communication system. FIG. 6(A) shows mapping between downlink logical channels and downlink transport channels. FIG. 6(B) shows mapping between uplink logical channels and uplink transport channels.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS, The MCCH is mapped to the multicast channel (MCH) that is a transport channel.

A dedicated control channel (DCCH) is a point-to-point channel that transmits dedicated control information between a user equipment and a network. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identification. ECGI represents an E-UTRAN cell global identification. A closed subscriber group (CSG) cell is introduced in the LTE, and the long term evolution advanced (LTE-A) and universal mobile telecommunication system (UMTS) described below. The CSG will be described below (see Chapter 3.1 of Non-Patent Document 3).

The closed subscriber group (CSG) cell is a cell in which subscribers who are allowed to use are specified by an operator (also referred to as a "cell for specific subscribers"). The specified subscribers are allowed to access one or more cells of a public land mobile network (PLMN). One or more cells in which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in the LTE communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments) even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whitelist or an allowed CSG list as well. As to the access of user equipments through a CSG cell, the MME performs access control (see Chapter 4.3.1.2 of Non-Patent Document 4). Specific examples of the access of user equipments include attach, combined attach, detach, service request, and a tracking area update procedure (see Chapter 4.3.1.2 of Non-Patent Document 4).

The service types of a user equipment in an idle state will be described below (see Chapter 4.3 of Non-Patent Document 3). The service types of user equipments in an idle state include a limited service, standard service (normal service), and operator service. The limited service includes emergency calls, earthquake and tsunami warning system (ETWS), and commercial mobile alert system (CMAS) on an acceptable cell described below. The standard service (also referred to as normal service) is a public service on a suitable cell described below. The operator service includes a service for operators only on a reserved cell described below.

A "suitable cell" will be described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list."

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming," where the cell needs to fulfill (1) above;

(c) the cell shall fulfill the cell selection criteria; and (d) for a cell specified as CSG cell by system information (S1), the CSG-ID is part of a "CSG whitelist" of the UE, that is, is contained in the CSG whitelist of the UE.

An "acceptable cell" will be described below. The "acceptable cell" is a cell on which a UE may camp to obtain limited service. Such a cell shall fulfill the all following requirements.

(1) The cell is not a prohibited cell (also referred to as a "barred cell").

(2) The cell fulfills the cell selection criteria.

"Barred cell" is indicated in the system information.

"Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell."

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 5 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as a hybrid cell) is a cell that supports both the open access mode and the closed access mode.

In 3GPP, among all physical cell identities (PCIs), there is a range of PCIs reserved by the network for use by CSG cells (see Chapter 10.5.1.1 of Non-Patent Document. 1). Division of the PCI range is also referred to as PCI split. The information about PCI split (also referred to as PCI split information) is broadcast in the system information from a base station to user equipments being served thereby. To being served by a base station means to take the base station as a serving cell.

Non-Patent Document 6 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 7 and 8).

As to the LTE-A system, it is studied that a relay and a relay node (RN) are supported for achieving a high data rate, high cell-edge throughput, new coverage area, and the like. The relay node is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency band, and a link from an RN to a DeNB and a link from a UE to an RN are also time-division multiplexed at one frequency band. In a relay, accordingly, the transmission of the relay is prevented from interfering the reception of the own relay.

Not only a normal eNB (macro cell) but also so-called local nodes such as pica eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 9 describes the frequency bands.

Carrier aggregation (CA) is studied in the LTE-A system, in which two or more component carriers (CCs) are aggregated to support wider transmission bandwidths up to 100 MHz.

A Release 8 or 9 of 3GPP-compliant UE, which supports LTE, is capable of transmission/reception only on one CC corresponding to one serving cell. Meanwhile, it is conceivable that a Release 10 of 3GPP-compliant UE may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The above-mentioned LTE Advanced (LTE-A) is studied as a further advanced communication system regarding radio areas in 3GPP (see Non-Patent Documents 7 and 8). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Document 10.

CoMP is the technique of improving the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from on point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into joint transmission (JT) and dynamic point selection (DPS). The DPS includes dynamic cell selection (DCS). In JT, the PDSCH is transmitted from multiple points, specifically, part of or the entire CoMP cooperating set, at a time. In DPS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission and reception at multiple points. The unit and cell that perform coordinated multiple point transmission are referred to as a multi-point unit and a multi-point cell, respectively.

3GPP is pursuing specifications standard of Release 11. As to this specification, additional carrier types that are new items to be developed are discussed for improved frequency use efficiency, improved support for HetNet, and energy saving of a system (see Non-Patent Document 11). Hereinafter, the additional carrier type is referred to as a new carrier type (NCT).

PRIOR ART DOCUMENTS

Non-Patent Documents

Non-Patent Document 1: 3GPP TS 36.300 V11.2.0
Non-Patent Document 2: 3GPP TS 36.331 V11.0.0
Non-Patent Document 3: 3GPP TS 36.304 V11.0.0 Chapter 3.1, Chapter 4.3, Chapter 5.2.4
Non-Patent Document 4: 3GPP TR 23.830 V9.0.0
Non-Patent Document 5: 3GPP S1-083461
Non-Patent Document 6: 3GPP R2-082899
Non-Patent Document 7: 3GPP TR 36.814 V9.0.0
Non-Patent Document 8: 3GPP TR 36.912 V10.0.0
Non-Patent Document 9: 3GPP TS 36.101 V11.0.0
Non-Patent Document 10: 3GPP TR 36.819 V11.1.0
Non-Patent Document 11: 3GPP RAN1#66BIS meeting report

SUMMARY OF INVENTION

Problem to be Solved by the Invention

As described above, NCTs are currently under discussion of 3GPP, and thus, for example, the method of operating a communication system suitable for NCTs has yet to be established. Therefore, such a technique is desired that establishes the method of operating a communication system suitable for NCTs to normally and efficiently operate the communication systems of Release 11 and the following releases in which existing carriers (hereinafter, also referred to as "legacy carriers") and NCTs coexist.

The present invention has an object to provide a communication system that can be normally and efficiently operated in the case where existing carriers and new carrier types coexist.

Means to Solve the Problem

A communication system according to the present invention is a communication system in which a base station device and a communication terminal device are configured to communicate with each other in a first cell configured on a predetermined first carrier, wherein the base station device includes a second cell configured on a second carrier different from the first carrier, the second carrier is associated with the first carrier belonging to the same frequency band as a frequency band of the second carrier, and an associated carrier being the first carrier associated with the second carrier notifies the communication terminal device of carrier information being information on the second carrier.

Effects of the Invention

According to the communication system of the present invention, a communication system in which a first carrier and a second carrier coexist can be uniformly and normally operated. In addition, an associated carrier and the second carrier belong to the same frequency band, which merely requires the communication terminal device to operate a wireless unit for one frequency band for receiving the associated carrier and the second carrier. The power consumption of the communication terminal device can be therefore reduced.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a diagram illustrating transport channels used in the LTE communication system.

FIG. 6 is a diagram illustrating logical channels used in the LTE communication system.

FIG. 9 is a block diagram showing the configuration of a base station 72 of FIG. 7 being a base station according to the present invention, FIG. 10 is a block diagram showing the configuration of an MME unit 73 of FIG. 7 being an MME according to the present invention.

FIG. 11 is a block diagram showing the configuration of a HeNBGW 74 of FIG. 7 being a HeNBGW according to the present invention.

FIG. 12 is a flowchart showing an outline from a cell search to an idle state operation performed by a user equipment (UE) in the LTE communication system.

FIG. 15 shows an architecture of an existing cell.

FIG. 16 shows the concept of co-channel deployment of an NCT,

FIG. 20 shows an example sequence in a case where a specific example (3) is used as the entity that configures an NCT for a UE in the communication system according to the second modification of the first embodiment of the present invention.

FIG. 21 shows an example sequence in a case where a specific example (4) is used as the entity that configures an NCT for a UE in the communication system according to the second modification of the first embodiment of the present invention.

FIG. 23 shows an example sequence in a case where a specific example (2) of the method of determining an associated legacy carrier in a semi-static or dynamic manner in the communication system according to the third modification of the first embodiment of the present invention.

FIG. 25 shows an example sequence in a case where a specific example (2) is used as the cross-carrier scheduling method suitable for an NCT in the communication system according to the second embodiment of the present invention.

FIG. 31 shows an example sequence of a communication system in a solution (1) of a third embodiment of the present invention.

FIG. 35 shows an example sequence in a case where a specific example (1) of a notification method and a specific example (1) of a request method are used in combination in a communication system of a fourth embodiment of the present invention.

FIG. 36 shows an example sequence in a case where a specific example (2) of the notification method and a specific example (2) of the request method are used in combination in the communication system of the fourth embodiment of the present invention.

FIG. 37 shows an example sequence in a communication system in a solution of a first modification of the fourth embodiment of the present invention.

DESCRIPTION OF EMBODIMENTS

First Embodiment

Figure 1:
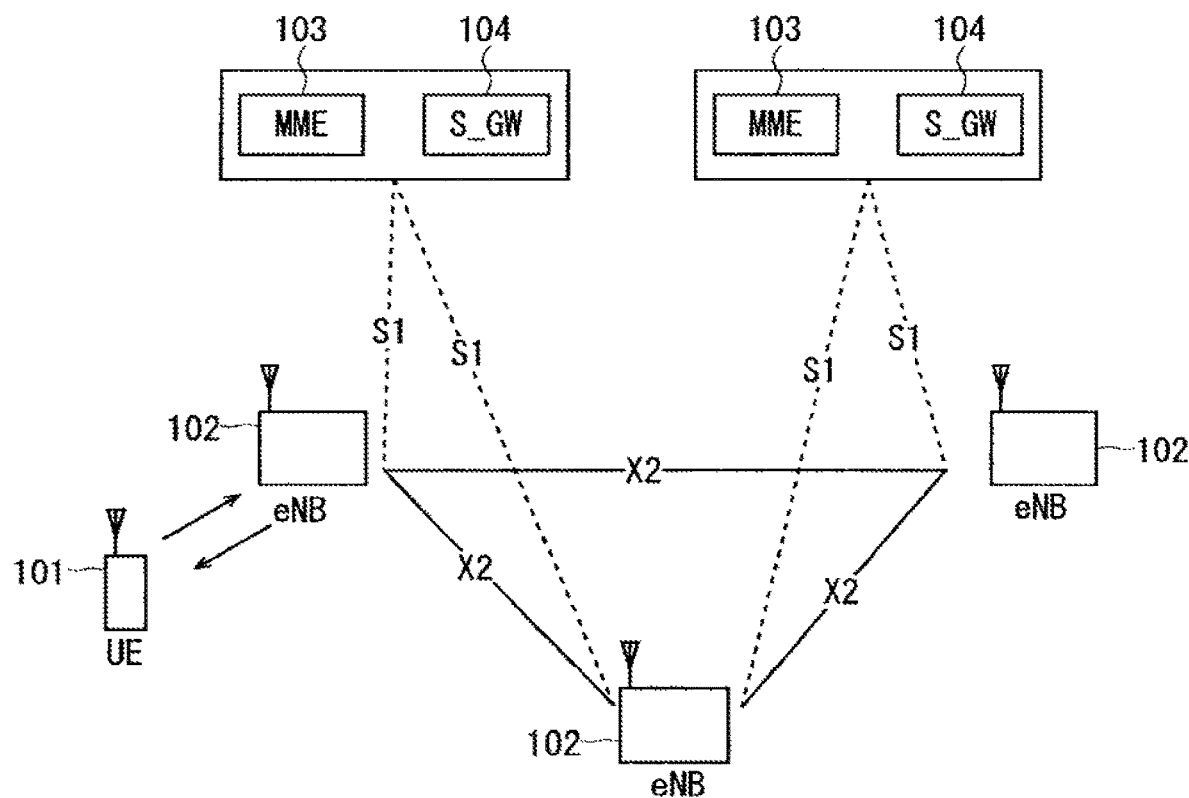
FIG. 1 is a diagram illustrating the configuration of an LTE communication system.
Figure 2:
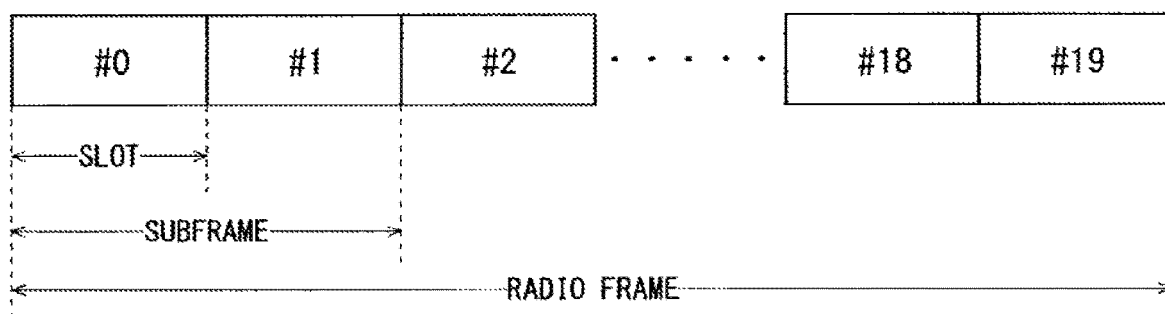
FIG. 2 is a diagram illustrating the configuration of a radio frame used in the LTE communication system.
Figure 3:
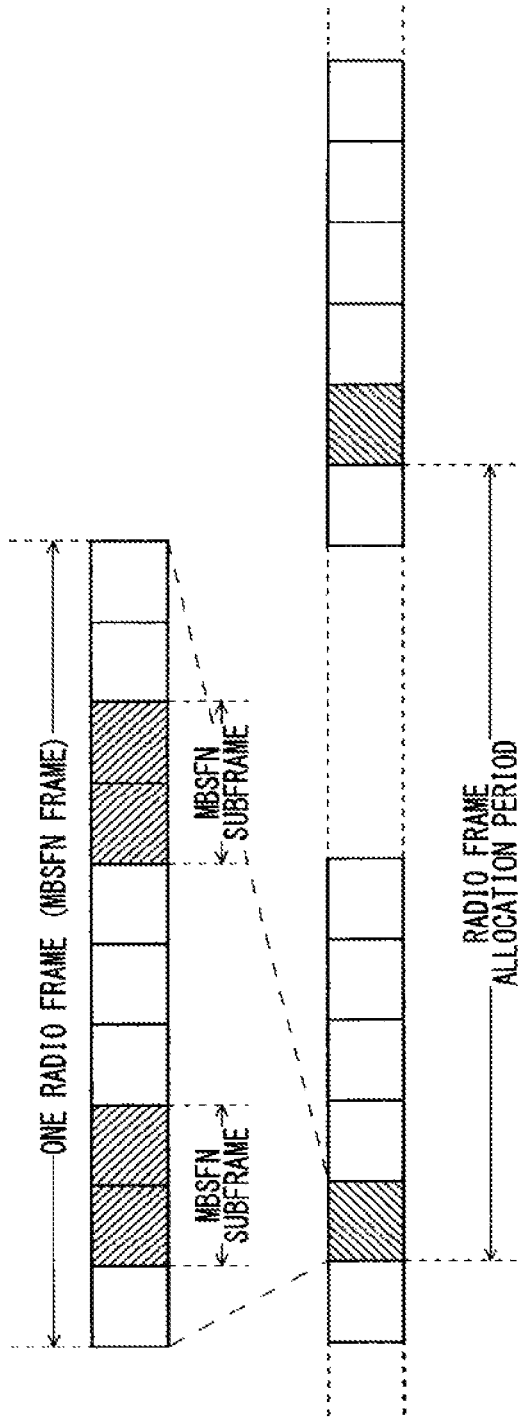
FIG. 3 is a diagram illustrating the configuration of an MBSFN frame.
Figure 4:
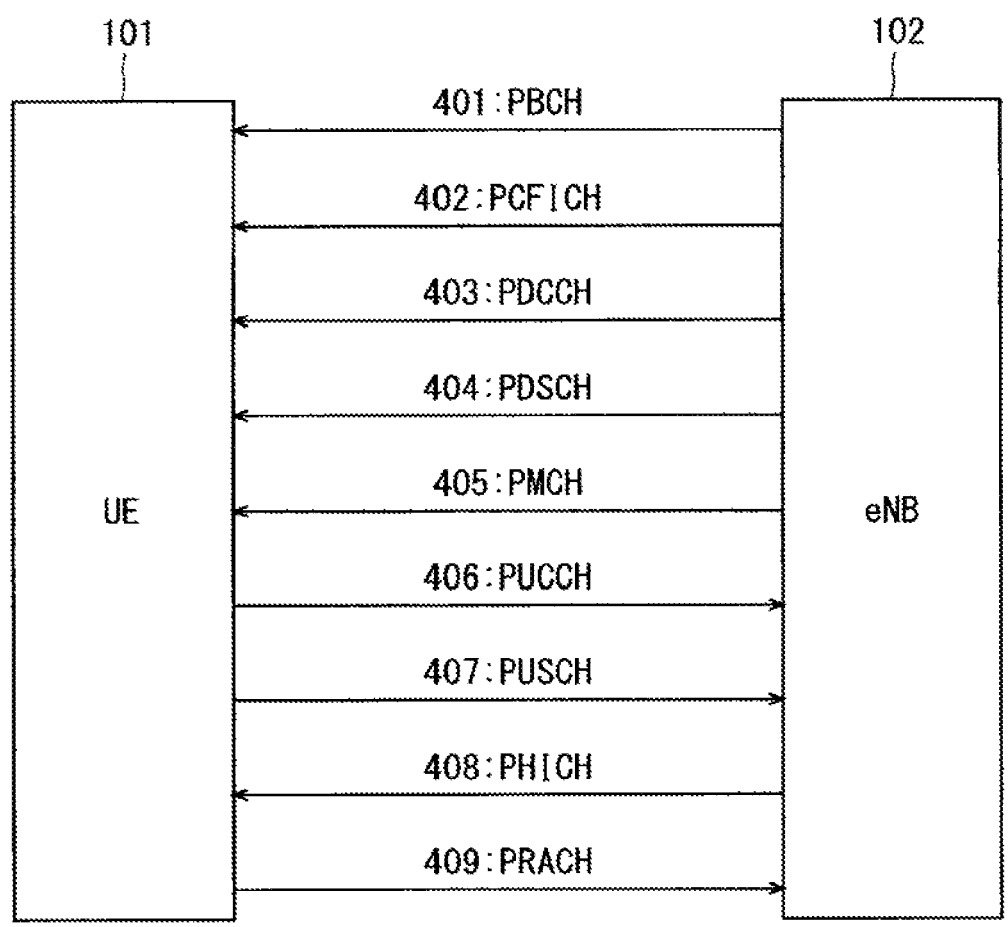
FIG. 4 is a diagram illustrating physical channels used in the LTE communication system.
Figure 7:
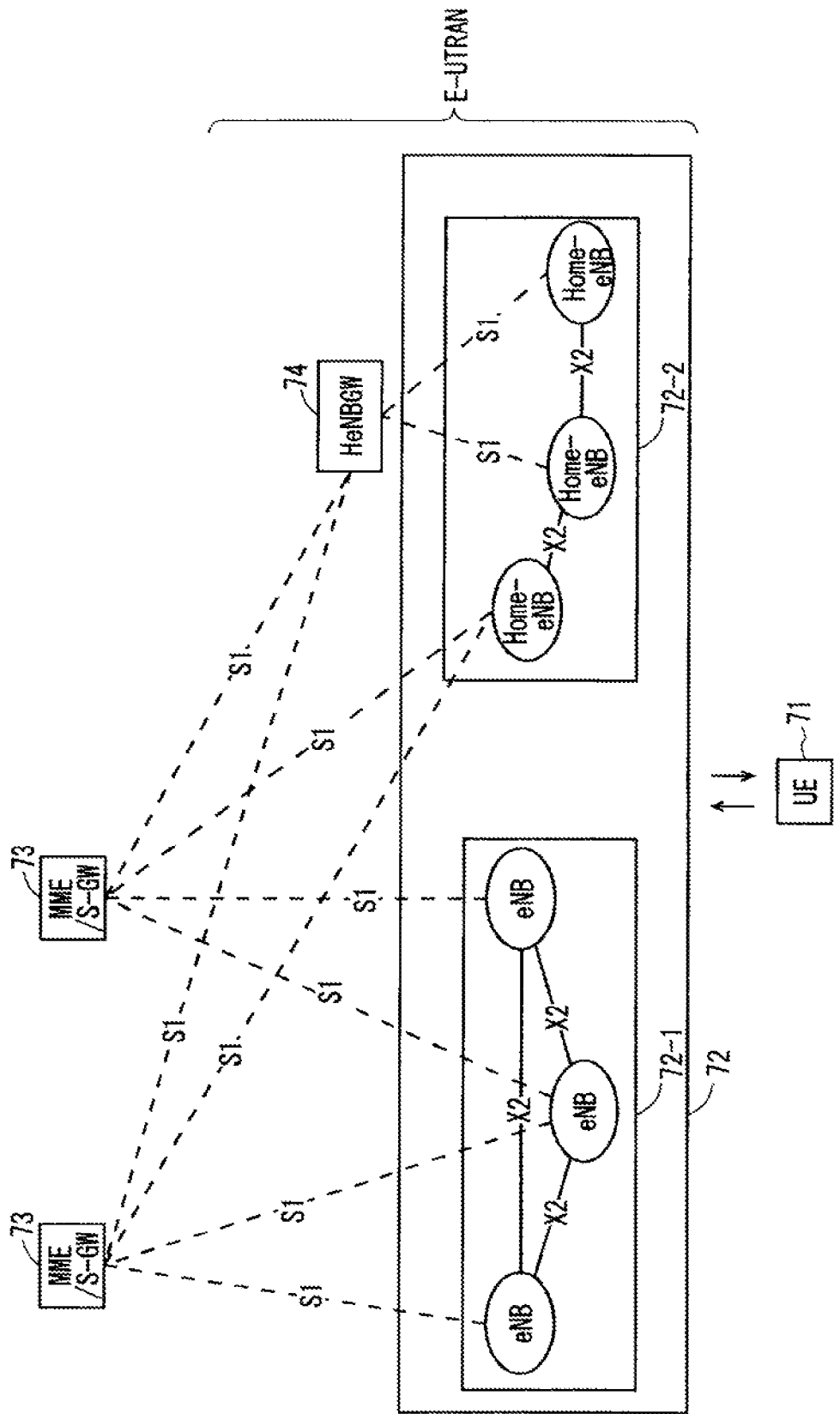
FIG. 7 is a block diagram showing the overall configuration of an LTE communication system currently under discussion of 3GPP.

FIG. 7 is a block diagram showing an overall configuration of an LTE communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 will be described. A mobile terminal device being a communication terminal device (hereinafter, referred to as a "user equipment" or "UE") 71 is capable of performing radio communication with a base station device (hereinafter, referred to as a "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which communication is allowed with the user equipment (UE) 71. The Home-eNB 72-2 has a relatively small-scale coverage as the coverage.

The eNB 72-1 is connected to an MME/S-GW unit (hereinafter, also referred to as an "MME unit") 73 including an MME, S-GW, or MME and S-GW through an S1 interface, and control information is communicated between the eNB 72-1 and the MME unit 73. A plurality of MME units 73 may be connected to one eNB 72-1. The MME unit 73 is included in an EPC being a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connection between the user equipment (UE) 71 and the eNB 72-1 or Home-eNB 72-2 being a base station. The MME units 73 and HeNBGW are included in an EPC being a core network.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The mobility to the Home-eNB 72-2 or the mobility from the Home-eNB 72-2 that spans a plurality of MME units 73 is not supported. The Home-eNB 72-2 is configured by a single cell.

The base station device is configured by a single cell alone, such as the Home-eNB 72-2, which is not limited thereto. One base station device may be configured by a plurality of cells. In a case where one base station device is configured by a plurality of cells, every cell is configured to communicate with a user equipment.

Figure 8:
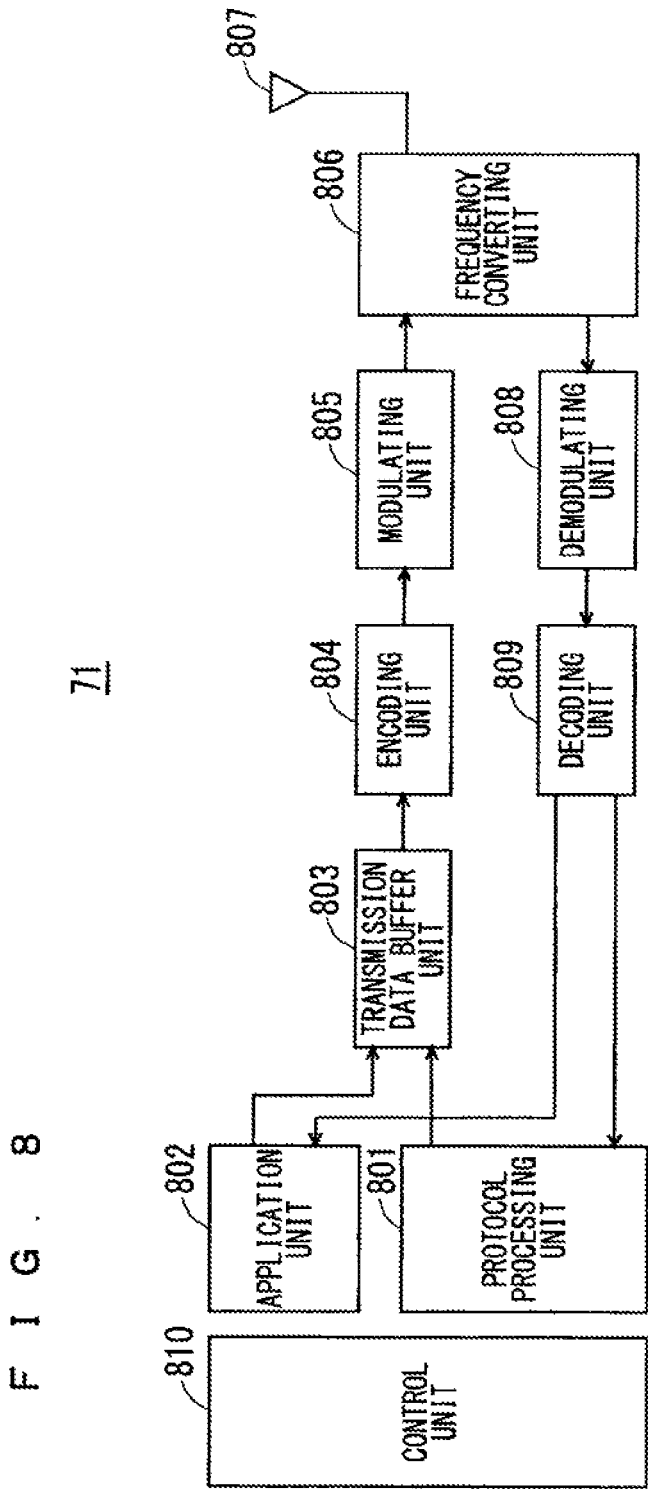
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and is then converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency into a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission/reception between the base station 72 and the EPCs (such as the MME unit 73 and the HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906, The modulated data is output to a frequency converting unit 907 after being converted into a baseband signal, and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74, That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 and another MME unit 73.

The tracking area code (TAC) and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3, and other unit, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in an idle state, addition, deletion, update, and search of a tracking area (TA) of one or a plurality of user equipments 71 being served thereby, and tracking area list management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP will be described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the pieces of data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP will be described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

An example of a cell search method in a communication system will be described next. FIG. 12 is a flowchart showing an outline from a cell search to an idle state operation performed by a user equipment (UE) in the LTE communication system. When starting a cell search, in Step ST1201, the user equipment synchronizes the slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS). The number of PCIs is currently studied in 504 ways. These 504 ways are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, cell having the highest RS received power, that is, best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information on cell selection, and scheduling information about other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area list that has been already possessed by the user equipment. The tracking area list is also referred to as a TAI list. TAI is the identity of a tracking area and is formed of a mobile country code (MCC), a mobile network code (MNC), and a tracking area code (TAC). MCC is a country code. MNC is a network code. TAC is the code number of a tracking area.

In a case where the TAC received in Step ST1205 is identical to the TAC included in the tracking area list as a result of the comparison of Step ST1206, the user equipment enters an idle state operation in the cell. In a case where the TAC received in Step ST1205 is not included in the tracking area list as a result of the comparison, the user equipment requires a core network (EPC) including MME and the like to change a tracking area through the cell for performing tracking area update (TAU).

The core network updates the tracking area list based on an identification number (such as a UE-ID) of the user equipment transmitted from the user equipment with a TAU request signal. The core network transmits the updated tracking area list to the user equipment. The user equipment rewrites (updates) the TAC list of the user equipment based on the received tracking area list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may contain a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as the CSG cell in some cases. The user equipment registered with the CSG cell has a whitelist. Specifically, the whitelist is stored in the subscriber identity module (SIM) or USIM. The whitelist stores the CSG information of the CSG cell with which the user equipment has been registered. Specific examples of the CSG information may include CSG-ID, tracking area identity (TAI), and TAC. Any one of the CSG-ID and TAC is adequate as long as they are associated with each other. Alternatively, ECGI is adequate as long as the CSG-ID and TAC are associated with ECGI.

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

The HeNB and HNB are required to support various services. For example, in a certain service, an operator causes the predetermined HeNB and HNB to register user equipments therein and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. It is required to install a large number of closed subscriber group (CSG) cells in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells.

The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

The problem to be solved in the first embodiment will now be described again. It is disclosed that an NCT is associated with a legacy carrier (see Non-Patent Document 11). It is not disclosed, however, that with what legacy carrier an NCT is associated. This leads to a problem that communication systems of Release 11 and the following releases, in which legacy carriers and NCTs coexist, cannot be operated normally and efficiently.

A solution in the first embodiment will be described below. An NCT is associated with a legacy carrier belonging to the same frequency band as that of the NCT. It is conceivable that a UE includes a wireless unit per frequency band. In this embodiment, as described above, the legacy carrier that has been associated (hereinafter, also referred to as "associated legacy carrier (abbreviated as ALC)") and the NCT belong to the same frequency band. Thus, the UE is merely required to operate a wireless unit for one frequency band to receive an associated legacy carrier and an NCT. This reduces the power consumption of a UE. The legacy carrier may serve as the serving cell for the UE. The UE that supports an LTE is capable of transmission and reception in a legacy carrier equivalent to one serving cell.

Here, the legacy carrier is equivalent to a first carrier. The NCT is equivalent to a second carrier. The associated legacy carrier is equivalent to an associated carrier.

The following four (1) to (4) will be disclosed as specific examples of the association method in the first embodiment.

(1) The carrier that notifies a UE of the configuration of the NCT is a carrier associated with the NCT. One of the carriers that notify a UE of the configuration of the NCT may be the carrier associated with the NCT. In the specific example (1), the associated legacy carrier at the same frequency band as that of the NCT notifies the UE of the configuration of the NCT. Here, the configuration of the NCT refers to the information required for a UE to transmit and receive an NCT. The associated legacy carrier may notify the UE of the system information of the NCT, in place of the configuration of the NCT. The configuration of the NCT and the system information of the NCT are information related to the NCT being a second carrier, which is equivalent to carrier information.

(2) The carrier that notifies a UE of the PDSCH scheduling of an NCT is a carrier associated with the NCT. One carrier that notifies a UE of the PDSCH scheduling of an NCT may be a carrier associated with the NCT. In the specific example (2), the associated legacy carrier at the same frequency band as that of the NCT notifies the UE of the PDSCH scheduling of the NCT.

(3) The carrier that is synchronized with an NCT is a carrier associated with the NCT. In more detail, a carrier that is synchronized with an NCT in time and frequency to such an extent that the UE does not need separate synchronization processes is the carrier associated with the NCT. One of the carriers that are synchronized with an NCT may be a carrier associated with the NCT.

(4) Combination of (1) to (3).

3GPP is studying a synchronized NCT and a non-synchronized NCT. The synchronized NCT refers to an NCT that is synchronized with a legacy carrier in time and frequency to such an extent that the UE being a receiver does not need separate synchronization processes. The non-synchronized NCT refers to an NCT that is not synchronized with a legacy carrier in time and frequency with accuracy comparable to that of a synchronized NCT (see 3GPP RAN1#67 meeting report (hereinafter, referred to as "Non-Patent Document 12").

The non-synchronized NCT may be associated with any legacy carrier in a non-limited manner, whereas the synchronized NCT may be associated with the legacy carrier belonging to the same frequency band as that of the NCT. The non-synchronized NCT is not associated with a legacy carrier in time and frequency. It is therefore conceivable that even if the legacy carriers to be associated with a non-synchronized NCT are limited, the number of hardware blocks that need to be powered on separately from a hardware block for receiving a legacy carrier in the configuration of a UE device (implement) may increase compared with the case where a synchronized NCT is used. For this reason, it is preferable to limit the legacy carriers to be associated with a synchronized NCT, which effectively reduce the power consumption of the UE, and not to limit the non-synchronized NCTs. This allows for the construction of a flexible communication system in that legacy carriers to be associated with a non-synchronized NCT are not limited.

Figure 13:
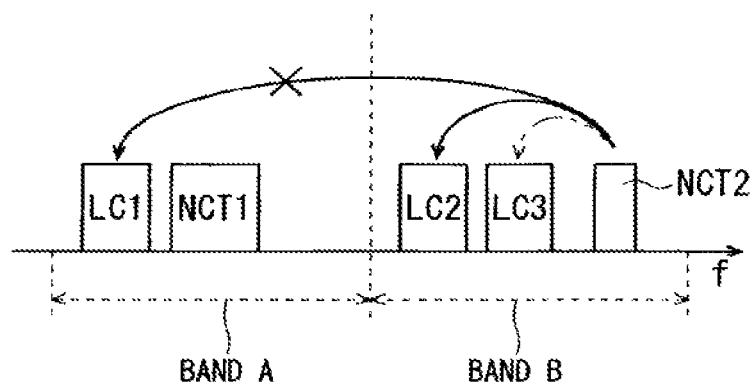
FIG. 13 shows the concept of a solution in a first embodiment of the present invention.

FIG. 13 shows the concept of the solution in the first embodiment of the present invention. In FIG. 13, the horizontal axis indicates a frequency f. Hereinafter, a legacy carrier may be referred to as "LC." In the example shown in FIG. 13, a legacy carrier (LC) 1 and an NCT1 belong to a frequency band A (band A). A legacy carrier (LC) 2, a legacy carrier (LC) 3, and an NCT2 belong to a frequency band B (band B).

For example, the legacy carrier to be associated with the NCT2 belongs to the same frequency band B as that of the NCT2. Legacy carriers belonging to the same frequency band B as that of the NCT2 include the legacy carrier (LC) 2 and the legacy carrier (LC) 3. The NCT2 is accordingly associated with the legacy carrier (LC) 2 and the legacy carrier (LC) 3. The legacy carrier (LC) 1 belongs to the frequency band A different from the frequency band B to which the NCT2 belongs. The NCT2 is accordingly not associated with the legacy carrier (LC) 1.

The architecture of an NCT has not been disclosed in the discussion of 3GPP. This embodiment will disclose the following two (1) and (2) as specific examples of the architecture suitable for an NCT.

(1) The entity that configures an NCT is an entity that has the medium access control (MAC) for hybrid automatic repeat request (HARQ), that is, HARQ-MAC function, and the physical layer (PHY) function. The entity that configures an NCT may also be referred to as an "NCT point" below.

(2) The NCT point is an entity that has the physical layer (PHY) function. The physical layer may have the HARQ-MAC function.

The NCT point is an entity that does not have the radio resource control (RRC) and MAC functions. The NCT point may use the packet data convergence protocol (PDCP), RRC, and MAC functions.

The associated legacy carrier may differ per UE. In that case, the associated legacy carrier of each UE may be responsible for the PDCP, RRC, and MAC functions for each UE. In the case where the associated legacy carrier is an SCell, a PCell may be responsible for the PDCP, RRC, and MAC functions.

The base station may determine whether to operate a carrier to be configured as a legacy carrier or as an NCT. The operation as the legacy carrier and the operation as the NCT may switchable.

Figure 14:
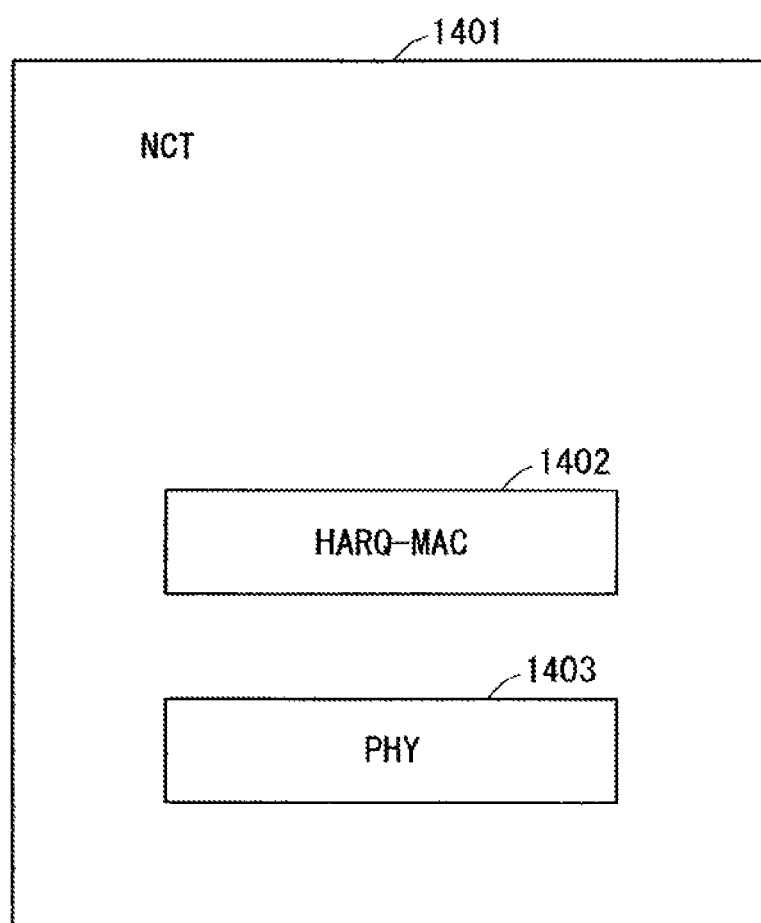
FIG. 14 shows an example architecture of an NCT.

FIG. 14 shows the architecture of an NCT of the specific example (1). An NCT point 1401 has a HARQ-MAC 1402 and a PHY 1403.

FIG. 15 shows the architecture of an existing cell (see Chapter 6.4 of Non-Patent Document 1). An existing cell 1501 is an entity that has the functions of an RRC1502, a MAC1503, a HARQ-MAC1504, and a PHY1505. Even if the cell is configured as a SCell for one UE1, it may be a PCell for a UE2 different from the UE. Thus, even the cell being a SCell for the UE1 has the RRC and MAC functions. The architecture of an NCT and the architecture of an existing cell differ from each other in this respect. The existing cell is equivalent to the first cell and the cell of the NCT is equivalent to the second cell.

The architecture of an NCT, disclosed in the first embodiment, does not have the RRC and MAC functions. This prevents a communication system from becoming complicated in enabling the entity of the NCT.

The first embodiment above can achieve the following effects. The first embodiment has disclosed the legacy carrier to be associated with an NCT, allowing for unified and normal operation of the communication systems of Release 11 and the following releases, in which legacy carriers and NCTs coexist.

It is conceivable that a UE may have a wireless unit per frequency band. According to the first embodiment, an associated legacy carrier and an NCT belong to the same frequency band, and thus, the UE is merely required to operate a wireless unit for one frequency band for receiving the associated legacy carrier and the NCT. Therefore, the power consumption of the UE can be reduced.

First Modification of First Embodiment

A first modification of the first embodiment will disclose another solution to the problem of the first embodiment described above. The solution in the first modification of the first embodiment will be described below. This modification will mainly describe the part different from the solution in the first embodiment described above and will not describe the part similar to the first embodiment.

In this modification, an NCT is associated with a legacy carrier whose timing advance group (TAG) is the same as that of the NCT.

In the case where the timing advance (TA) applied to the NCT expires or a timer expires in the UE, the UE may transmit the RACH in uplink carrier to be linked with an associated legacy carrier. Alternatively, the UE may transmit a random access preamble. The UE may receive, as a response to the RACH, a new TA value using an associated legacy carrier. The UE may receive a random access response in the associated legacy carrier and receive a new TA value.

The UE may employ the TA value received in an associated legacy carrier for the NCT. This employment is enabled by associating an NCT with a legacy carrier whose tinting advance group is the same as that of the NCT. This eliminates the need for RACH transmission in an uplink carrier for link with the NCT. That is, it is not necessary to configure an uplink carrier for link with an NCT for RACH transmission alone. This improves frequency use efficiency.

A timing advance (TA) is provided for compensating for an uplink propagation delay. The transmission from UEs are respectively compensated for by the UEs so as to align with the receiver window of the base station. The TA is a parameter used for instructing the UE from the base station to advance or delay the timings of transmission to the base station (see Chapter 5.2.7.3 of Non-Patent Document 1).

The timing advance group (TAG) is a set of cells sharing the same TA value (see R1-120424 (hereinafter, referred to as "Non-Patent Document 13") by 3GPP). The TAG is configured by base stations (see Non-Patent Document 13).

The UE receives timing advance in a random access process. To be specific, the UE receives a timing advance (TA) over a random access response being a response to a random access preamble.

Legacy carriers to be associated with a non-synchronized NCT may not be limited, whereas the synchronized NCT may be associated with a legacy carrier belonging to the same timing advance group as that of the NCT. The non-synchronized NCT is not synchronized with a legacy carrier in time and frequency, and thus, it is conceivable that even if the legacy carriers to be associated with a non-synchronized NCT are limited, a legacy carrier whose timing advance group is the same as that of the NCT is unlikely to exist. Thus, the legacy carriers to be associated with a synchronized NCT that conceivably includes a legacy carrier whose timing advance group is the same as that of the NCT are preferably limited, whereas the legacy carriers to be associated with the non-synchronized NCT are preferably not limited. This allows for the construction of a flexible communication system in that legacy carriers to be associated with a non-synchronized NCT are not limited.

The first modification of the first embodiment can be used in combination with the first embodiment described above.

The first modification of the first embodiment above can achieve the following effect. As in the first embodiment, this modification has disclosed a legacy carrier to be associated with an NCT as in the first embodiment, allowing for a unified and normal operation of the communication systems of Release 11 and the following releases, in which legacy carriers and NCTs coexist.

This modification also achieves the effect that the RACH transmission in an uplink carrier to be linked with an NCT is not required. That is, such an effect is achieved that an uplink carrier to be linked with an NCT for only transmitting the RACH is not required. This improves frequency use efficiency.

Second Modification of First Embodiment

The problem to be solved in a second modification of the first embodiment will be described. It is disclosed that an NCT can be associated with a legacy carrier (see Non-Patent Document 11). However, it is not disclosed, for example, when they are determined to be associated. Thus, the communication systems of Release 11 and the following releases, in which legacy carriers and NCTs coexist, cannot be operated normally and efficiently.

The solution in the second modification of the first embodiment will be described below. In the case where an NCT point is installed, a legacy carrier to be associated with the NCT, namely, an associated legacy carrier for the NCT is determined. The associated legacy carrier for the NCT may be determined when the operation of the NCT point is started. It may be determined that the associated legacy carrier cannot be changed during the operation of the NCT point. The methods described in, for example, the first embodiment and the first modification of the first embodiment may be used as the method of determining an associated legacy carrier for an NCT.

In the traditional techniques, system information is stored by the RRC function. As disclosed in the first embodiment, in the case where the NCT point being an entity that configures an NCT has no RRC function, the NCT point cannot use the traditional methods to store the system information of the own device.

The method of storing the configuration of an NCT or the system information of an NCT will now be disclosed. The RRC of the legacy carrier to be associated with an NCT stores the system information of the NCT. This limits the entities that store the system information of an NCT more than the method of storing the system information of an NCT according to a third modification of the first embodiment, described below, preventing a communication system from becoming complicated. A communication system can be therefore constructed easily.

Next, the following three (1) to (3) will be disclosed as specific examples of the method of notifying a UE of the configuration or system information of an NCT.

(1) Notification is made through UE dedicated signaling. In more detail, notification is made from an associated legacy carrier to a UE through UE dedicated signaling. Notification may be made from an associated legacy carrier to a UE in the RRC_CONNECTED state with the associated legacy carrier through dedicated signaling. In the case where the number of the UEs that use an NCT is limited, the method (1) does not need to repeatedly made notification compared with the method (2) described below, allowing for effective use of radio resources.

(2) Notification is made through broadcast signaling. More specifically, an associated legacy carrier notifies a UE being served thereby through broadcast signaling. Notification may be made using the MIB or SIB. Unlike the method (1), the method (2) does not need to establish dedicated signaling, and thus can effectively use radio resources in the case where a large number of UEs use an NCT or in the case where a large number of UEs need to know the configuration of the NCT.

(3) Combination of the method (1) and the method (2). That is, the notification method through UE dedicated signaling and the notification method through broadcast signaling are used in combination. The method (3) will now be described.

The RAN1 69 meeting report by 3GPP (hereinafter, referred to as "Non-Patent Document 14") discloses the co-channel deployment of an NCT. A specific example of the co-channel deployment will be described with reference to FIG. 16. FIG. 16 shows the concept of the co-channel deployment of an NCT. The NCT has a bandwidth 1601, and the legacy carrier (LC) has a bandwidth 1602. The legacy carrier (LC) that is associated, namely, an associated legacy carrier (ALC) may have the bandwidth 1602. The carrier frequency of the NCT is identical to the carrier frequency of the legacy carrier (LC).

A specific example of the combination of the method (3) will now be described below. The method (2) may be employed as the method of notifying the configuration of the NCT in the case where the NCT undergoes co-channel deployment, whereas the method (1) may be used as the method of notifying the configuration of the NCT in the case where the NCT does not undergo co-channel deployment. In a specific example of the case where the NCT does not undergo co-channel deployment, the carrier frequency of an NCT may differ from the carrier frequency of a legacy carrier or an associated legacy carrier.

A specific example of the method of notifying the configuration or the system information of an NCT that undergoes co-channel deployment will be disclosed below. Only a parameter different from a legacy carrier or an associated legacy carrier is notified as the parameter of an NCT.

In the case where the configuration of an NCT is notified, the UE may recognize that the configuration that is not notified is identical to the configuration of the legacy carrier or the associated legacy carrier. In the case where the system information of the NCT is notified, the UE may recognize that the system information that is not notified is identical to the system information of the legacy carrier or the associated legacy carrier.

Specific examples of the parameters having different values between the NCT and the legacy carrier include bandwidths. Specific examples of the parameter having the same value between the NCT and the legacy carrier include carrier frequencies.

Next, the following twelve (1) to (12) will be disclosed as specific examples of the parameters to be notified the UE as the configuration or the system information of the NCT. Differences from the system information in the traditional technique will be mainly described (see Non-Patent Document 2).

(1) A parameter for differentiating between a legacy carrier and an NCT, which is, for example, a parameter indicating a legacy carrier or an NCT. Addition of this parameter enables the UE that has received this parameter to differentiate between the operation for a legacy carrier and the operation for an NCT. The specific example (1) will be further described below.

3GPP is studying to reduce cell-specific reference signals (CRSs) of an NCT more than legacy carriers (see Non-Patent Document 11). The CRS has been traditionally used in measurement by the UE. The UE cannot accordingly perform accurate measurement if it cannot recognize that a measurement target is a legacy carrier or an NCT, leading to a problem of an inaccurate measurement in, for example, the comparison of the reception qualities between a legacy carrier and an NCT.

Addition of a parameter in the specific example (1) leads to such an effect that in the case where the NCT is a measurement target, the UE can employ a measurement method different from the traditional measurement method to accurately compare the reception qualities between the legacy carrier and the NCT. Specific examples of the measurement method different from a traditional measurement method include the method that involves changing how to take an average depending on the number of CRSs.

The parameter of the specific example (1) may be an indication that the measurement target is not an NCT or an indication that the measurement target is an NCT. In the specific example (1), it suffices to add a parameter to only the system information of the NCT newly added, and it is not necessary to add a parameter to the system information of a legacy carrier. In this respect, a communication system having excellent backward compatibility can be constructed.

(2) A cell identity of an NCT, which is, for example, PCI, CGI, or ECGI.

(3) Information on which cell a measurement target is associated with. For example, the information on an associated legacy carrier. Specific examples may include the carrier frequency of an associated legacy carrier and the cell identity of an associated legacy carrier. The specific example (3) will be further described below.

3GPP is studying to reduce P-SSs and S-SSs (see R1-121231 (hereinafter, referred to as "Non-Patent Document 15") by 3GPP). The P-SSs and S-SSs have been traditionally used by the UE in cell search. Thus, if the P-SSs and the S-SS are reduced by an NCT, the UE will have difficulty in cell search for the NCT in the traditional method.

As a result of the addition of the parameter of the specific example (3), the UE can obtain the information on an associated legacy carrier for the NCT to perform cell search for the NCT via the associated legacy carrier. As a specific example of the cell search for the NCT via an associated legacy carrier, for a synchronized NCT, for example, a frame boundary of the associated legacy carrier is conceivably employed. Specific examples of the employment may include configuring the frame boundary of the associated legacy carrier to be identical to the frame boundary of the NCT and providing an offset.

(4) A carrier frequency of an NCT. In the case of the specific example (4), the UE is not required to search for the carrier frequency of an NCT, reducing the time required for cell search by the UE. This reduces the power consumption of the UE and reduces a processing load.

(5) A bandwidth of an NCT.

(6) A method of transmitting reference signals (RSs) or method of transmitting measurement target signals. Specific examples include the number of transmissions of RSs in subframes and the bandwidth at which a CRS is transmitted. As described above, 3GPP is studying to reduce CRSs in the NCT more than the legacy carriers (see Non-Patent Document 11). As a result of the addition of parameters in the specific example (6), the UE can use the measurement method different from a traditional measurement method in the case where an NCT is a measurement target to compare the reception qualities between the legacy carrier and the NCT. Specific examples of the measurement method different from a traditional measurement method may include changing how to take an average depending on the number of CRSs.

(7) An index of an NCT. The index of an NCT may be associated with the identity of the NCT or with the carrier frequency of the NCT. The following two (7-1) and (7-2) will be disclosed as specific examples of the method of adding the index of an NCT.

(7-1) Indexes are added to the NCTs associated with an associated legacy carrier. Specifically, indexes are added so as not to coincide with each other between the NCTs associated with an associated legacy carrier. As a result, the transmission and reception of indexes of NCTs allows the UE and the network to identify the NCT associated with an associated legacy carrier. Serial numbers are added as indexes. Specifically, serial numbers are provided for NCTs together with the associated legacy carrier. Alternatively, serial numbers are provided for the NCTs excluding an associated legacy carrier.

(7-2) Indexes are added to the NCTs to be notified the UE. Specifically, indexes are added so as not to coincide with each other between the NCTs to be notified the UE. As a result, the transmission and reception of indexes of the NCTs allows the UE and the network to identify the NCT to be notified the UE. Alternatively, indexes may be added so as not to coincide with each other between the NCT to be notified the UE and the SCell.

Serial numbers are added as indexes. Specifically, they are the serial numbers for the NCTs to be notified a UE or the serial numbers for the NCTs to be notified the UE and the SCell. Serial numbers are provided to the NCTs and the SCell, allowing for the use of SCellIndex of the traditional technique (see Chapter 6.3.4 of Non-Patent Document 2).

The specific example (7-2) can use a traditional technique, preventing a communication system from becoming complicated. In the specific example (7-2), a parameter indicating a legacy carrier or an NCT to SCellIndex of the traditional technique. The parameter of the specific example (7-2) may be an indication that the carrier is not an NCT, or an indication that the carrier is an NCT.

(8) Location information of the place in which an NCT point is installed. The use of the parameter of the specific example (8) allows the network to obtain the location information on the NCT via the UE. In the case where the parameter of the specific example (8) is used, for example, the eNB requests the location information on the NCT point from the UE. The UE that has received the request receives the parameter "location information on the place in which an NCT point is installed," and notifies the eNB of the location information on the place in which the NCT point is installed. In the case where the NCT point is configured by a movable entity, a great advantage is achieved by allowing the network to obtain the location information on an NCT via the UE without using communication such as communication between base stations. This is because the communication such as communication between base stations is not required every time an entity moves. Specific examples of the movable entity configuring an NCT point include a HeNB, a movable RN, and a movable RRH.

(9) Information indicating synchronization or non-synchronization. In the case of synchronization, a legacy carrier to be synchronized may be notified. The use of the parameter of the specific example (9) allows the UE to recognize the method of detecting an NCT, the method of tracking an NCT, the method of measuring an NCT, and other method.

(10) Uplink information on an NCT. Specific examples of the uplink information include a carrier frequency of an uplink carrier for link with an NCT, a bandwidth, and a parameter for differentiating between a legacy carrier and an NCT. If the uplink information on an NCT is similar to that of the uplink of an associated legacy carrier, the information indicating the similarity is sufficient.

(11) Information on a TAG to which an NCT belongs. In the case where the period of TA applied to an NCT expires or a timer expires, the UE may transmit a RACH in an uplink carrier for link with the legacy carrier belonging to the same TAG. Alternatively, the UE may transmit a random access preamble. The UE may newly receive a TA value as a response to the RACH, using the legacy carrier. The UE may receive a random access response in the legacy carrier and then receive a new TA value. The UE may employ the TA value received in the legacy carrier for an NCT. This employment is enabled by the UE recognizing the TAG to which an NCT belongs and recognizing the legacy carrier whose TAG is the same as that of the UE. This eliminates the need for transmitting a RACH in an uplink carrier for link with an NCT. That is, it is not necessary to configure an uplink carrier for link with an NCT for only transmitting a RACH. This improves frequency utilization efficiency.

(12) Combination of (1) to (11) above.

As an example, the parameter for differentiating between a legacy carrier and an NCT in the specific example (1) and the information on which cell a carrier is associated with in the specific example (3) can be notified in combination to achieve the following effect. 3GPP is studying to reduce cell-specific reference signals (CRSs) in an NCT more than a legacy carrier (see Non-Patent Document 11). The CRS has traditionally been used by a UE in measurement. For example, in the case where a measurement target is an NCT, the UE can employ the measurement results of the associated legacy carrier.

As another example, the information on which cell a carrier is associated with in the specific example (3), the carrier frequency of an NCT in the specific example (4), and the information indicating synchronization or non-synchronization in the specific example (9) can be notified in combination to achieve the following effect. The cell search of an NCT via an associated legacy carrier can be performed more reliably. As a specific example of the cell search of an NCT via an associated legacy carrier for a synchronized NCT, it is conceivable to employ, for example, a frame boundary of the associated legacy carrier. For example, 3GPP has proposed that a UE should be notified of an NCT carrier but has not disclosed, for example, a combination of parameters as described in this modification (R2-122180 (hereinafter, referred to as "Non-Patent Document 22") by 3GPP). Therefore, an associated legacy carrier is unclear and it is difficult to judge whether or not the NCT is synchronized from the description disclosed in Non-Patent Document 22. This does not allow the UE to accurately perform cell search of an NCT via an associated legacy carrier.

As another example, the method of transmitting RSs in the specific example (6) and the bandwidth of an NCT in the specific example (5) can be notified in combination to achieve the following effects. The UE can recognize the bandwidth of an NCT and the bandwidth at which an RS is transmitted by a specific method of transmitting an RS, thereby recognizing, for example, a ratio between the bandwidth at which an RS is transmitted and the bandwidth of an NCT. This allows the UE to accurately estimate a radio environment. For example, 3GPP has proposed that the RS configuration should be notified but has not disclosed, for example, the combination of parameters as described in this modification (see Non-Patent Document 19). Thus, for example, the ratio between the bandwidth at which an RS is transmitted and the bandwidth of an NCT cannot be recognized from the description detailed in Non-Patent Document 19.

The combination of the parameters of the specific examples (1) to (11) is not limited to the examples described above. Notification of the combination of the parameters of (1) to (11) above allows for more efficient operation of the communication systems of Release 11 and the following releases, in which legacy carriers and NCTs coexist.

Specific examples of the entity that configures an NCT for the UE will now be described. The associated legacy carrier configures an NCT for the UE. The configuration for the UE may be performed per UE, for a UE being served, or for a UE being served in an RRC_CONNECTED state.

The following four (1) to (4) will be disclosed as specific examples of the entity that configures an NCT for the UE particularly in the case where an associated legacy carrier is configured as the SCell in CA.

(1) The PCell judges whether or not to configure an NCT for the UE. When configuring an NCT, the PCell requests the associated legacy carrier being an SCell to configure an NCT. The associated legacy carrier being an SCell configures an NCT for the UE. The PCell judges whether or not to configure an NCT for the UE, so that a data throughput or the like as the entire communication system using a PCell, an Sell, and an NCT associated with an Sell for the UE can be readily taken into consideration.

(2) The PCell judges whether or not to configure an NCT for the UE. When configuring an NCT, the PCell configures an NCT for the UE. The PCell may configure an SCell (SCell Configuration) and may also configure an NCT. The configuration area of the NCT may be added to the existing signaling for SCell configuration.

In the case where the configuration area of an NCT is added to the existing signaling for SCell configuration, signaling does not need to be newly added for NCT configuration, preventing the communication system from becoming complicated. Specific examples of the existing signaling for SCell configuration include "radioResourceConfigDedicatedSCell" and "PhysicalConfigDedicatedSCell" (see Non-Patent Document 2).

In the specific example (2), the PCell configures an NCT, and accordingly, the PCell alone configures a carrier for the UE, such as configuring an SCell and configuring an NCT. This reduces the processing load of the UE. In the specific example (2), the PCell judges whether or not to configure an NCT as in the specific example (1), achieving an effect similar to that of the specific example (1).

(3) The SCell being an associated legacy carrier judges whether or not to configure an NCT for the UE. When configuring an NCT, the SCell configures an NCT for the UE. The SCell being an associated legacy carrier judges whether or not to configure an NCT, so that the processing load, the radio environment, or the like of the associated legacy carrier can be readily taken into consideration.

(4) The SCell being an associated legacy carrier judges whether or not to configure an NCT for the UE. When configuring an NCT, the SCell requests the PCell to configure an NCT. The PCell configures an NCT for the UE. The PCell may configure an NCT for the UE using the existing signaling for SCell configuration. The configuration area of an NCT may be added to the existing signaling for SCell configuration.

In the case where the configuration area of an NCT is added to the existing signaling for SCell configuration, signaling does not need to be newly added for the configuration of an NCT, preventing the communication system from becoming complicated. Specific examples of the existing signaling for SCell configuration include "radioResourceConfigDedicatedSCell" and "PhysicalConfigDedicatedSCell" (see Non-Patent Document 2).

In the specific example (4), the PCell configures an NCT for the UE, and accordingly, the PCell alone configures a carrier for the UE, such as configuring an SCell and configuring an NCT. This leads to an effect that the processing load of the UE can be reduced. In the specific example (4), the SCell judges whether or not to configure an NCT as in the specific example (3), achieving an effect similar to that of the specific example (3).

Figure 17:
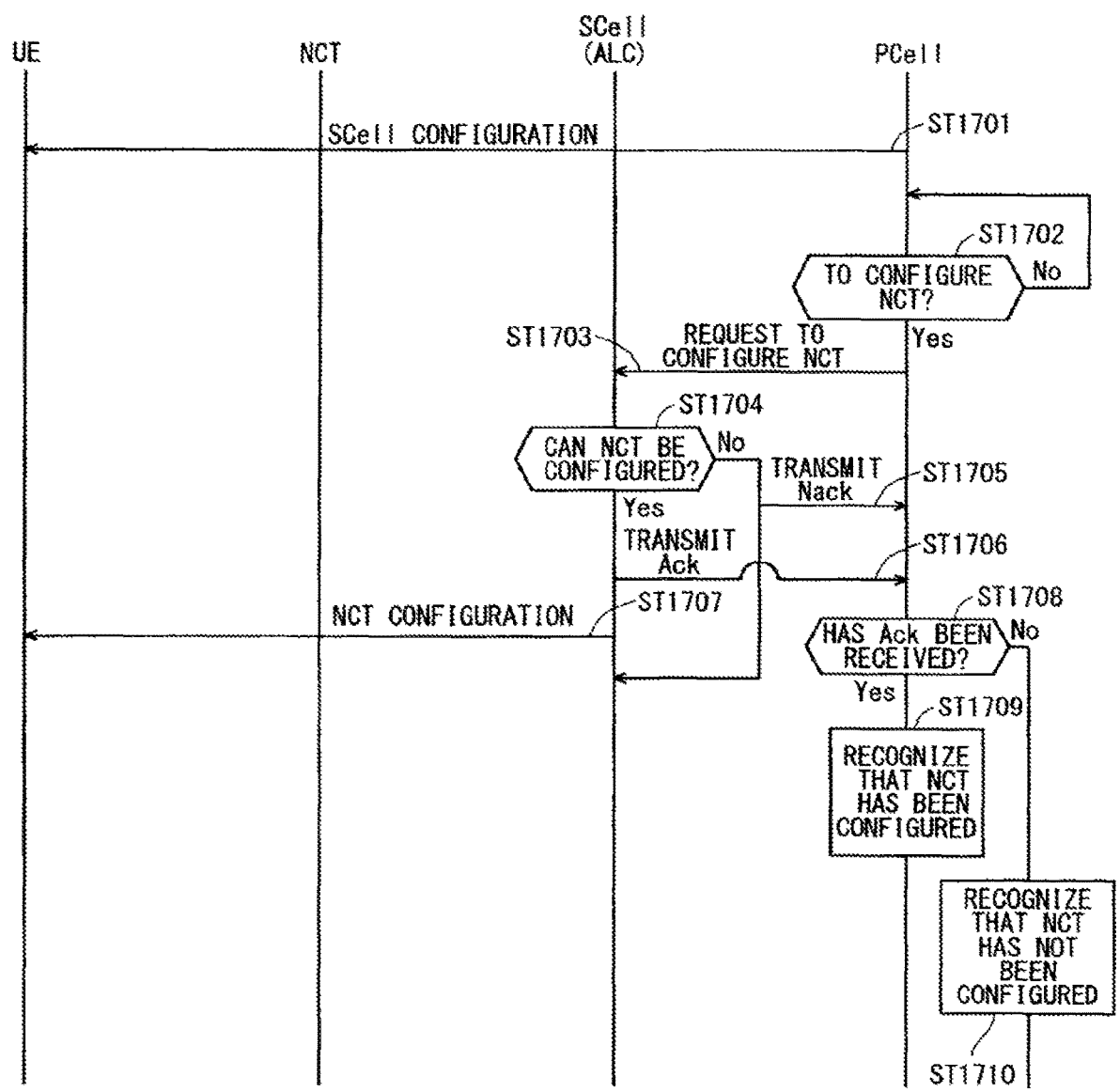
FIG. 17 shows an example sequence in a case where a specific example (1) is used as an entity that configures an NCT for a UE in a communication system according to a second modification of the first embodiment of the present invention.

FIG. 17 shows an example sequence in the case where the specific example (1) is used as the entity that configures an NCT for the UE in the communication system according to the second modification of the first embodiment of the present invention. The sequence shown in FIG. 17 is the sequence in the case where an associated legacy carrier is configured as the SCell in CA.

In Step ST1701, the PCell configures an SCell (hereinafter, merely referred to as "SCell") being an associated legacy carrier (ALC) for the UE.

In Step ST1702, the PCell judges whether or not to configure an NCT associated with the SCell. The PCell moves to Step ST1703 when judging to configure an NCT in Step ST1702 or repeats the process of Step ST1702 when judging not to configure an NCT in Step ST1702.

In Step ST1703, the PCell requests the SCell to configure an NCT. In Step ST1703, the PCell may notify the SCell of the identity of the UE being a configuration target in addition to requesting the SCell to configure an NCT.

In Step ST1704, the SCell, which has received a request to configure an NCT transmitted from the PCell in Step ST1703, judges whether or not the NCT can be configured. In this judgment, the SCell may take into consideration the processing load of the own cell, radio environment, or the like. The SCell moves to Step ST1705 when judging that an NCT cannot be configured in Step ST1704 or moves to Step ST1706 when judging that an NCT can be configured in Step ST1704.

In Step ST1705, the SCell notifies the PCell that an NCT cannot be configured. Specifically, the SCell transmits "Nack" to the PCell.

In Step ST1706, the SCell notifies the PCell that an NCT can be configured. Specifically, the SCell transmits "Ack" to the PCell.

When judging that an NCT can be configured in Step ST1704, in Step ST1707, the SCell notifies the UE of the configuration of the NCT.

In Step ST1708, the PCell judges whether it has received, from the SCell, "Ack" as a response to the request to configure an NCT. The PCell moves to Step ST1709 when judging that it has received "Ack" in Step ST1.708 or moves to Step ST1710 when judging that it has not received "Ack" in Step ST1708.

In Step ST1709, the PCell recognizes that an NCT has been configured for the UE.

In Step ST1710, the PCell recognizes that an NCT has not been configured for the UE, that is, an NCT has not been configured.

Figure 18:
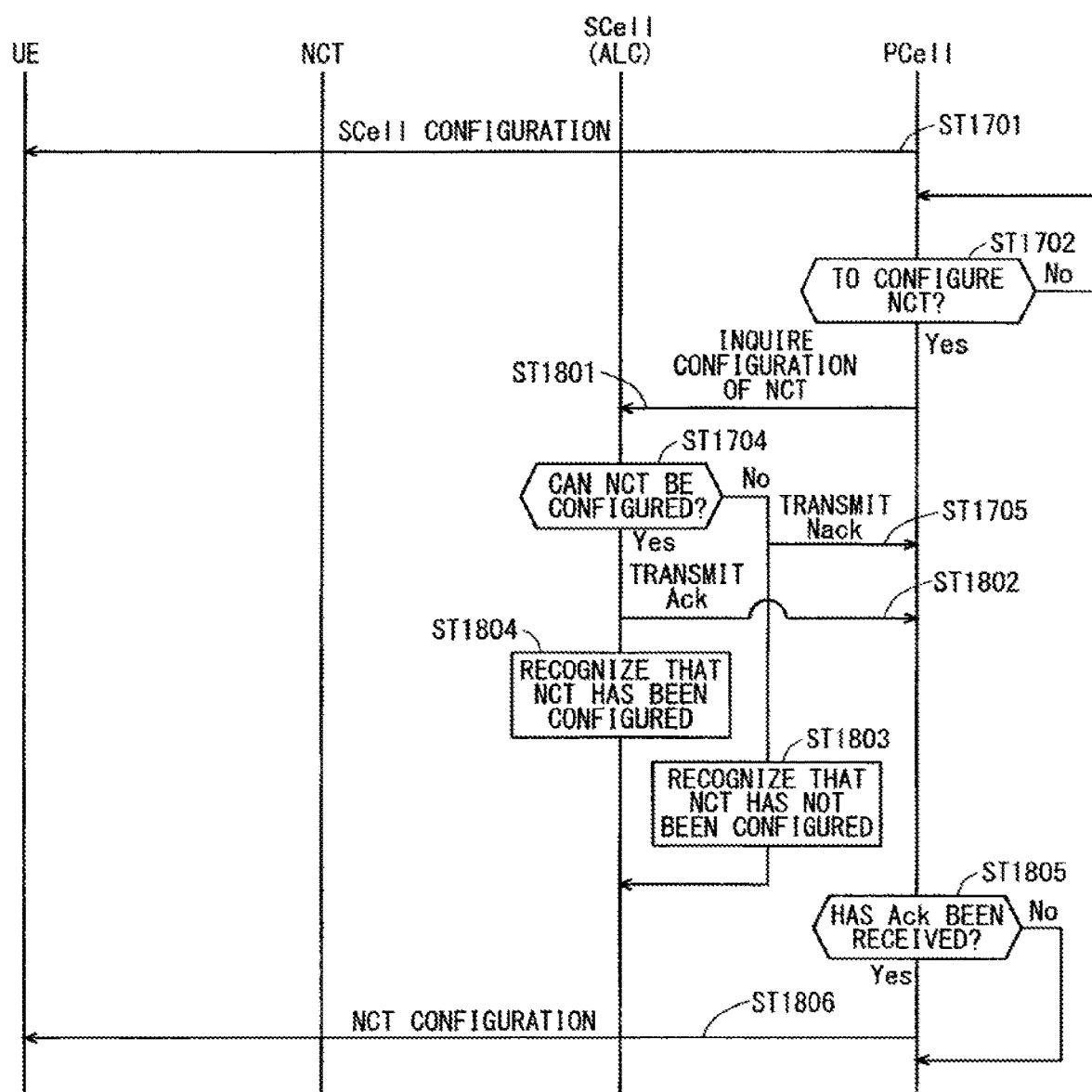
FIG. 18 shows an example sequence in a case where a specific example (2) is used as the entity that configures an NCT for a UE in the communication system according to the second modification of the first embodiment of the present invention.

FIG. 18 shows an example sequence in the case where the specific example (2) is used as the entity that configures an NCT for the UE in the communication system according to the second modification of the first embodiment of the present invention. The sequence shown in FIG. 18 is the sequence in the case where an associated legacy carrier is configured as the SCell in CA. The sequence shown in FIG. 18 is similar to the sequence shown in FIG. 17, and thus, the same steps will be denoted by the same step numbers and common description will be omitted.

In the specific example (2), when judging to configure an NCT associated with an SCell in Step ST1702, the PCell moves to Step ST1801. In Step ST1801, the PCell inquires the configuration of the NCT from the SCell. In Step ST1801, the PCell may notify the SCell of the identity of the UE being a configuration target in addition to inquiring the configuration of the NCT.

In the specific example (2), when judging that an NCT can be configured in Step ST1704, the SCell moves to Step ST1802. In Step ST1802, the SCell notifies the PCell that the NCT can be configured. Specifically, the SCell transmits "Ack" to the PCell. In this case, the SCell being an associated legacy carrier (ALC) may notify the PCell of the configuration of the NCT. It may not be necessary to notify the configuration of the NCT if the PCell is the entity that stores the configuration of the NCT.

After the process of Step ST1802, the SCell moves to Step ST1804. In Step ST1804, the SCell recognizes that the NCT has been configured for the UE.

In the specific example (2), when judging that an NCT cannot be configured in Step ST1704, the SCell performs the process of Step ST1705 and then moves to Step ST1803. In Step ST1803, the SCell recognizes that the NCT has not been configured for the UE, that is, the NCT has not been configured.

In Step ST1805, the PCell judges whether or not to have received "Ack" from the SCell as a response to the inquiry about the configuration of the NCT. The PCell moves to Step ST1806 when judging to have received "Ack" in Step ST1805 or ends the process when judging to not have received "Ack" in Step ST1805.

In Step ST1806, the PCell notifies the UE of the configuration of the NCT. In the case the SCell notifies the PCell of the configuration of the NCT in Step ST1802, the PCell may perform the configuration of the NCT, which has been received from the SCell in Step ST1802, for the UE in Step ST1806.

Figure 19:
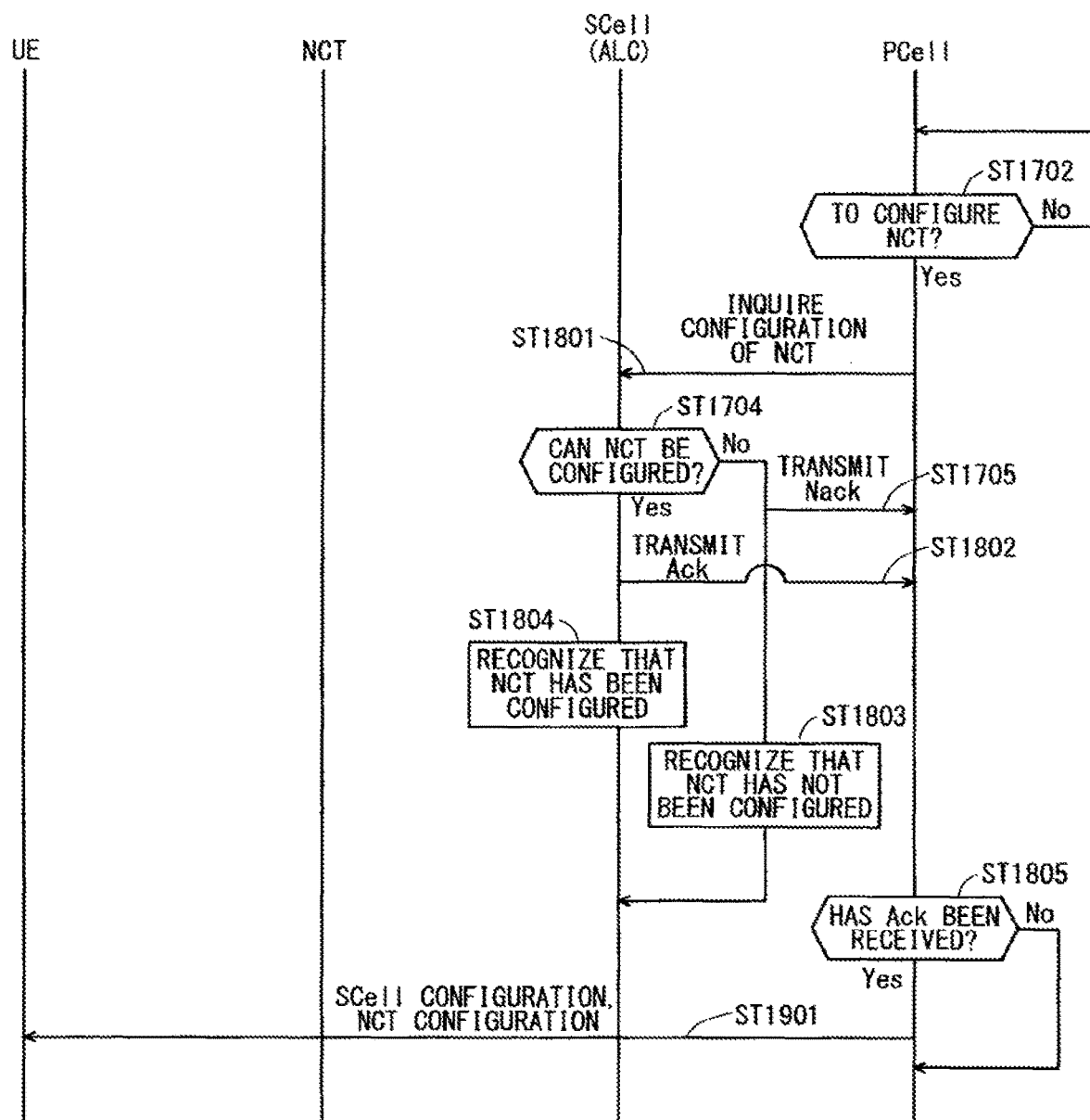
FIG. 19 shows an example sequence in the case where the specific example (2) is used as the entity that configures an NCT for a UE in the communication system according to the second modification of the first embodiment of the present invention.

FIG. 19 shows an example sequence in the case where the specific example (2) is used as the entity that configures an NCT for the UE in the communication system according to the second modification of the first embodiment of the present invention. The sequence shown in FIG. 19 is the sequence in the case where an associated legacy carrier is configured as the SCell in CA. FIG. 19 shows the sequence in the case of configuring an NCT in addition to configuring an SCell in the specific example (2) of the entity that configures an NCT for the UE. The sequence shown in FIG. 19 is similar to the sequences shown in FIGS. 17 and 18, and thus, the same steps will be denoted by the same step numbers and common description will be omitted.

In the example shown in FIG. 19, the PCell makes judgment in Step ST1702 before configuring an SCell being an associated legacy carrier (ALC). After that, the communication system performs the following processes of Steps ST1801 to ST1804.

When judging to have received "Ack" in Step ST1805, in Step ST1901, the PCell configures an SCell as well as configuring an NCT for the UE. The PCell may notify the configuration of the SCell including the configuration of an NCT. In the case where the SCell notifies the PCell of the configuration of an NCT in Step ST1802, the PCell may perform the configuration of an NCT received from the SCell in Step ST1802 for the UE in the Step ST1901.

FIG. 20 shows an example sequence in the case where the specific example (3) is used as the entity that configures an NCT for the UE in the communication system according to the second modification of the first embodiment of the present invention. The sequence shown in FIG. 20 is the sequence in the case where an associated legacy carrier is configured as the SCell in CA. The sequence shown in FIG. 20 is similar to the sequence shown in FIG. 17, and thus, the same steps will be denoted by the same step numbers and common description will be omitted.

In the example shown in FIG. 20, after the process of Step ST1701, in Step ST2001, the SCell judges whether or not to configure an NCT. The SCell moves to Step ST2002 when judging to configure an NCT in Step ST2001 or repeats the process of Step ST2001 when judging not to configure an NCT in Step ST2001.

In Step ST2002, the SCell reports to the PCell that it will configure an NCT. Specifically, the SCell transmits to the PCell the report indicating the configuration of an NCT, which is the information indicating that the SCell will configure an NCT. In the report indicating the configuration of an NCT, the SCell may also notify the PCell of the identity of the UE for which an NCT has been configured, the system information of the configured NCT, or the like.

In Step ST2003, the PCell that has received the report indicating the configuration of an NCT in Step ST2002 recognizes that an NCT has been configured for the UE.

When judging to configure an NCT in Step ST2001, in Step ST2004, the SCell notifies the UE of the configuration of an NCT.

FIG. 21 shows an example sequence in the case where the specific example (4) is used as the entity that configures an NCT for the UE in the communication system according to the second modification of the first embodiment of the present invention. The sequence shown in FIG. 21 is the sequence in the case where an associated legacy carrier is configured as the SCell in CA. The sequence shown in FIG. 21 is similar to the sequences shown in FIGS. 17 and 20, and thus, the same steps will be denoted by the same step numbers and common description will be omitted.

In the example shown in FIG. 21, when judging to configure an NCT in Step 2001, the SCell moves to Step ST2101. In Step ST2101, the SCell requests the PCell to configure an NCT. Specifically, at this time, NCT the SCell being an associated legacy carrier (ALC) may notify the PCell of the identity of the UE being a configuration target and the configuration of an NCT. If the PCell is the entity that stores the configuration of the NCT, it may not be necessary to notify the configuration of an NCT.

When judging to configure an NCT in Step ST2001, the SCell recognizes that an NCT has been configured for the UE in Step ST2102.

In Step ST2103, the PCell, which has received the request to configure an NOT in Step ST2101, notifies the UE being a target for which an NCT is configured in the request to configure an NCT (hereinafter, also referred to as an "NCT configuration target") that an NCT will be configured. In the case where the configuration of an NCT is notified the PCell from the SCell together with the request to configure an NCT in Step ST2101, in Step ST2103, the PCell may perform the configuration of the NCT received from the SCell in Step ST2101 for the UE being an NCT configuration target for the request to configure an NCT received from the SCell in Step ST2101.

The second modification of the first embodiment may be used in combination with the first embodiment or the first modification of the first embodiment described above.

The second modification of the first embodiment described above can achieve the following effects. This modification has disclosed when an associated legacy carrier is determined, allowing the communication systems of Release 11 and the following releases in which legacy carriers and NCTs coexist to be operated uniformly and normally.

In this modification, the information indicating whether or not there is an NCT that takes, as an associated legacy carrier, an SCell to be notified the UE from the PCell may be added to the configuration of the SCell (SCell configuration). Alternatively, the configuration of an NCT disclosed in the second modification of the first embodiment may be added.

This achieves such an effect that the UE that has received the configuration of the SCell can operate differently for the legacy carrier associated with an NCT and the legacy carrier not associated with an NCT.

Third Modification of First Embodiment

The third modification of the first embodiment will disclose another solution to the problem in the second modification of the first embodiment. The solution in the third modification of the first embodiment will be described below. Differences from the solution in the second modification of the first embodiment will be mainly described. The parts that will not be described below are similar to those of the second modification of the first embodiment.

In the third modification of the first embodiment, not limited to the case where an NCT point is determined, an associated legacy carrier for the NCT is determined in a semi-static or dynamic manner. Alternatively, the associated legacy carrier during the operation of the NCT point is made changeable. As the method of determining an associated legacy carrier for an NCT, which is an initial value, the methods described in, for example, the first embodiment and the first modification of the first embodiment may be used. Specific examples in which an initial value is set include the case where an NCT point is configured and the case where an NCT point starts operating.

The following two (1) and (2) will be disclosed as the specific examples of the range in which an associated legacy carrier for an NCT is determined in a semi-static or dynamic manner.

(1) The associated legacy carrier for an NCT is determined per UE. The associated legacy carrier for the NCT may differ from UE to UE that transmits and receives data using the NCT.

(2) The associated legacy carrier for an NCT is determined per NCT. The associated legacy carrier for the NCT is the same between the UEs that transmit and receive data using the NCT.

The following three (1) to (3) will be disclosed as specific examples of the method of determining an associated legacy carrier for an NCT in a semi-static or dynamic manner.

(1) The associated legacy carrier for an NCT is determined depending on the radio environment of an associated legacy carrier. It is conceivable that the radio environment of an associated legacy carrier may change depending on the location of a UE. Thus, the determination method of the specific example (1) is highly compatible with the specific example (1) of the range in which the associated legacy carrier for an NCT is determined in a semi-static or dynamic manner.

(2) The associated legacy carrier for an NCT is determined depending on the load status of an associated legacy carrier. It is conceivable that the load status of an associated legacy carrier does not change per UE. Thus, the determination method of the specific example (2) is highly compatible with the specific example (2) of the range in which the associated legacy carrier for an NCT is determined in a semi-static or dynamic manner described above.

(3) Combination of the determination method of the specific example (1) and the determination method of the specific example (2).

Specific description will be given of the determination method depending on the radio environment of an associated legacy carrier, which is the specific example (I) of the method of determining an associated legacy carrier for an NCT in a semi-static or dynamic manner. The associated legacy carrier for an NCT is determined per UE depending on the radio environment of an associated legacy carrier. The radio environment of an associated legacy carrier differs depending on the location of a UE. Therefore, determining the associated legacy carrier for an NCT per UE allows a legacy carrier optimum for each UE to be configured as the associated legacy carrier for an NCT.

The associated legacy carrier judges whether or not to change an associated legacy carrier based on the UE measurement results. The following two (1) and (2) will be disclosed as specific examples of the judgment.

(1) For the reception quality of an associated legacy carrier lower than a predetermined threshold, the associated legacy carrier is changed. Contrastingly, for the reception quality of an associated legacy carrier equal to or higher than a predetermined threshold, the associated legacy carrier is not changed.

(2) In the presence of a legacy carrier having a reception quality better than that of an associated legacy carrier, the associated legacy carrier is changed. Contrastingly, in the absence of a legacy carrier having a reception quality better than that of an associated legacy carrier, the associated legacy carrier is not changed.

The associated legacy carrier determines a new associated legacy carrier (hereinafter, also referred to as a "target legacy carrier") based on the UE measurement results. Hereinafter, an associated legacy carrier before change may be referred to as a "source legacy carrier." A specific example of the method of determining a target legacy carrier will be disclosed below. The legacy carrier having the best reception quality is taken as a target legacy carrier.

The source legacy carrier may notify the target legacy carrier of a request indicating that the target legacy carrier will serve as an associated legacy carrier for a target NCT (hereinafter, also referred to as an "associated legacy carrier change (ALC) request). At that time, the source legacy carrier may notify the target legacy carrier of the configuration of the NCT, specifically, the information required for the UE to receive an NCT or the system information of an NCT. A specific example of the system information of an NCT is similar to that of the second modification of the first embodiment, which will not be described here.

In the notification of an associated legacy carrier change request, the existing signaling "Handover Request" (see TS 36.423 V11.1.0 (hereinafter, referred to as "Non-Patent Document 16") by 3GPP) or "Handover Required" (see Chapter 8.4.1 of TS 36.413 V11.0.0 (hereinafter, referred to as "Non-Patent Document 17") 3GPP) may be used. "Handover Request" is notified the target eNB from the source eNB by means of an X2 interface, "Handover Required" is notified the MME from the source eNB by means of an S1 interface.

The method of notifying an associated legacy carder change request described above may be used not only in the case where the source legacy carrier and the target legacy carrier are configured in different eNBs but also in the case where the source legacy carrier and the target legacy carrier are configured in the same eNB. This allows the methods of notifying an associated legacy carrier change request to be unified irrespective of the configuration of the eNB, preventing the communication system from becoming complicated.

In the case where an associated legacy carrier change request is notified by means of an S1 interface, a notification may be made in the order of the source legacy carrier, the MME that controls the source legacy carrier, the MME that controls the target legacy carrier, and the target legacy carrier.

In this case, the existing signaling may be provided with an indicator indicating an "associated legacy carrier change request." In addition, an area of the system information of an NCT may be added to the existing signaling. This eliminates the need for adding new signaling, allowing for easy construction of a communication system. Further, a communication system having excellent backward compatibility can be constructed.

The target legacy carrier that has received an associated legacy carrier change request may judge whether or not to serve as the associated legacy carrier for the NCT. The target legacy carrier may judge whether or not to serve as the associated legacy carrier for the NCT in consideration of the processing load of the legacy carrier.

The target legacy carrier may notify the source legacy carrier of the judgment results on whether or not to serve as the associated legacy carrier for the NCT. In such a case, the target legacy carrier may notify the source legacy carrier of the configuration of the NCT, for example, the information required for a UE to receive a target legacy carrier or the system information of a target legacy carrier.

In the notification of the judgment results on whether or not the target legacy carrier will serve as the associated legacy carrier for the NCT, the existing signaling "Handover Request Acknowledge" (see Chapter 8.2.1 of Non-Patent Document 16) or "Handover Command" (see Chapter 8.4.1 of Non-Patent Document 17) may be used. "Handover Request Acknowledge" may be notified the source eNB from the target eNB by means of an X2 interface. "Handover Command" is notified the MME from the target eNB by means of an S1 interface.

The method of notifying the judgment results on whether or not the target legacy carrier serves as the associated legacy carrier for an NCT may be used not only in the case where the source legacy carrier and the target legacy carrier are configured in different eNBs but also in the case where the source legacy carrier and the target legacy carrier are configured in the same eNB. This allows the methods of notifying the judgment results on whether or not the target legacy carrier serves as the associated legacy carrier for an NCT to be unified irrespective of the configuration of an eNB, preventing a communication system from becoming complicated.

In the case where the judgment results on whether or not the target legacy carrier serves as the associated legacy carrier for an NCT are notified by means of an S1 interface, a notification may be made in the order of the target legacy carrier, the MME that controls the target legacy carrier, the MME that controls the source legacy carrier, and the source legacy carrier.

In this case, the existing signaling may be provided with the indicator indicating the "judgment results on whether or not the target legacy carrier serves as the associated legacy carrier for an NCT." This eliminates the need for adding new signaling, allowing for easy construction of a communication system. Further, a communication system having excellent backward compatibility can be constructed.

The source legacy carrier notifies a target UE that it will change the associated legacy carrier. At that time, the source legacy carrier may notify the target UE of the system information of the target legacy carrier, which has been received from the target legacy carrier. In this case, when an associated legacy carrier is changed, the UE does not need to obtain the system information of the target legacy carrier from the target legacy carrier, allowing the associated legacy carrier to be changed smoothly.

The existing signaling "RRCConnectionReconfiguration message" or "mobilityControlInformation" (see Chapter 1.2.1 of Non-Patent Document 1) may be used to notify that an associated legacy carrier will be changed. "RRCConnectionReconfiguration message" and "mobilityControlInformation" are notified the UE from the source eNB.

The above-mentioned method of notifying an indication that an associated legacy carrier will be changed may be used not only in the case where the source legacy carrier and the target legacy carrier are configured in different eNBs but also in the case where the source legacy carrier and the target legacy carrier are configured in the same eNB. This allows the methods of notifying that an associated legacy carrier will be changed to be unified irrespective of the configuration of an eNB, preventing a communication system from becoming complicated.

In the case where the existing signaling is used to notify that an associated legacy carrier will be changed, the existing signaling may be provided with an indicator indicating that "an associated legacy carrier will be changed." This eliminates the need for adding new signaling, allowing for easy construction of a communication system. Further, a communication system having excellent backward compatibility can be constructed.

The source legacy carrier notifies a target NCT that it will change an associated legacy carrier. At that time, the source legacy carrier may notify a target NCT of the system information of the target legacy carrier, which has been received from the target legacy carrier.

The UE, which has been notified that an associated legacy carrier will be changed, changes the associated legacy carrier for the target NCT. When changing an associated legacy carrier, the UE may use the system information of the target legacy carrier received from the source legacy carrier. The following two (1) and (2) will be disclosed as specific examples of changing a legacy carrier.

(1) The legacy carrier, which is monitored for receiving the scheduling of the PDSCH of the target NCT, is changed from the source legacy carrier to the target legacy carrier.

(2) The carrier, which is synchronized with a target NCT, is changed from the source legacy carrier to the target legacy carrier.

As the method of determining an associated legacy carrier, the non-synchronized NCT may use the method of determining an associated legacy carrier according to the radio environment of the associated legacy carrier, which is the specific example (1) of the method of determining an associated legacy carrier in a semi-static or dynamic manner. As the method of determining an associated legacy carrier, the synchronized NCT may avoid using the method of determining an associated legacy carrier according to the radio environment of the associated legacy carrier, which is the specific example (1) of the method of determining an associated legacy carrier in a semi-static or dynamic manner.

The synchronized NCT and its associated legacy carrier are conceivably similar to each other in the radio environment for the UE. Thus, in the case where an associated legacy carrier is to be changed due to a poor radio environment of the associated legacy carrier, the radio environment of the NCT per se may become poor, leading to a fear that the communication with the UE using an NCT may not be allowed. Thus, for a synchronized NCT, the use of the method of determining an associated legacy carrier according to the radio environment of the associated legacy carrier in the specific example (1) may be avoided as the method of determining an associated legacy carrier, as described above.

In contrast, it is conceivable that a non-synchronized NCT and its associated legacy carrier are not necessarily similar to each other in the radio environment for the UE, Thus, even in the case where an associated legacy carrier is to be changed due to a poor radio environment of the associated legacy carrier, the communication with the UE using an NCT may be allowed. Thus, for a non-synchronized NCT, the method of determining an associated legacy carrier according to the radio environment of the associated legacy carrier may be used as the method of determining an associated legacy carrier, as described above.

Description will now be given of the method of determining a legacy carrier to be associated with the NCT according to the load status of an associated legacy carrier, which is the specific example (2) of the method of determining an associated legacy carrier in a semi-static manner or dynamic manner described above. Examples of the load status include the load status of a MAC, the load status of an RRC, and the load status of scheduling.

The associated legacy carrier judges whether or not to change an associated legacy carrier based on a load status. A specific example of the judgment will be disclosed below. In the case where the load of the associated legacy carrier is higher than a predetermined threshold, the associated legacy carrier is changed. In the case where the load of an associated legacy carrier is the same as or lower than a predetermined threshold, the associated legacy carrier is not changed.

The associated legacy carrier determines a target carrier being a new associated legacy carrier based on the load status of a neighbor legacy carrier. The following two (1) and (2) will be disclosed as specific examples of the method of determining a target legacy carrier.

(1) A target legacy carrier is selected from legacy carriers that can be associated with an NCT.

(2) A legacy carrier with the lowest load status is taken as the target legacy carrier.

The following two (1) and (2) will be disclosed as specific examples of the method of obtaining the load status of a legacy carrier in the neighborhood of the source legacy carrier being an associated legacy carrier before change.

(1) The source legacy carrier requests a neighbor base station or a neighbor legacy carrier to report its load status. Alternatively, when judging to change an associated legacy carrier, the source legacy carrier may request to report a load status. The source legacy carrier notifies the request to report a load status, thereby requesting a report of a load status. The neighbor base station or the neighbor legacy carrier that has received the request to report a load status reports the load status to the source legacy carrier.

"Resource Status Request" (see Chapter 83.6.2 of Non-Patent Document 16) that is notified by means of an X2 interface being the existing signaling may be used in the notification of the request to report a load status. "Resource Status Request" is notified by means of an X2 interface. In the use of "Resource Status Request," the existing signaling may be provided with an indicator that requests the "load status," for example, the "load status of a MAC," the "load status of an RRC," or the "load status of scheduling." This eliminates the need for adding new signaling, allowing for easy construction of a communication system. Further, a communication system having excellent backward compatibility can be constructed.

"Resource Status Response" (see Chapter 8.3.6.2 of Non-Patent Document 16) being the existing signaling may be used in the notification of the report of a load status. "Resource Status Response" may be notified by means of an X2 interface. In the use of "Resource Status Response," the existing signaling may be provided with the "load status," for example, the "load status of a MAC," the "load status of an RRC," or the "load status of scheduling." This eliminates the need for adding new signaling, allowing for easy construction of a communication system. Further, a communication system having excellent backward compatibility can be constructed.

(2) The base station or legacy carrier reports the load status to a neighbor base station or legacy carrier. The base station may report the load status periodically. "Resource Status Response" (see Chapter 8.3.6.2 of Non-Patent Document 16) being the existing signaling may be used in the notification of a report of a load status. "Resource Status Response" is notified by means of an X2 interface.

In the use of "Resource Status Response," the existing signaling may be provided with the indicator requesting the "load status," for example, the "load status of a MAC," the "load status of an RRC," or the "load status of scheduling." In such a case, a change is made such that the existing signaling can transmit "Resource Status Response" without receiving "Resource Status Request." This eliminates the need for adding new signaling, allowing for easy construction of a communication system. Further, a communication system having excellent backward compatibility can be constructed.

The processes after a new associated legacy carrier is determined can be performed as in the method of determining an associated legacy carrier according to the radio environment of the associated legacy carrier, which is the specific example (1) of the method of determining an associated legacy carrier in a semi-static or dynamic manner as described above. Thus, description thereof will not be given.

Figure 22:
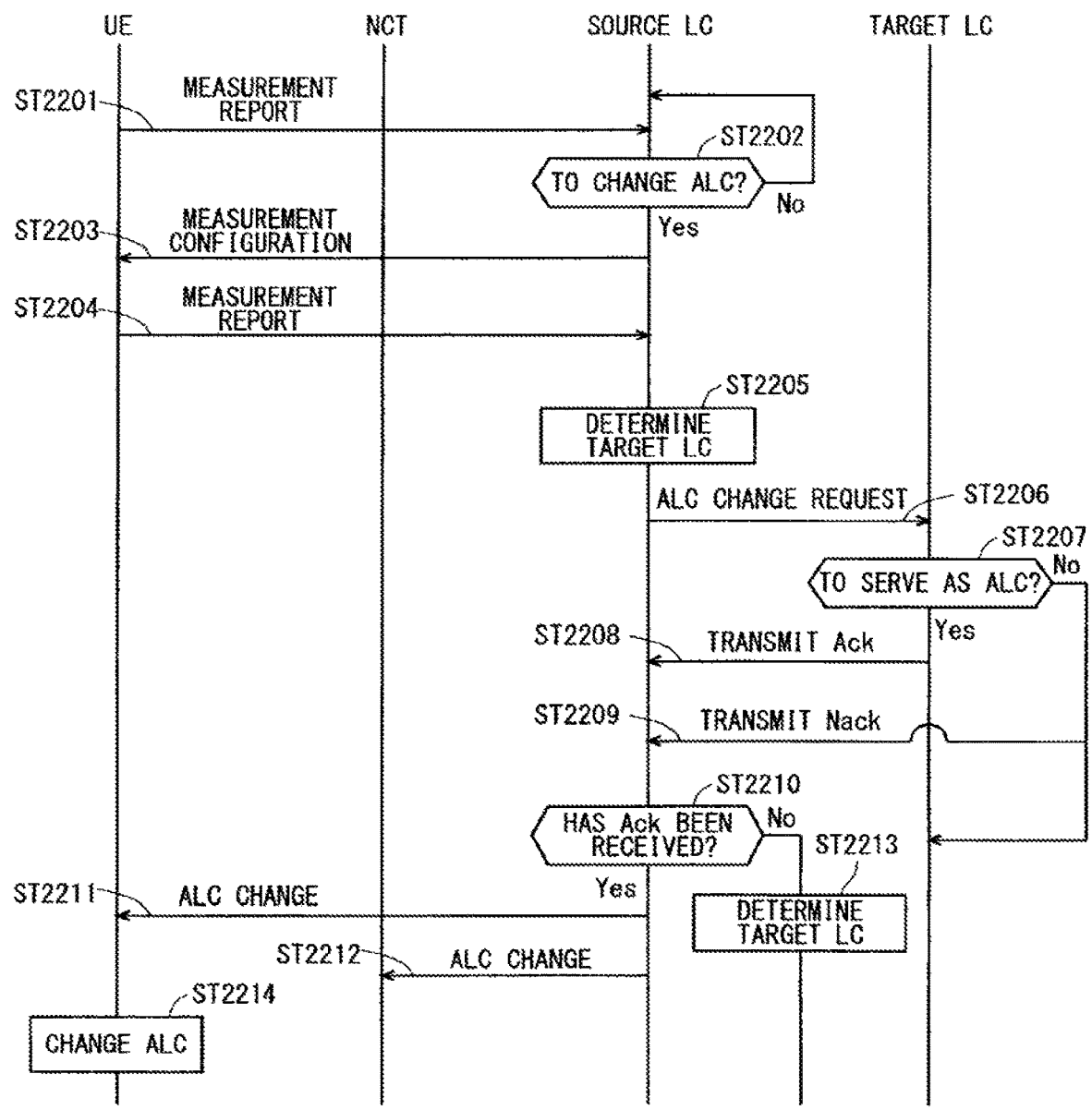
FIG. 22 shows an example sequence in a case where a specific example (1) of a method of determining an associated legacy carrier in a semi-static or dynamic manner in a communication system according to a third modification of the first embodiment of the present invention.

FIG. 22 shows an example sequence in the case where the specific example (1) of the method of determining an associated legacy carrier in a semi-static or dynamic manner in the communication system according to the third modification of the first embodiment of the present invention.

In Step ST2201, the UE notifies the source legacy carrier, being the associated legacy carrier before change, of a measurement report.

In Step ST2202, the source legacy carrier judges whether or not to change the associated legacy carrier (ALC) based on the measurement report received in Step ST2201. As a specific example, the source legacy carrier judges whether or not the reception quality of the source legacy carrier received in Step ST2201 is lower than a predetermined threshold, to thereby judge whether or not to change the associated legacy carrier (ALC).

When judging that the received reception quality of the source legacy carrier is lower than the predetermined threshold, the source legacy carrier judges to change the associated legacy carrier (ALC) and then moves to Step ST2203. When judging that the received reception quality of the source legacy carrier is equal to or higher than the predetermined threshold, the source legacy carrier judges not to change the associated legacy carrier (ALC) and then repeats the judgment of Step ST2202.

In Step ST2203, the source legacy carrier notifies the UE of the measurement configuration required to determine a target legacy carrier.

The UE that has received the measurement configuration in Step ST2203 performs measurement according to the received measurement configuration. In Step ST2204, the UE notifies the source legacy carrier of the measurement report reporting the measurement results.

Upon receipt of the measurement report in Step ST2204, in Step ST2205, the source legacy carrier determines a target legacy carrier based on the measurement report received in Step ST2204.

In Step ST2206, the source legacy carrier notifies the target legacy carrier of an associated legacy carrier (ALC) change request being a message requesting the target legacy carrier to serve as the associated legacy carrier for the target NCT. At that time, the source legacy carrier may notify the target legacy carrier of the system information of an NCT. The ALC change request is notified using, for example, "Handover Request" being the existing signaling.

In Step ST2207, the target legacy carrier that has received the ALC change request in Step ST2206 judges whether or not to serve as an associated legacy carrier (ALC). The target legacy carrier moves to Step ST2208 when judging to serve as an associated legacy carrier or moves to Step ST2209 when judging not to serve as an associated legacy carrier.

In Step ST2208, the target legacy carrier notifies the source legacy carrier that it will serve as an associated legacy carrier, as the judgment results on whether or not it will serve as the associated legacy carrier for the target NCT. Specifically, the target legacy carrier notifies that it will serve as an associated legacy carrier by transmitting "Ack" as a response to the ALC change request. The target legacy carrier may transmit "Ack" using, for example, "Handover Request Acknowledge" being the existing signaling. When notifying that it will serve as an associated legacy carrier, the target legacy carrier may notify the source legacy carrier of the system information of a target legacy carrier.

In Step ST2209, the target legacy carrier notifies the source legacy carrier that it will not serve as an associated legacy carrier, as the judgment results on whether or not it will serve as the associated legacy carrier for the target NCT. Specifically, the target legacy carrier notifies that it will not serve as an associated legacy carrier by transmitting "Nack" as a response to the ALC change request. The target legacy carrier may transmit "Nack" using, for example, "Handover Request Acknowledge" being the existing signaling.

In Step ST2210, the source legacy carrier judges whether or not it has received, from the target legacy carrier, the notification indicating that the target legacy carrier will serve as an associated legacy carrier, as the judgment results on whether or not the target legacy carrier will serve as the associated legacy carrier for a target NCT. Specifically, the source legacy carrier judges whether or not it has received "Ack" from the target legacy carrier.

When judging that it has received "Ack" from the target legacy carrier, the source legacy carrier judges that it has received, from the target legacy carrier, the notification indicating that the target legacy carrier will serve as an associated legacy carrier and then moves to Step ST2211. When judging that it has not received "Ack" from the target legacy carrier, namely, when judging that it has received "Nack," the source legacy carrier judges that it has been notified that the target legacy carrier will not serve as an associated legacy carrier and then moves to Step ST2213.

In Step ST2211, the source legacy carrier notifies the UE that it will change an associated legacy carrier. The source legacy carrier notifies that it will change the associated legacy carrier using, for example, "RRCConnectionReconfiguration message" or "mobilityControlInformation" being the existing signaling. When receiving the system information of the target legacy carrier from the target legacy carrier in Step ST2208, in Step ST2211, the source legacy carrier notifies a target UE of the system information of the target legacy carrier received in Step ST2208 as well as notifying that it will change an associated legacy carrier.

In Step ST2212, the source legacy carrier notifies the target NCT that it will change an associated legacy carrier.

In Step ST2213, the source legacy carrier determines a target legacy carrier again. At that time, the source legacy carrier may select a target legacy carrier from the legacy carriers other than the legacy carrier that has notified in Step ST2209 that it will not serve as the associated legacy carrier for a target NCT. The source legacy carrier may again notify the UE of the measurement configuration required to determine a target legacy carrier.

In Step ST2214, the UE changes the associated legacy carrier for the target NCT from the source legacy carrier to the target legacy carrier. In changing, the UE may use the system information of the target legacy carrier received in Step ST2211.

FIG. 23 shows an example sequence in the case where the specific example (2) of the method of determining an associated legacy carrier in a semi-static or dynamic manner in the communication system according to the third modification of the first embodiment of the present invention. The sequence shown in FIG. 23 is similar to the sequence shown in FIG. 22, and thus, the same steps will be denoted by the same step numbers and common description will be omitted.

In Step ST2301, the source legacy carrier judges whether or not to change an associated legacy carrier. In the example shown in FIG. 23, the source legacy carrier judges whether or not the load of the own carrier being an associated legacy carrier is higher than a predetermined threshold, to thereby judge whether or not to change the associated legacy carrier.

When judging that the load of the own carrier is higher than the predetermined threshold, the source legacy carrier judges to change the associated legacy carrier and then moves to Step ST2302. When judging that the load of the own carrier is equal to or lower than the predetermined threshold, the source legacy carrier judges not to change the associated legacy carrier and then repeats the judgment of Step ST2301.

For example, when judging that the MAC load of the own carrier is higher than a predetermined threshold, the source legacy carrier judges to change the associated legacy carrier and then moves to Step ST2302. When judging that the MAC load of the own carrier is equal to or lower than the predetermined threshold, the source legacy carrier judges not to change the associated legacy carrier and then repeats the judgment of Step ST2301.

In Step ST2302, the source legacy carrier transmits a request for reporting a load status to neighbor legacy carriers, to thereby request to report the load status. The neighbor legacy carriers include a legacy carrier that will be selected later as a target legacy carrier. The request for reporting a load status is transmitted using "Resource Status Request" being the existing signaling.

In Step ST2303, the neighbor legacy carriers that have received the request for reporting a load status in Step ST2302 transmit the report of the load status to the source legacy carrier. The neighbor legacy carriers include the legacy carrier that will be selected later as a target legacy carrier. The report of the load status is transmitted using, for example, "Resource Status Response" being the existing signaling.

In Step ST2304, the source legacy carrier determines a target legacy carrier based on the load statuses of the neighbor legacy carriers received in Step ST2303.

The third modification of the first embodiment can achieve the following effect in addition to the effects similar to those of the second modification of the first embodiment. This modification enables more dynamic operation than the second modification of the first embodiment.

Disclosed next is the case where the PCell is changed when the NCT is configured for the UE and a legacy carrier to be associated with the NCT is the PCell, Herein, the PCell is not limited to the PCell in the case where CA is configured for the UE and refers to the cell in which the UE is connected to a higher layer.

The PCell (also referred to as a "target PCell") after change judges whether or not to configure an NCT for a target UE.

For example, the PCell (also referred to as a "source PCell") before change transmits, to the target PCell, a message requesting the target PCell to change the PCell for the UE (hereinafter, also referred to as a "PCell change request message"). When receiving the PCell change request message of the UE, the target PCell may judge whether or not to configure an NCT for the target UE.

The PCell change request message may include the system information of the NCT configured before the PCell is changed, as well as the information indicating a request to change the PCell. Alternatively, the PCell change request message may apply the method of notifying an associated legacy carrier change request to be notified the target legacy carrier from the source legacy carrier, which has been disclosed in this modification.

The target PCell judges whether or not to configure an NCT using the system information of the NCT received from the source PCell and, when it judges to configure an NCT, determines the details of the system configuration of the NCT.

The information on whether or not the reception quality of an NCT is good, whether the reception quality of an NCT is higher or lower than a predetermined threshold, or whether or not the NCT can be continuously used may be used to judge whether or not to configure an NCT. Such information may be created by the source PCell based on the measurement results from the UE and may be notified the target PCell from the source PCell in advance. Such information may be notified with, for example, a PCell change request message.

The method disclosed in this modification may be applied in the case where the configuration of an NCT remains unchanged before and after the PCell is changed.

In the case where different NCTs are configured for a target UE before and after the PCell is changed, the target PCell notifies the source PCell of the system information of the configured NCT. Alternatively, the radio resource configuration configured by the target PCell may be notified. The radio resource configuration may include the system information of the configured NCT. The method of using a "HO request acknowledge" message disclosed in this modification may be applied as the notification method.

The source PCell that has received the system information of a newly configured NCT from the target PCell notifies the UE of this information. When receiving the radio resource configuration including the system information of the NCT, the source PCell may notify this information. The method of using, for example, an "RRCCconnectionreconfiguration" message or message control information (abbreviated as MCI), disclosed in this modification, may be applied as the notification method.

The source PCell notifies the UE of the system information of the NCT received from the target PCell, allowing the UE to synchronize and communicate with the target PCell and the newly configured NCT.

The method disclosed herein is also applicable to the case where the PCell in the same eNB is changed and in the case where PCells in different eNBs are changed.

Also in the case where the NCT configuration remains unchanged before and after the PCell is changed, the method disclosed above is applicable. This allows the system information of the NCT configured by a target PCell or the radio resource configuration including the system information of the NCT to be reliably notified the source PCell and the UE, reducing disconnections due to a condition mismatch between the UE and the target PCell. "Disconnection" means that connection is cut off.

In the case where the target PCell determines not to configure an NCT, the target PCell may avoid notifying the source PCell of the system information of an NCT. The target PCell may notify the message that does not contain the system information of the NCT but contains only the radio resource configuration of the target PCell. Similarly, the source PCell may avoid notifying the UE of the system information of the NCT. The source PCell may notify the message that does not contain the system information of the NCT but contains only the radio resource configuration of the target PCell. This allows the UE to recognize that an NCT is not configured after the change of the PCell.

When configuring an NCT for a target UE, the target PCell being the PCell after change may perform CA for the UE. Alternatively, the legacy carrier to be associated with the NCT may be one of the SCells configured in CA.

In this case, the method disclosed above may be applied, and further, the target PCell may notify the source PCell of the CA configuration after the change of the PCell. Alternatively, the source PCell may notify the UE of the CA configuration after the change of the PCell. Examples of the CA configuration include the configuration information of one or a plurality of SCells for which CA is performed and the system information. In addition, the information indicating which SCell serves as the associated legacy carrier for an NCT may be notified together.

This allows the UE to synchronize and communicate with the Scell and also with the NCT.

The NCT may be configured as one SCell in CA. A similar method is applicable also in this case.

The method disclosed above allows, in the case where an NCT is configured for the UE and the associated legacy carrier for the NCT is a PCell, the use of the NCT in changing the PCell without disconnecting the communication before and after the PCell is changed, enabling high-speed communication between the UE and the network.

Second Embodiment

The problem to be solved in the second embodiment will be described. 3GPP proposes that the scheduling of the PDSCH to be mapped to the NCT is notified the UE over the PDCCH of the legacy carrier. Notifying the UE of the scheduling of the PDSCH of the legacy carrier over the PDCCH of the legacy carrier is referred to as cross-carrier scheduling (see R1-121466 (hereinafter, referred to as "Non-Patent Document 18") by 3GPP).

The legacy carrier that performs scheduling of the PDSCH to be mapped to the NCT is the same as the legacy carrier that notifies the UE of the scheduling results of the PDSCH to be mapped to the NCT. This allows the scheduling and the notification of the scheduling results to be performed in the same legacy carrier, preventing a control delay of the communication system. Such a legacy carrier is referred to as a "scheduling legacy carrier (abbreviated as SLC)."

Cross-carrier scheduling has been disclosed that notifies the UE of the scheduling of the PDSCH to be mapped to an SCell over the PDCCH of the PCell (see Chapter 11.1 of Non-Patent Document 1). However, the cross-carrier scheduling method suitable for an NCT has not been disclosed.

For example, if the scheduling legacy carrier is configured to be in "deactivation," unfortunately, cross-carrier scheduling to the NCT is not allowed. This leads to a problem that the communication systems of Release 11 and the following releases, in which legacy carriers and NCTs coexist, cannot be operated normally and efficiently using cross-carrier scheduling.

Further, there is no disclosure of whether or not the UE that has been notified of the configuration of an NCT or the system information of an NCT always needs to consider the NCT to be activated. In the case where the UE that has been notified of the configuration of an NCT or the system information of an NCT always considers the NCT to be activated, unfortunately, the power consumption of the UE will increase.

The solution in the second embodiment to the above-mentioned problem will now be described. The UE that has been notified of the configuration of an NCT or the system information of an NCT does not always need to consider the NCT to be activated. Specifically, the NCT whose configuration or system information has been notified can be controlled to be in "activation" or "deactivation" (hereinafter, also collectively referred to as "activation/deactivation").

The following three (1) to (3) will be disclosed as specific examples of the cross-carrier scheduling method suitable for an NCT.

(1) For the scheduling legacy carrier, "deactivation" is prohibited. Or, the scheduling legacy carrier is always configured to be in "activation." The activation/deactivation of an NCT is instructed explicitly from the scheduling legacy carrier through signaling. The scheduling legacy carrier is prohibited from "deactivation" or is always configured to be in "activation," always enabling cross-carrier scheduling from the scheduling legacy carrier to the NCT.

(2) When the scheduling legacy carrier is in "deactivation," the NCT is also in "deactivation." Explicit instruction of "deactivation" of an NCT through signaling may be omitted. Upon receipt of the signaling indicating "deactivation" of a scheduling legacy carrier, the UE recognizes that the NCT will also be in "deactivation." In the case of the specific example (2), the UE does not need the operation of receiving the signaling of "deactivation" of an NCT, reducing the processing load and power consumption of a UE. As a result, the scheduling legacy carrier will not be in "deactivation" during the activation of the NCT. Therefore, the problem that cross-carrier scheduling to an NCT is not allowed in the case where the scheduling legacy carrier is configured to be in "deactivation" can be solved.

(3) The shift of the activation/deactivation state is the same between the scheduling legacy carrier and the NCT. The explicit instruction of activation/deactivation of an NCT through signaling may be omitted. When receiving the signaling indicating activation/deactivation of a scheduling legacy carrier, the UE recognizes that the state of the NCT also shifts in the same manner. In the case of the specific example (3), the UE does not need the operation of receiving the signaling of activation/deactivation of an NCT, reducing the processing load and power consumption of the UE. As a result, the scheduling legacy carrier will not be in "deactivation" during the "activation" of the NCT. Therefore, in the case where the scheduling legacy carrier is configured to be in "deactivation," the problem that cross-carrier scheduling to an NCT is not allowed can be solved.

The scheduling legacy carrier may be the associated legacy carrier for an NCT. The scheduling legacy carrier may be a PCell or may not be a PCell. The scheduling legacy carrier may be an SCell.

The following three (1) to (3) will be disclosed as specific examples of the method of recognizing whether or not a target cell is a scheduling legacy carrier by the entity that configures or determines the activation/deactivation of a scheduling legacy carrier. In this description, for convenience, the scheduling legacy carrier is an "associated legacy carrier," the scheduling legacy carrier is an "SCell," and the entity that configures or determines the activation/deactivation of a scheduling legacy carrier is a "PCell."

(1) In the case where an NCT associated with a target cell is present, that cell is recognized as an associated legacy carrier. The following three (1-1) to (1-3) will be disclosed as specific examples.

(1-1) In the case of the second modification of the first embodiment, an associated legacy carrier is determined in a static manner. In the case where an NCT point is installed or in the case where an NCT point starts operating, the target cell notifies a neighbor cell or base station that it serves as an associated legacy carrier. For example, "X2 SETUP REQUEST" (see Chapter 9.1.2.3 of Non-Patent Document 16) to be notified by means of an X2 interface, which is the existing signaling, is used in notifying that the target cell serves as an associated legacy carrier. In that case, the information on whether or not there is an associated NCT may be added to the "Served Cells" parameters. The system information of an NCT described in the second modification of the first embodiment may be added.

(1-2) In the case of the third modification of the first embodiment, an associated legacy carrier is determined in a semi-static or dynamic manner. The target cell that serves as an associated legacy carrier notifies a neighbor cell or base station that it serves as an associated legacy carrier. For example, "ENB CONFIGURATION UPDATE" (see Chapter 9.1.2.8 of Non-Patent Document 16) to be notified by means of an X2 interface, which is the existing signaling, is used in notifying that the target cell serves as an associated legacy carrier. In that case, the information on whether or not there is an associated NCT may be added to the "Served Cells to Modify" parameters. Alternatively, the system information of an NCT described in the second modification of the first embodiment may be added.

(1-3) The entity that configures or determines the activation/deactivation of a scheduling legacy carrier inquires a target cell of whether or not the target cells include an associated NCT. Specifically, the entity transmits, to target cells, an inquiry of whether or not there is an associated NCT. The target cells that have received the inquiry respond to the inquiry of whether or not there is an associated NCT.

(2) In the case where the target cells include an associated NCT and one or more UEs are notified of the configuration of the NCT, that cell is recognized as an associated legacy carrier. The following two (2-1) and (2-2) will be disclosed as specific examples.

(2-1) In the case of notifying the UE of the configuration of an NCT or in the case of receiving the report that the configuration of the NCT has been notified, the entity that configures or determines the activation/deactivation of a scheduling legacy carrier recognizes that cell as an associated legacy carrier. For example, the entity that configures or determines the activation/deactivation of a scheduling legacy carrier, which is the PCell in FIGS. 17 to 21 described above, recognizes a target cell as a scheduling legacy carrier in Step ST1709 of FIG. 17, Step ST1806 of FIG. 18, Step ST1901 of FIG. 19, Step ST2003 of FIG. 20, and Step ST2101 of FIG. 21 that have disclosed in the second modification of the first embodiment.

(2-2) The entity that configures or determines the activation/deactivation of a scheduling legacy carrier inquires a target cell of whether there is an associated NCT and whether or not one or more UEs have been notified of the configuration of the NCT. Specifically, the entity transmits, to a target cell, an inquiry of whether or not there is an associated NCT and whether or not one or more UEs have been notified of the configuration of the NCT. The target cell that has received the inquiry responds to the inquiry of whether or not there is an associated NCT and whether or not the one or more UEs have been notified of the configuration of the NCT.

(3) In the case where a target cell is configured as a scheduling legacy carrier, that cell is recognized as an associated legacy carrier. That is, the enty that has configured a target cell as a scheduling legacy carrier configures or determines the activation/deactivation of the scheduling legacy carrier. This eliminates the "notification" or "inquiry," unlike the specific examples (1) and (2), preventing a control delay of the communication system and reducing the processing load of the communication system.

In the case where the entity that configures or determines the activation/deactivation of a scheduling legacy carrier will not or cannot recognize whether or not a target cell is a scheduling legacy carrier, the specific example (1) of the cross-carrier scheduling method suitable for an NCT, described above, is applicable. This prevents the target cell from "deactivation," that is, causes the target cell to be always in "activation" even if the target cell is a scheduling legacy carrier, always enabling cross-carrier scheduling from the target cell to the NCT.

Figure 24:
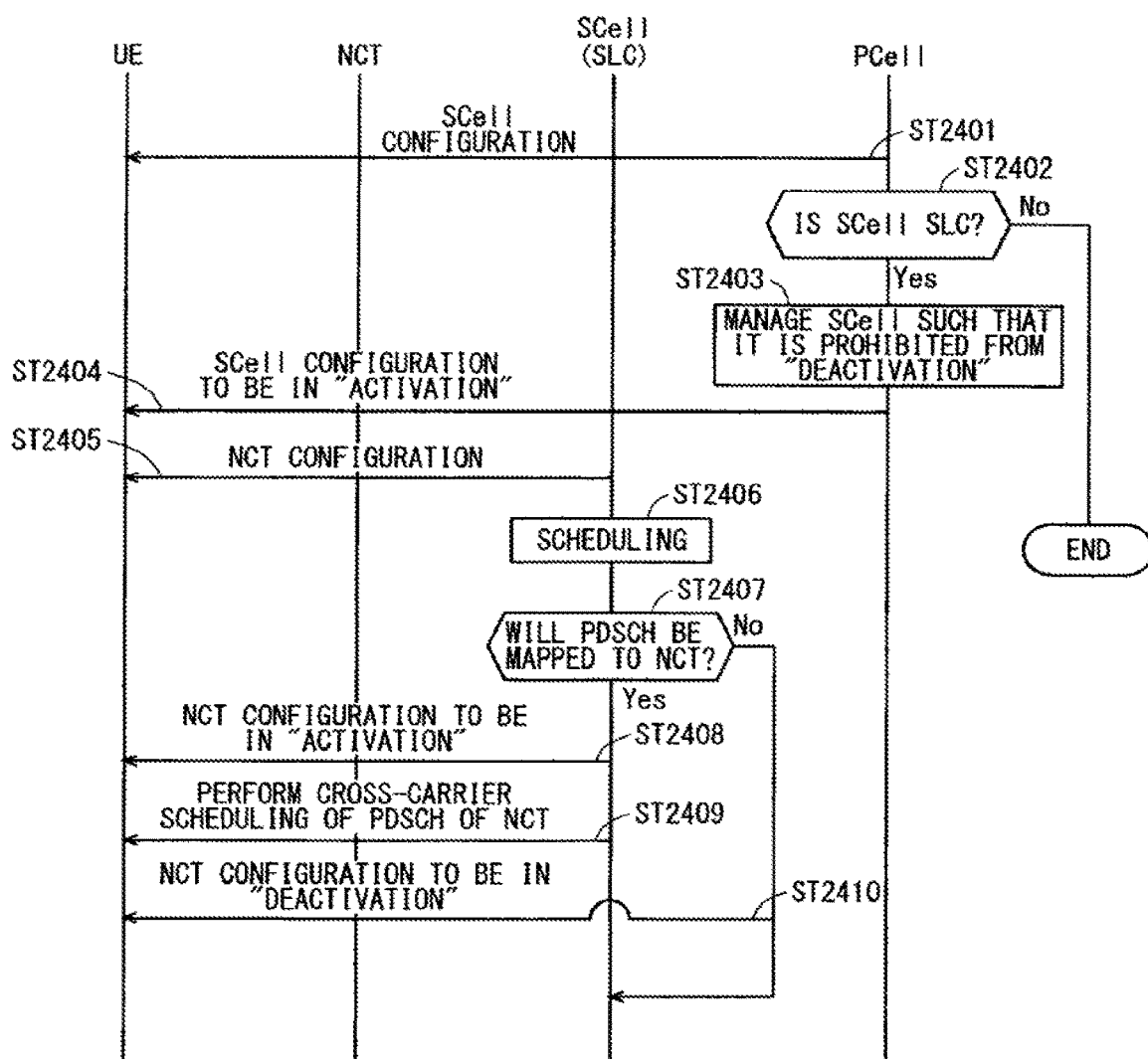
FIG. 24 shows an example sequence in a case where a specific example (1) is used as a cross-carrier scheduling method suitable for an NCT in a communication system according to a second embodiment of the present invention.

FIG. 24 shows an example sequence in the case where the specific example (1) is used as the cross-carrier scheduling method suitable for an NCT in the communication system according to the second embodiment of the present invention. The example shown in FIG. 24 will be described with the entity that configures or determines the activation/deactivation of a scheduling legacy carrier being a PCell and the scheduling legacy carrier (SLC) being an SCell.

In Step ST2401, the PCell configures an SCell for the UE.

In Step ST2402, the PCell judges whether or not the SCell being a target whose activation/deactivation is configured or determined is a scheduling legacy carrier (SLC). When judging that the SCell is a scheduling legacy carrier, the PCell moves to Step ST2403. When the PCell judges that the SCell is not a scheduling legacy carrier, description will not be given because it is not specific to the idea of the present invention.

The specific example of the method of recognizing, by the entity that configures or determines the activation/deactivation of a scheduling legacy carrier, whether or not a target cell is a scheduling legacy carrier may be used as a specific method of judging, by the PCell, whether or not the SCell is a scheduling legacy carrier.

In Step ST2403, the PCell prohibits the SCell from "deactivation." Specifically, the PCell manages the SCell such that it is prohibited from "deactivation." That is, the PCell always keeps the SCell in "activation."

In Step ST2404, the PCell notifies the target UE that the SCell will be configured to be in "activation."

In Step ST2405, the SCell configures an NCT for the UE. Here, the entity that configures an NCT for the UE is not limited to the SCell, and the specific examples of the entity that configures an NCT for the UE, which have been disclosed in the second modification of the first embodiment, may be used. The process of Step ST2405 can be performed, for example, prior to Step ST2401 without any problem.

In Step ST2406, the SCell performs scheduling of the PDSCH. The SCell may perform scheduling of the PDSCH to be mapped to the NCT.

In Step ST2407, the SCell judges whether or not the PDSCH will be mapped to the NCT as the result of the scheduling of Step ST2406. When judging that the PDSCH will be mapped to the NCT, the SCell moves to Step ST2408. When judging that the PDSCH will not be mapped to the NCT, the SCell moves to Step ST2410. Although the example in which the activation/deactivation of an NCT is determined based on whether or not the PDSCH is mapped to the NCT has been disclosed, the activation/deactivation of an NCT may be determined based on other criteria.

In Step ST2408, the SCell notifies the UE that an NCT is configured to be in "activation."

In Step ST2409, the SCell performs, for the UE, cross-carrier scheduling of the PDSCH to be mapped to the NCT.

In Step ST2410, the SCell notifies the UE that the NCT has been configured to be in "deactivation."

FIG. 25 shows an example sequence in the case where the specific example (2) is used as the cross-carrier scheduling method suitable for an NCT in the communication system according to the second embodiment of the present invention. The example shown in FIG. 25 will be described with the entity that configures or determines the activation/deactivation of a scheduling legacy carrier being a PCell and the scheduling legacy carrier (SLC) being an SCell. The sequence shown in FIG. 25 is similar to the sequence shown in FIG. 24, and thus, the same steps will be denoted by the same step numbers and common description will be omitted.

In the example shown in FIG. 25, after the process of Step ST2401, in Step ST2501, the PCell performs scheduling of the PDSCH. The PCell may perform scheduling of the PDSCH to be mapped to the SCell.

In Step ST2502, the PCell judges whether or not the PDSCH will be mapped to the SCell as the result of the scheduling of Step ST2501, When judging that the PDSCH will be mapped to the SCell, the PCell moves to Step ST2503. When judging that the PDSCH will not be mapped to the SCell, the PCell moves to Step ST2506. Although the example in which the activation/deactivation of an SCell is determined based on whether or not the PDSCH will be mapped to the SCell has been disclosed here, the activation/deactivation of an SCell may be determined based on other criteria.

In Step ST2503, the PCell notifies the UE that it will configure the SCell to be in "activation".

In Step ST2504, the PCell performs, for the UE, cross-carrier scheduling of the PDSCH to be mapped to the SCell.

In Step ST2505, the PCell notifies the SCell that it will configure the SCell to be in "activation."

In Step ST2506, the PCell notifies the UE that it will configure the SCell to be in "deactivation." In Step ST2507, the PCell notifies the SCell that it will configure the SCell to be in "deactivation."

In Step ST2508, the SCell judges whether the own cell is configured to be in "activation" or "deactivation." The SCell may judge whether or not the own cell is configured to be in "deactivation." When judging that the own cell is not configured to be in "deactivation," the SCell moves to Step ST2406. When judging that the own cell is configured to be in "deactivation," the SCell moves to Step ST2509.

In Step ST2509, the SCell recognizes that the NCT is configured to be prohibited from "activation." The SCell recognizes that the PDSCH is prohibited from being mapped to the NCT.

In Step ST2510, the UE judges whether or not the SCell is configured to be in "activation" or "deactivation." The UE may judge whether or not the SCell is configured to be in "deactivation." When judging that the SCell is configured to be in "deactivation," the UE moves to Step ST2511. When judging that the SCell is not configured to be in "deactivation," the UE moves to Step ST2408.

In Step ST2511, the UE recognizes that the NCT is also configured to be in "deactivation."

Figure 26:
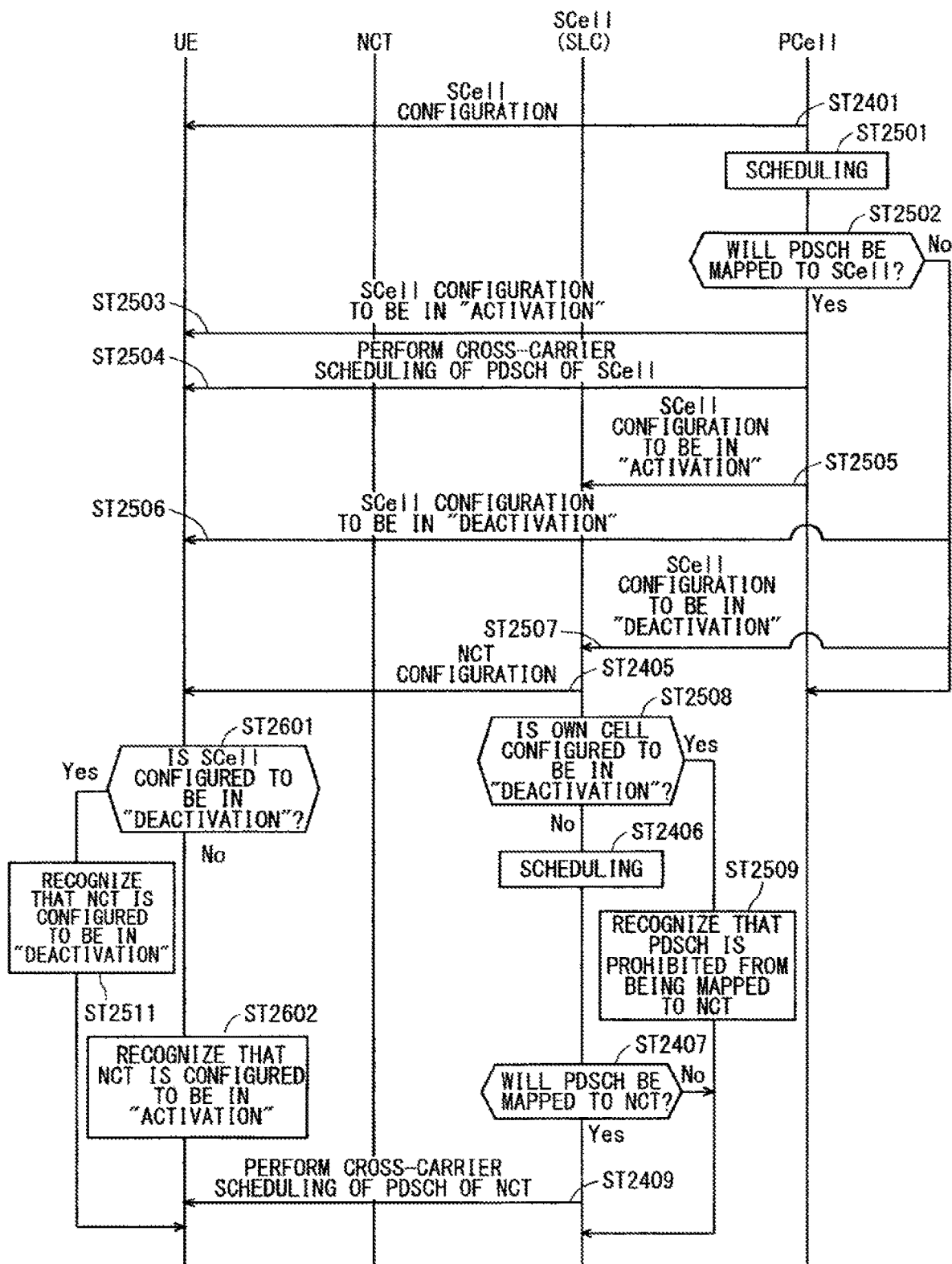
FIG. 26 shows an example sequence in a case where a specific example (3) is used as the cross-carrier scheduling method suitable for an NCT in the communication system according to the second embodiment of the present invention.

FIG. 26 shows an example sequence in the case where specific example (3) is used as the cross-carrier scheduling method suitable for an NCT in the communication system according to the second embodiment of the present invention. The example shown in FIG. 26 will be described with the entity that configures or determines the activation/deactivation of a scheduling legacy carrier being a PCell and the scheduling legacy carrier (SLC) being an SCell. The sequence shown in FIG. 26 is similar to the sequences shown in FIGS. 24 and 25, and thus, the same steps will be denoted by the same step numbers and common description will be omitted.

In the example shown in FIG. 26, after the processes of Step ST2401, Steps ST2501 to ST2507, and Step ST2405, in Step ST2601, the UE judges whether or not the SCell is configured to be in "activation" or "deactivation." The UE may judge whether or not the SCell is configured to be in "deactivation." When judging that the SCell is configured to be in "deactivation," the UE moves to Step ST2511. When judging that the SCell is not configured to be in "deactivation," the UE moves to Step ST2602.

In Step ST2602, the UE recognizes that the NCT is also configured to be in "activation." The process of Step ST2511, which is performed by the UE in the case where the UE moves from Step ST2601 to Step ST2511, and the processes of Steps ST2508, ST2509, ST2406, ST2407, and ST2409, which are performed by the SCell after the process of Step ST2405, are similar to those of the sequences shown in FIGS. 24 and 25 described above.

The second embodiment described above can achieve the following effect. The communication systems of Release 11 and the following releases in which legacy carriers and NCTs coexist can be operated normally and efficiently using cross-carrier scheduling.

First Modification of Second Embodiment

The problem to be solved in a first modification of the second embodiment will be described. There is no disclosure of the cross-carrier scheduling method suitable for an NCT in the case where the scheduling legacy carrier serves as an SCell. Therefore, the communication systems of Release 11 and the following releases in which legacy carriers and NCTs coexist cannot be operated normally and efficiently using cross-carrier scheduling.

The following two (1) and (2) will be disclosed as the solution in the first modification of the second embodiment.

(1) The PCell performs cross-carrier scheduling of the PDSCH to be mapped to the NCT.

(2) In the case where the PCell performs scheduling of the PDSCH to be mapped to the SCell using cross-carrier scheduling, the PCell performs cross-carrier scheduling of the PDSCH to be mapped to the NCT. In the case where scheduling of the PDSCH to be mapped to the SCell is performed over the PDCCH of the SCell, the PCell or SCell performs cross-carrier scheduling of the PDSCH to be mapped to the NCT.

In the two methods described above, in the case where the PCell performs cross-carrier scheduling of the PDSCH to be mapped to the SCell, the PCell performs cross-carrier scheduling of the PDSCH to be mapped to the NCT. As a result, in the case where the PCell performs cross-carrier scheduling of the PDSCH to be mapped to the SCell, the UE is merely required to receive the PDCCH of the PCell to receive the scheduling of the PDSCH to be mapped to the SCell and to receive the scheduling of the PDSCH to be mapped to the NCT. That is, the UE is not required to receive the PDCCH of the SCell. This reduces the processing load of the UE.

Figure 27:
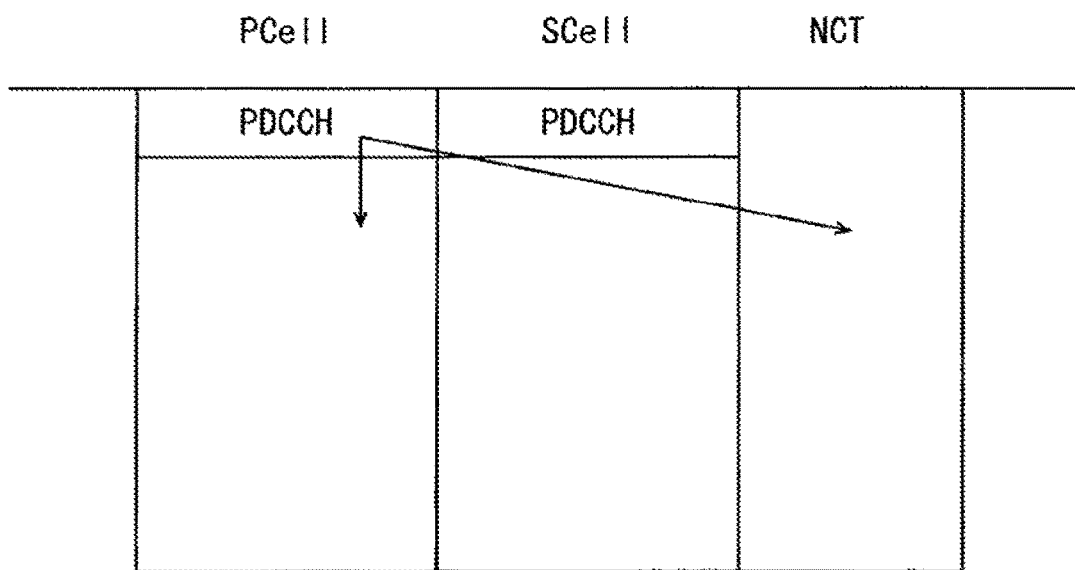
FIG. 27 shows the concept of a solution (1) in a first modification of the second embodiment of the present invention.

FIG. 27 shows the concept of the solution (1) in the first modification of the second embodiment of the present invention. In the solution (1), the scheduling of the PDSCH to be mapped to the NCT is notified over the PDCCH of the PCell. The UE receives the PDCCH of the PCell to receive the scheduling of the PDSCH to be mapped to the NCT.

Figure 28:
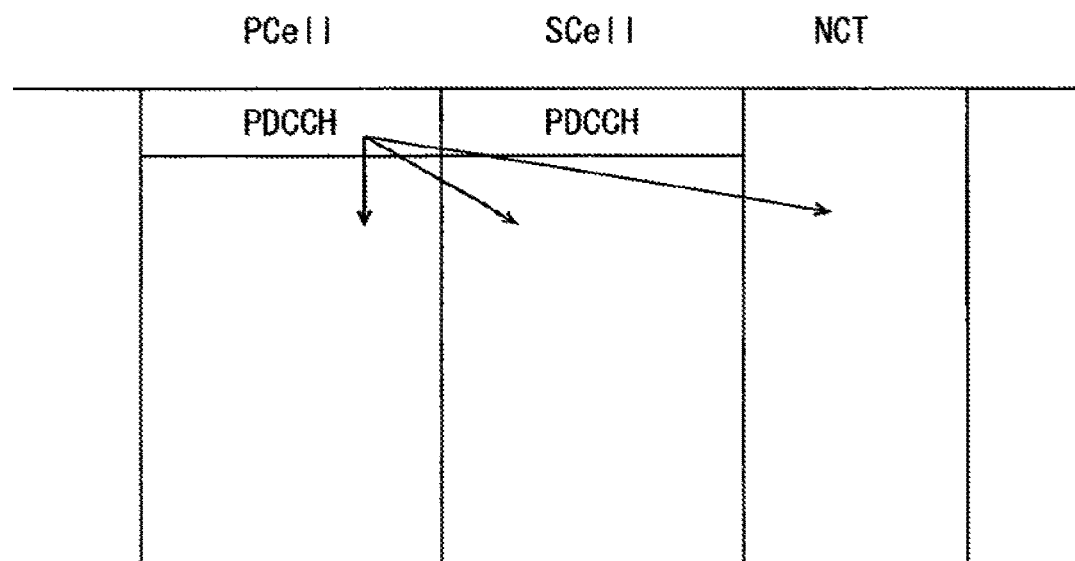
FIG. 28 shows the concept of a solution (2) in the first modification of the second embodiment of the present invention.
Figure 29:
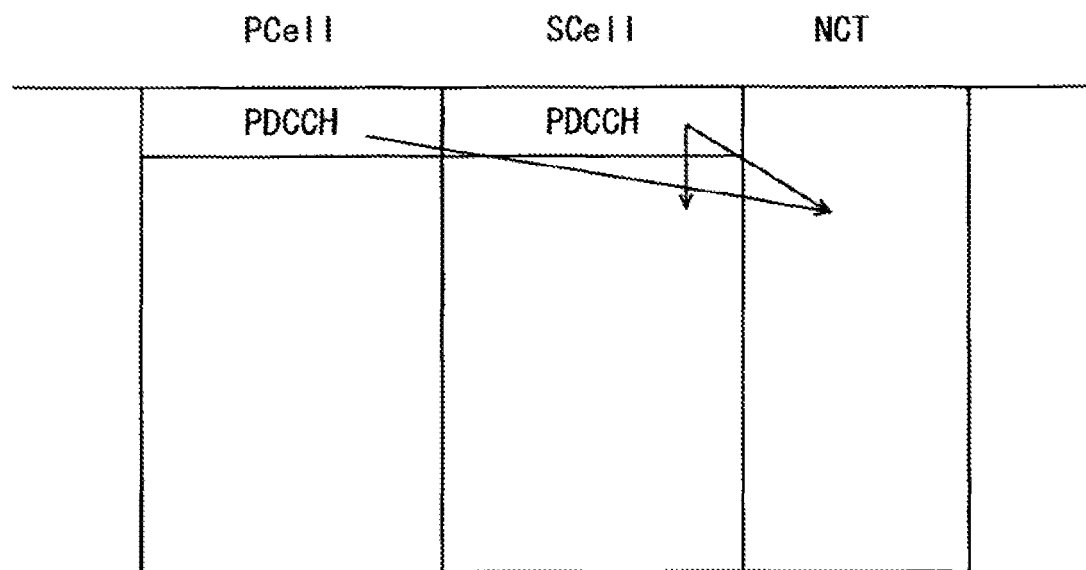
FIG. 29 shows the concept of the solution (2) in the first modification of the second embodiment of the present invention.

FIGS. 28 and 29 show the concept of the solution (2) in the first modification of the second embodiment of the present invention. FIG. 28 shows the case where the scheduling of the PDSCH to be mapped to the SCell is performed by the PCell using cross-carrier scheduling. FIG. 29 shows the case where the scheduling of the PDSCH to be mapped to the SCell is performed over the PDCCH of the SCell.

In the case where the scheduling of the PDSCH to be mapped to the SCell is performed by the PCell using cross-carrier scheduling in the solution (2), as shown in FIG. 29, the scheduling of the PDSCH to be mapped to the NCT is notified over the PDCCH of the PCell. The UE receives the PDCCH of the PCell to receive the scheduling of the PDSCH to be mapped to the NCT.

In the case where the scheduling of the PDSCH to be mapped to the SCell is performed over the PDCCH of the SCell in the solution (2), as shown in FIG. 29, the scheduling of the PDSCH to be mapped to the NCT is notified over the PDCCH of the PCell or the PDCCH of the SCell. The UE receives the PDCCH of the PCell or the PDCCH of the SCell to receive the scheduling of the PDSCH to be mapped to the NCT.

The first modification of the second embodiment described above can achieve the following effect in addition to the effects similar to those of the second embodiment. In the case where the PCell performs cross-carrier scheduling of the PDSCH to be mapped to the SCell, the UE is merely required to receive the PDCCH of the PCell to receive the scheduling of the PDSCH to be mapped to the SCell and to receive the scheduling of the PDSCH to be mapped to the NCT. That is, the UE is not required to receive the PDCCH of the SCell. This reduces the processing load of the UE.

Second Modification of Second Embodiment

The problem to be solved in a second modification of the second embodiment will be described. In the case where the PCell performs scheduling of the PDSCH to be mapped to the SCell using the first modification of the first embodiment, the following problem may occur if the PCell performs the cross-carrier scheduling of the PDSCH to be mapped to the NCT. In such a case, the scheduling of the PDSCH to be mapped to the PCell, the PDSCH to be mapped to the SCell, and the PDSCH to be mapped to the NCT need to be notified over the PDCCH of the PCell. This may lead to a problem of insufficient resources for the PDCCH of the PCell.

The solution in the second modification of the second embodiment will be disclosed below. The PCell is prohibited from performing cross-carrier scheduling of the PDSCH to be mapped to the SCell. The scheduling of the PDSCH to be mapped to the SCell is performed over the PDCCH of the SCell. The SCell performs cross-carrier scheduling of the PDSCH to be mapped to the NCT. The PCell may perform cross-carrier scheduling of the PDSCH to be mapped to the NCT.

Figure 30:
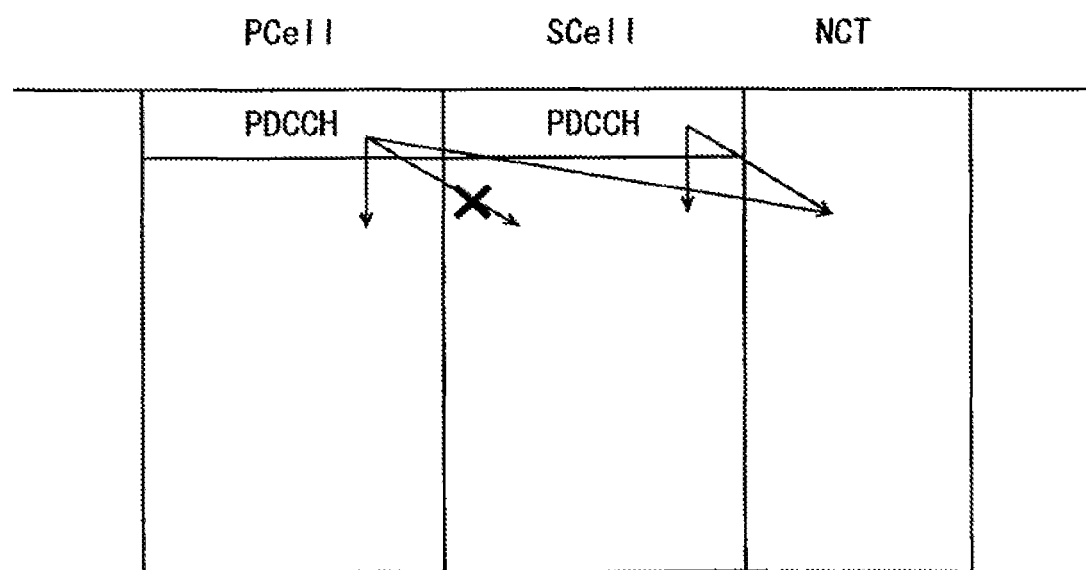
FIG. 30 shows the concept of a solution in a second modification of the second embodiment of the present invention.

FIG. 30 shows the concept of the solution in the second modification of the second embodiment of the present invention. In the solution of the second modification of the second embodiment, the scheduling of the PDSCH to be mapped to the SCell is notified over the PDCCH of the SCell. The cross-carrier scheduling over the PDCCH of the PCell is prohibited. FIG. 30 shows the prohibited cross-carrier scheduling by adding "x" to the arrow.

The UE receives the PDCCH of the SCell to receive the scheduling of the PDSCH to be mapped to the SCell. The scheduling of the PDSCH to be mapped to the NCT is notified over the PDCCH of the SCell or over the PDCCH of the PCell. The UE receives the PDCCH of the SCell or the PDCCH of the PCell to receive the scheduling of the PDSCH to be mapped to the NCT.

The second modification of the second embodiment described above can achieve the following effect in addition to the effects similar to those of the second embodiment. The scheduling of the PDSCH to be mapped to the PCell, the PDSCH to be mapped to the SCell, and the PDSCH to be mapped to the NCT, which are notified over the PDCCH of the PCell, is not necessary. This can prevent the problem of insufficient resources of the PDCCH of the PCell.

Third Modification of Second Embodiment

The problem to be solved in a third modification of the second embodiment will be described. 3GPP proposes the use of the enhanced control channel (E-PDCCH) or cross-carrier scheduling to notify the scheduling of the PDSCH to be mapped to the NCT. In this proposal, which of the E-PDCCH and the cross-carrier scheduling is used is configured by the legacy carrier (see R1-122175 (hereinafter, referred to as "Non-Patent Document 19") by 3GPP). However, Non-Patent Document 19 does not disclose how to select the E-PDCCH or the cross-carrier scheduling for use to notify the scheduling of the PDSCH to be mapped to the NCT. Therefore, the communication systems of Release 11 and the following releases in which legacy carriers and NCTs coexist cannot be operated normally and efficiently using cross-carrier scheduling.

The following two (1) and (2) will be disclosed as the solution in the third modification of the second embodiment.

(1) In the case where there is an uplink for link to an NCT, the E-PDCCH is used to notify the scheduling of the PDSCH to be mapped to the NCT.

In the case where there is an uplink for link to an NCT, the response signal to the uplink data needs to be notified in downlink. The enhanced HARQ indicator channel (E-RICH) is studied as the method of notifying a response signal to the uplink data in a carrier to which the PDCCH is not transmitted. It is also studied to separately configure channels, the E-HICH and the E-PDCCH, for the UE.

Therefore, in the case where there is an uplink for link to the NCT in which a response signal to the uplink data needs to be notified in downlink, the E-PDCCH highly compatible with the E-HICH is used to schedule the PDSCH to be mapped to the NCT. This prevents the communication system from becoming more complicated than the case where the method of transmitting a response signal to the uplink data is newly and separately provided using the cross-carrier scheduling for the scheduling of the PDSCH to be mapped to the NCT.

The configuration by the legacy carrier is not required as to which of the E-PDCCH and the cross-carrier scheduling is used. The UE recognizes the scheduling method based on whether or not there is an uplink for link in the system information of the NCT. Specifically, in the case where there is an uplink for link in the system information of the NCT, the UE recognizes that the E-PDCCH is used to notify the scheduling of the PDSCH to be mapped to an NCT. In the case where there is no uplink for link in the system information of the NCT, the UE recognizes that the cross-carrier scheduling is used to notify the scheduling of the PDSCH to be mapped to the NCT.

Unlike Non-Patent Document 19, the solution (1) does not need an explicit configuration by the legacy carrier, eliminating the need for providing new signaling. Therefore, the communication system can be prevented from becoming complicated.

(2) In the case where the carrier aggregation is performed or configured, the cross-carrier scheduling is used to notify the scheduling of the PDSCH to be mapped to an NCT. Specifically, in the case where the scheduling legacy carrier is a PCell or the scheduling legacy carrier is an SCell, the cross-carrier scheduling is used to notify the scheduling of the PDSCH to be mapped to an NCT. In the case where the scheduling legacy carrier is not a PCell and the scheduling legacy carrier is not an SCell, the E-PDCCH may be used to notify the scheduling of the PDSCH to be mapped to the NCT.

The cross-carrier scheduling has been traditionally disclosed, in which the scheduling of the PDSCH to be mapped to an SCell is notified the UE over the PDCCH of the PCell (see Chapter 11.1 of Non-Patent Document 1). Therefore, the scheduling of the PDSCH to be mapped to an SCell and the scheduling of the PDSCH to be mapped to an NCT can also be the cross-carrier scheduling, preventing the communication system from becoming complicated.

The third modification of the second embodiment described above can achieve the effects similar to those of the second embodiment.

Fourth Modification of Second Embodiment

The problem to be solved in a fourth modification of the second embodiment will be described. Cross-carrier scheduling has been traditionally disclosed, in which the scheduling of the PDSCH to be mapped to an SCell is notified the UE over the PDCCH of the PCell (see Non-Patent Document 2). Specifically, the starting OFDM symbol for the PDSCH of the SCell is specified using a "pdsch-Start" parameter included in "CrossCarrierSchedulingConfig."

The values of the parameters are "1," "2," "3," and "4." These parameters show the starting OFDM symbol for the PDSCH described in Chapter 7.1.6.4 of TS 36.213 V10.6.0 (hereinafter, referred to as "Non-Patent Document 20") by 3GPP. As shown in Table 6.7-1 of TS 36.211 V10.5.0 (hereinafter, referred to as "Non-Patent Document 21") by 3GPP, parameter values "1," "2," and "3" can be used for the downlink bandwidth of the SCell exceeding 10 resource blocks. As shown in Table 6.7-1 of Non-Patent Document 21, the parameter values "2," "3," and "4" can be used for the downlink bandwidth of the SCell not greater than 10 resource blocks.

In other words, the parameter value "1" denotes the starting OFDM symbol for the PDSCH, for the downlink bandwidth of the SCell exceeding 10 resource blocks, when the number of OFDM symbols for PDCCH is "1."

The parameter value "2" denotes the starting OFDM symbol for the PDSCH, for the downlink bandwidth of the SCell exceeding 10 resource blocks, when the number of OFDM symbols for PDCCH is "2." Alternatively, the parameter value "2" denotes the starting OFDM symbol for the PDSCH, for the downlink bandwidth of the SCell not greater than 10 resource blocks, when the number of OFDM symbols for PDCCH is "2."

The parameter value "3" denotes the starting OFDM symbol for the PDSCH, for the downlink bandwidth of the SCell exceeding 10 resource blocks, when the number of OFDM symbols for PDCCH is "3." Alternatively, the parameter value "3" denotes the starting OFDM symbol for the PDSCH, for the downlink bandwidth of the SCell not greater than 10 resource blocks, when the number of OFDM symbols for PDCCH is "3."

The parameter value "4" denotes the starting OFDM symbol for the PDSCH, for the downlink bandwidth of the SCell not greater than 10 resource blocks, when the number of OFDM symbols for PDCCH is "4."

3GPP is studying to reduce PDCCHs (see Non-Patent Document 15). As described above, however, in cross-carrier scheduling in which the scheduling of the PDSCH to be mapped to an SCell is notified the UE over the PDCCH of the Pcen, the number of starting OFDM symbols for the PDSCH cannot be specified in the case where the number of OFDM symbols for PDCCH is "0."

Therefore, the following problem occurs; the scheduling of the PDSCH to be mapped to an NCT is not enabled through signaling of the cross-carrier scheduling in which the scheduling of the PDSCH to be mapped to the SCell is notified the UE over the PDCCH of the PCell.

The solution in the fourth modification of the second embodiment will be disclosed below. The parameter indicating the starting OFDM symbol for the PDSCH in the case where the number of OFDM symbols of the PDCCH to be scheduled is "0" is added. Alternatively, the parameter indicating the starting OFDM symbol for the PDSCH, for the downlink bandwidth to be scheduled exceeding 10 resource blocks or for the downlink bandwidth not greater than 10 resource blocks, when the number of OFDM symbols of the PDCCH to be scheduled is "0" is added. As a specific example, "0" is added to the parameter value. The value "0" may indicate the starting OFDM symbol for the PDSCH when the number of OFDM symbols for PDCCH to be scheduled is "0."

The parameter values "0," "1," "2," and "3" can be used for the downlink bandwidth of the SCell exceeding 10 resource blocks, as shown in Table 6.7-1 of Non-Patent Document 21. Alternatively, the parameter values "0," "2," "3," and "4" can be used for the downlink bandwidth of the SCell not greater than 10 resource blocks, as shown in Table 6.7-1 of Non-Patent Document 21.

The fourth modification of the second embodiment can achieve the following effects. The scheduling of the PDSCH to be mapped to an NCT is enabled through signaling of the cross-carrier scheduling in which the scheduling of the PDSCH to be mapped to the SCell is notified the UE over the PDCCH of the PCell. This prevents the communication system from becoming complicated.

Third Embodiment

The problem to be solved in a third embodiment will be described. An object of the introduction of an NCT is to improve support for HetNet (see Non-Patent Document 11). An improved support for HetNet is inter-cell interference coordination (ICIC). Examples of the cause for an occurrence of inter-cell interference include the PDCCH and SS being downlink control signals from the base station in the traditional techniques. Therefore, reducing the PDCCHs being the downlink control signals in the NCT is proposed as a concrete measure taken for the improved support for HetNet (see Non-Patent Document 15). However, Non-Patent Documents 11 and 15 do not disclose, for example, the method of causing base stations to cooperate with each other.

It is proposed that a load information message is transferred between base stations as the method of causing base stations to cooperate with each other in inter-cell interference coordination (see Non-Patent Document 16).

In the case where the load information message contains a "UL Interference Overload Indication" parameter, the notification cell shows that it suffers from interference for every resource block and every physical resource block (PRB). The base station that has received this parameter takes that information into consideration. The base station that has received the "UL Interference Overload Indication" parameter may take that information into consideration in scheduling.

In the case where the load information message contains a "UL High Interference Indication" parameter, it is indicated that high interference occurs per PRB of the cell that notifies the parameter (hereinafter, also referred to as a "notification cell"). The base station that has received the parameter (hereinafter, also referred to as a "reception base station") should avoid scheduling the UE being served by the reception base station to a related PRB.

In the case where the load information message contains an "Invoke Indication IE" parameter, the base station that notifies the parameter (hereinafter, also referred to as a "notification base station") shows to what information the reception base station wants to be responded. The reception base station may take into consideration the request made by the "Invoke Indication IE" parameter.

In the case where "ABS Information" is set in "Invoke Indication IE," the notification base station shows, to the reception base station, a request for an almost blank subframe (ABS) configuration of the reception base station.

As described above, the present method of causing base stations to cooperate with each other for inter-cell interference coordination does not take an NCT into consideration. This embodiment therefore has an object to disclose the improved support for HetNet in which base stations cooperate with each other in consideration of an NCT.

In the third embodiment including a modification, an NCT is taken as a cell for convenience. This makes it easy to use the parameter system regarding the cell (served cell) configured by the base station, which is used in the existing X2 signaling between base stations.

The following two (1) and (2) will be disclosed as the solution in the third embodiment.

(1) The eNB1 with high downlink interference will not notify a neighbor cell of a request operation. The message indicating high downlink interference is newly provided. The cell identity of the cell with high downlink interference, which is configured by the eNB1, may be notified together. The cell with high downlink interference corresponds to a high-interference cell.

A "parameter indicating high downlink interference" may be added to a load information message. The parameter may be added as a new message in addition to the load information message. This prevents the communication system from becoming complicated because no new message needs to be added.

The following four (1-1) to (1-4) will be disclosed as the operation of the base station (hereinafter, referred to as "eNB2") that has received the message indicating high downlink interference.

(1-1) The PDSCH is scheduled and mapped to a cell having a carrier frequency different from the carrier frequency of the cell with high downlink interference configured by the eNB1. This reduces the PDSCHs of the cell having the same frequency carrier as that of the cell with high downlink interference of the eNB2, reducing interference.

(1-2) In the case where the eNB2 configures an NCT, the eNB2 may preferentially schedule and map a PDSCH to the NCT. The eNB2 may schedule and map a PDSCH to the NCT. In the case where the eNB2 configures an NCT, the eNB2 may schedule and map the PDSCH to the NCT having a carrier frequency different from the carrier frequency of the cell with high downlink interference configured by the eNB1. This reduces the PDSCHs of the cell having the same frequency carrier as that of the cell with high downlink interference of the eNB2, preventing interference.

(1-3) In addition to (1-2) above, the eNB2 may avoid cross-carrier scheduling of the NCT from the legacy carrier having the same frequency carrier as that of the cell with high downlink interference. This reduces the PDSCHs and PDCCHs of the cell having the same frequency carrier as that of the cell with high downlink interference of the eNB2, preventing interference.

(1-2) and (1-3) above may be operated independently, with similar effects.

(1-4) The eNB2 changes the legacy carrier having the same frequency carrier as that of the cell with high downlink interference to an NCT. The eNB2 changes the legacy carrier having the same frequency carrier as that of the cell with high downlink interference to an NCT and does not transmit downlink control signals such as PDCCH and SS.

The eNB2 may notify the eNB1 of a response indicating whether or not it has responded to the request. The eNB2 may notify the eNB1 of the performed operation together.

(2) The eNB1 with high downlink interference notifies neighbor cells of the request operation. The request operation may differ between the case where the neighbor cell includes an NCT and the neighbor cell includes no NCT. Alternatively, the request operation may differ between the case where the neighbor cell includes a configured NCT and the case where the neighbor cell includes no configured NCT. Still alternatively, the request operation may differ between the case where the neighbor cell includes an activated NCT and the case where the neighbor cell includes no activated NCT.

Specific examples of the method of judging whether or not neighbor cell includes an NCT include the following methods. The notification of the information on whether or not the own base station configures an NCT is newly provided between base stations. Alternatively, the notification of the information on whether or not the own base station configures an NCT for any UE may be newly provided. Still alternatively, the notification of the information on whether or not the own base station includes an "activated" NCT may be newly provided. The configuration of an NCT or the system information of an NCT may be notified together with the above-mentioned notification. A specific example of the configuration of an NCT will be described below. The notification of whether or not an NCT is configured for the existing X2 signaling may be added to the above-mentioned notification. This eliminates the need for adding new signaling to configure an NCT, preventing the communication system from becoming complicated.

Specific examples of the existing X2 signaling include "X2 SETUP Request," "X2 SETUP RESPONSE," and "ENB CONFIGURATION UPDATE" (for example, see Chapter 9.2.8 of Non-Patent Document 16). The information on an NCT may be added to "Served Cell Information" during signaling and the information on whether the carrier is a legacy carrier or an NCT may be added.

The inquiry of whether or not the base station configures an NCT, whether or not there is an NCT configured for any UE, or whether or not there is an activated NCT may be newly provided. The base station that has received the inquiry responds to this inquiry.

The following twelve (1) to (12) will be disclosed as specific examples of the configuration of an NCT notified between base stations. The detailed description of a parameter is similar to that of the second modification of the first embodiment, which will not be given here.

(1) A parameter for differentiating between a legacy carrier and an NCT. Notifying this parameter between base stations allows for the judgment on whether or not a neighbor cell configures an NCT. This enables improved support for HetNet in which base stations cooperate with each other in consideration of an NCT. Besides, inter-cell interference coordination in which base stations cooperate with each other in consideration of an NCT is enabled.

(2) A cell identity of an NCT.

(3) Information on with which carrier an NCT is associated, for example, the information on an associated legacy carrier. This parameter can be notified between base stations not only to provide improved support for HetNet in which base stations cooperate with each other in consideration of an NCT but alto to achieve the following effect. The measurement configuration or the like can be appropriately determined for a UE being served by the cell configured by the own base station.

(4) A carrier frequency of an NCT. This parameter can be notified between base stations not only to provide improved support for HetNet in which base stations cooperate with each other in consideration of an NCT but also to archive the following effect. The measurement configuration or the like can be appropriately determined for a UE being served by the cell configured by the own base station.

(5) A bandwidth of an NCT.

(6) A method of transmitting reference signals (RSs). This parameter can be notified between base stations not only to provide improved support for HetNet in which base stations cooperate with each other in consideration of an NCT but also to achieve the following effects. The measurement configuration or the like can be appropriately determined for a UE being served by the cell configured by the own base station. As a specific example, the transmission number of RSs of a measurement target NCT, the bandwidth at which a CRS is transmitted, or the like can be notified the UE as the measurement configuration. For example, how to take an average can be notified as the measurement configuration in accordance with the number of CRSs of a measurement target for the UE.

(7) An index of an NCT.

(8) Location information on the place in which an NCT point is installed. This parameter can be notified between base stations not only to provide improved support for HetNet in which base stations cooperate with each other in consideration of an NCT but also to achieve the following effects. The location information can be used to, for example, determine a handover destination. As a specific example, the cell that can use an NCT closer to the UE can be determined as a target cell. For example, an associated legacy carrier (parameter (3) above) of an NCT closer to the UE can be determined as a target cell. Using an NCT closer to the UE reduces the transmission power of uplink data of the UE, reducing the power consumption of the UE.

(9) Information indicating synchronization or non-synchronization. This parameter can be notified between base stations not only to provide improved support for HetNet in which base stations cooperate with each other in consideration of an NCT but also to archive the following effects. The information can be used to, for example, determine a handover destination. For example, if the UE is allowed not to support a non-synchronized NCT as the capability of the UE, the cell that can use the synchronized NCT as the target cell for the UE can be determined as a target cell. For example, the associated legacy carrier (parameter (3) above) for a synchronized NCT can be determined as a target cell.

(10) Information on uplink of an NCT. This parameter can be notified between base stations not only to provide improved support for HetNet in which base stations cooperate with each other in consideration of an NCT but also to achieve the following effect. The information can be used to, for example, determine a handover destination.

(11) Information on the TAG to which an NCT belongs. This parameter can be notified between base stations not only to provide improved support for HetNet in which base stations cooperate with each other in consideration of an NCT but also to archive the following effect. The information can be used to, for example, determine a handover destination.

(12) Combination of (1) to (11) above.

The following five (2-1) to (2-5) will be disclosed as specific examples of the operation in which the eNB1 with high downlink interference notifies a neighbor cell.

(2-1) In the case where the eNB2 has no NCT (in the case where the eNB2 does not configure an NCT), the eNB1 with high downlink interference requests to schedule and map the PDSCH to a cell of other carrier frequency. The "request to schedule and map the PDSCH to the cell of other carrier frequency" may be added to the "Invoke Indication IE" parameter of the load information message. No new signaling needs to be added, preventing the communication system from becoming complicated.

(2-2) In the case where the eNB2 has no configured NCT, the eNB1 with high downlink interference requests to configure an NCT. Alternatively, in the case where the eNB2 includes no activated. NCT, the eNB1 with high downlink interference may request to activate an NCT. The "request to configure an NCT" or the "request to activate an NCT" may be added to the "Invoke Indication IE" parameter of a load information message. This eliminates the need for adding new signaling, preventing the communication system from becoming complicated.

(2-3) In addition to the specific example (2) above or in the case where the eNB2 includes an NCT, the eNB1 with high downlink interference requests to schedule and map the PDSCH to an NCT. The "request to schedule and map the PDSCH to an NCT" may be added to the "Invoke Indication IE" parameter of the load information message. This eliminates the need for adding new signaling, preventing the communication system from becoming complicated.

(2-4) In addition to the specific example (2-3) above, in the case where the eNB2 includes an NCT, the eNB1 with high downlink interference may request not to perform cross-carrier scheduling of the NCT from the legacy carrier having the same frequency carrier as that of the cell with high downlink interference. The "request not to perform cross-carrier scheduling of the NCT from the legacy carrier having the same frequency carrier as that of the cell with high downlink interference" may be added to the "Invoke Indication IE" parameter of a load information message. This eliminates the need for adding new signaling, preventing the communication system from becoming complicated.

The specific example (2-2), the specific example (2-3), and the specific example (2-4) above may be independently operated, with similar effects.

(2-5) The eNB1 with high downlink interference requests the eNB2 to change the carrier having the same frequency carrier as that of the cell with high downlink interference to an NCT. The eNB1 requests to change the carrier having the same frequency carrier as that of the cell with downlink interference to an NCT and not to transmit downlink control signals such as PDCCH and SS. This specific example can be used in both the case where the eNB2 includes an NCT and the case where the eNB2 includes no NCT. The cell identity of the cell with high downlink interference configured by the eNB 1 may be notified together.

The eNB2 that has received the "request to schedule and map the PDSCH to the cell of other carrier frequency" schedules and maps the PDSCH to the cell of a carrier frequency different from the carrier frequency of the cell with high downlink interference configured by the eNB1. This reduces the PDSCHs of the cell having the same frequency carrier as that of the cell with high downlink interference of the eNB2, preventing interference.

The eNB2 that has received the "request to schedule and map the PDSCH to the NCT" schedules and maps the PDSCH to the NCT, The eNB2 schedules and maps the PDSCH to the NCT having a carrier frequency different from the carrier frequency of the cell with high downlink interference configured by the eNB1. This reduces PDSCHs of the cell having the same frequency carrier as that of the cell with high downlink interference of the eNB2, preventing interference.

The eNB2 that has received the "request not to perform cross-carrier scheduling of the NCT from the legacy carrier having the same frequency carrier as that of the cell with high downlink interference" may avoid cross-carrier scheduling of the NCT from the legacy carrier having the same frequency carrier as that of the cell with high downlink interference. This reduces PDSCHs and PDCCHs of the cell having the same frequency carrier as that of the cell with high downlink interference of the eNB2, preventing interference.

The eNB2 may notify the eNB1 of a response as to whether or not the eNB2 has responded to the request. The configuration (such as system information) of the configured NCT or the configuration (such as system information) of the activated NCT may be notified. The existing X2 signaling may be used in this notification. This eliminates the need for adding new signaling, preventing the communication system from becoming complicated. Specific examples of the existing X2 signaling include "ENB CONFIGURATION UPDATE" (see Non-Patent Document 16).

FIG. 31 shows an example sequence of the communication system in the solution (1) according to the third embodiment of the present invention.

In Step ST3001, the eNB1 whose downlink interference has become higher notifies the eNB2 being a neighbor cell that the downlink interference has become higher. As a result, the eNB1 issues a counter-interference request to request a measure against interference to the eNB2.

In Step ST3002, the eNB2 that has been notified that the downlink interference has become higher from the eNB1 in Step ST3001 judges whether or not to respond to the counter-interference request. In this judgment, the eNB2 may make determination in consideration of, for example, the status of the cell configured by the eNB2, the resource status, and the processing load. The eNB2 moves to Step ST3003 when judging to respond to the counter-interference request. The eNB2 moves to Step ST3008 when judging that it does not to respond to the counter-interference request or it cannot respond to the counter-interference request.

In Step ST3003, the eNB2 judges whether or not the own base station configures an NCT. The eNB2 moves to Step ST3004 when judging that the own base station configures an NCT. The eNB2 moves to Step ST3006 when judging that the own base station does not configure an NCT.

In Step ST3004, the eNB2 schedules and maps the PDSCH to the NCT that is configured by the eNB1 and has a carrier frequency different from the carrier frequency of the cell with high downlink interference.

In Step ST3005, the eNB2 prohibits cross-carrier scheduling of the NCT from the legacy carrier having the same frequency carrier as that of the cell with high downlink interference.

In Step ST3006, the eNB2 schedules and maps the PDSCH to the cell that is configured by the eNB1 and has a carrier frequency different from the carrier frequency of the cell with high downlink interference.

In Step ST3007, the eNB2 transmits, to the eNB1, "Ack" indicating that it has responded to the counter-interference request of the eNB1 and has taken a measure.

In Step ST3008, the eNB2 transmits, to the eNB1, "Nack" indicating that it has not responded to the counter-interference request of the eNB 1 and has taken no measure.

Figure 32:
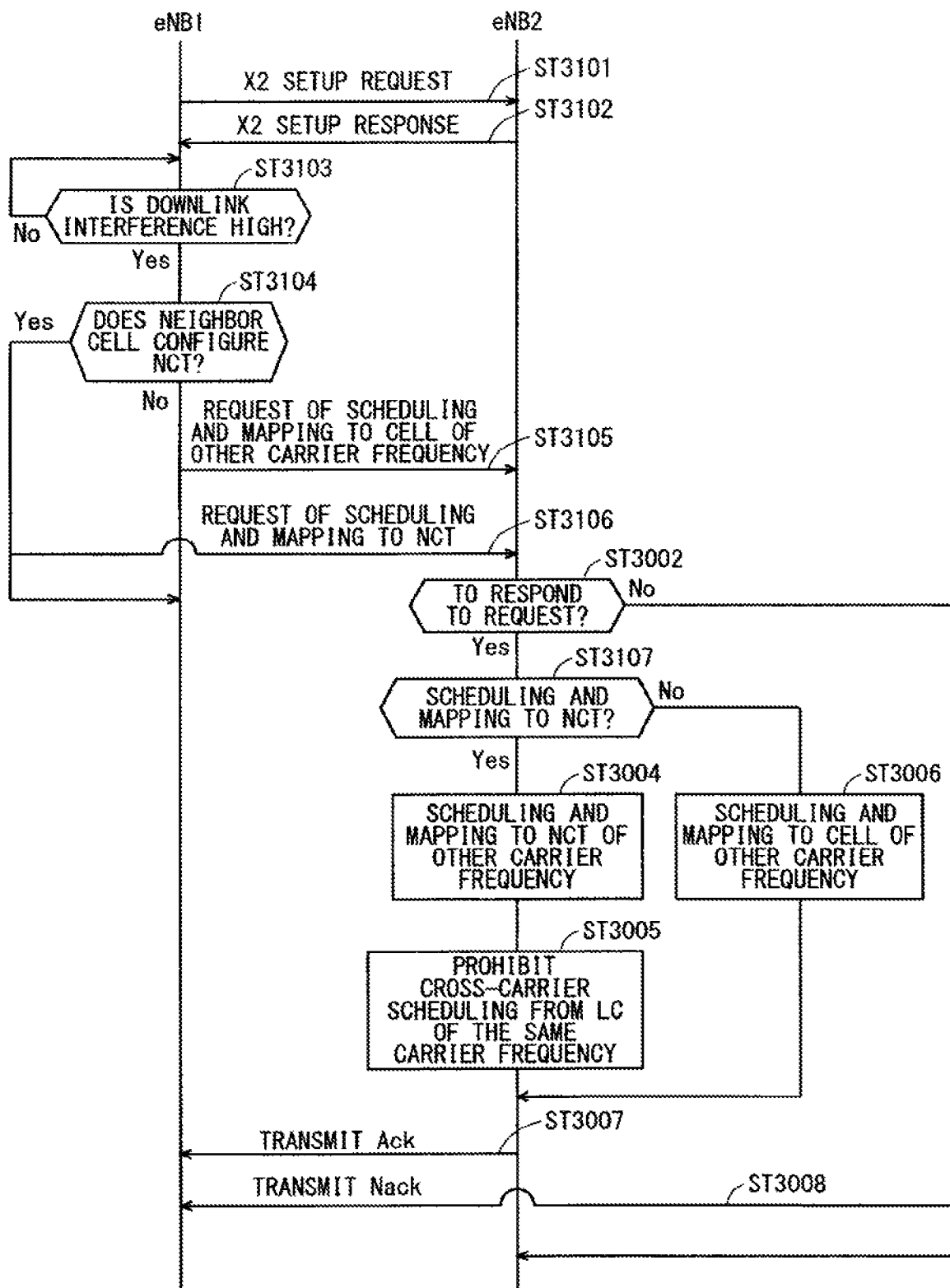
FIG. 32 shows an example sequence of a communication system in a solution (2) of the third embodiment of the present invention.

FIG. 32 shows an example sequence of the communication system in the solution (2) of the third embodiment of the present invention. The sequence shown in FIG. 32 is similar to the sequence shown in FIG. 31, and thus, the same steps will be denoted by the same step numbers and common description will be omitted.

In Step ST3101, the eNB1 notifies the eNB2 of the information on whether or not the eNB1 configures an NCT using an X2 setup request (X2 SETUP Request).

In Step ST3102, the eNB2 notifies the eNB1 of the information on whether or not the eNB2 configures an NCT using an X2 setup response (X2 SETUP Response).

In Step ST3103, the eNB1 judges whether or not the downlink interference of the own base station is high. Whether or not the downlink interference is high may be judged per cell configured by the eNB1. The eNB1 moves to Step ST3104 in the case when judging that the downlink interference is high. The eNB1 repeats the judgment of Step ST3103 when judging that the downlink interference is not high.

In Step ST3104, the eNB1 judges whether or not the eNB2 being a neighbor cell configures an NCT. The eNB1 may use the information received in Step ST3102 in this judgment. The eNB1 moves to Step ST3105 when judging that the neighbor cell does not configure an NCT. The eNB1 moves to Step ST3106 when judging that the neighbor cell configures an NCT.

In Step ST3105, the eNB1 notifies the eNB2 of the "request to schedule and map the PDSCH to the cell of other carrier frequency."

In Step ST3106, the eNB1 notifies the eNB2 of the "request to schedule and map the PDSCH to an NCT." As a result of this notification, the "request not to perform cross-carrier scheduling the NCT from the legacy carrier having the same frequency carrier as that of the cell with high downlink interference" may also be notified.

In Step ST3107, the eNB2 judges whether or not to have received the "request to schedule and map the PDSCH to the cell of other carrier frequency" or the "request to schedule and map the PDSCH to the NCT" from the eNB1. The eNB2 moves to Step S13006 when judging to have received the "request to schedule and map the PDSCH to the cell of other carrier frequency." The eNB2 moves to Step ST3004 when judging to have received the request to schedule and map the PDSCH to an NCT."

The third embodiment described above can achieve the following effects. The improved support for HetNet in which base stations cooperate with each other in consideration of an NCT can be enabled. In addition, inter-cell interference coordination in which base stations cooperate with each other in consideration of an NCT can be enabled.

First Modification of Third Embodiment

The problem to be solved in the first modification of the third embodiment will be described. The purposes of introducing an NCT include improved support for HetNet and improved frequency use efficiency (see Non-Patent Document 11). 3GPP has not discussed how to satisfy both the two purposes of introducing an NCT. The first modification of the third embodiment therefore aims to disclose the method of satisfying both the improved support for HetNet and the improved frequency use efficiency, which are the purposes of introducing an NCT.

The solution in the first modification of third embodiment will be disclosed below. The information on the number of OFDM symbols for PDCCH is notified between base stations. The information on the number of OFDM symbols for PDCCH per cell configured by the base station is notified. The PDSCH is not mapped in the case where the PDCCH of a neighbor cell is mapped, whereas the PDSCH is mapped in the case where the PDCCH of a neighbor cell is not mapped.

Reducing PDCCHs is studied particularly as to the NCT, as described above. Thus, the method of using the resources of the first to the fourth symbols in which the PDCCH is mapped in the legacy carrier has not been determined. In the case where the PDCCH of a neighbor cell is mapped, the effect of reducing interference with the neighbor cell can be achieved by avoiding mapping the PDSCH. In the case where the PDCCH of a neighbor cell is not mapped, the following effect is achieved by mapping the PDSCH; resources can be used effectively and frequency use efficiency can be improved.

Hereinafter, the base station with high downlink interference is referred to as "eNB1." A neighbor cell for the eNB1 is referred to as "eNB2." For example, in the case where the numbers of OFDM symbols for PDCCH from the neighbor base stations including the eNB1 are "1" and "2," the eNB2 does not schedule and map the PDSCH to the first and second symbols and starts scheduling and mapping the PDSCH starting from the third symbol.

A specific example of the notification of the information on the number of OFDM symbols for PDCCH between base stations will now be described.

The notification of the information on the number of OFDM symbols for PDCCH is newly provided between base stations. As a specific example, the numbers of OFDM symbols for PDCCH "0," "1," "2," and "3" for the downlink bandwidth exceeding 10 resource blocks will be notified. In addition, the numbers of OFDM symbols for PDCCH "0," "2," "3," and "4" for the downlink bandwidth not greater than 10 resource blocks are notified. The system information of an NCT may be notified together in this notification. A specific example of the system information of an NCT is similar to that of the second modification of the first embodiment, which will not be given here.

This notification may be performed by adding the number of OFDM symbols for PDCCH to the existing X2 signaling. In this case, it is not necessary to add new signaling for the number of OFDM symbols for PDCCH, preventing the communication system from becoming complicated. Specific examples of the existing X2 signaling include "X2 SETUP Request," "X2 SETUP RESPONSE," and "ENB CONFIGURATION UPDATE" (for example, see Chapter 9.2.8 of Non-Patent Document 16). The number of OFDM symbols for PDCCH may be added to "Served Cell Information" during signaling.

The following three (1) to (3) will be disclosed as the specific method of operating the eNB1 and the eNB2.

(1) The cell configured by the eNB2 that has received the number of OFDM symbols for PDCCH of the eNB1 prohibits scheduling and mapping of the PDSCH to the OFDM symbols. The cell of the same carrier frequency may prohibit scheduling and mapping of the PDSCH to the OFDM symbols.

The NCT configured by the eNB2 that has received the number of OFDM symbols for PDCCH of the eNB1 prohibits scheduling and mapping of the PDSCH to the OFDM symbols. The NCT of the same carrier frequency may prohibit scheduling and mapping of the PDSCH to the OFDM symbols.

The eNB2 receives the number of OFDM symbols for PDCCH from neighbor base stations including the eNB1 and allows scheduling and mapping of the PDSCH to the OFDM symbol being not used in the PDCCH.

The method (1) requires the eNB1 to notify the eNB2 of only the number of OFDM symbols for PDCCH, preventing the communication system from becoming complicated.

(2) In the case where the load information message contains the notification of the "parameter indicating high downlink interference" disclosed in the third embodiment, the cell configured by the eNB2 that has received the number of OFDM symbols for PDCCH of the eNB1 prohibits scheduling and mapping of the PDSCH to the OFDM symbols. The cell of the same carrier frequency may prohibit scheduling and mapping of the PDSCH to the OFDM symbols.

In the case where the load information message contains the notification of the "parameter indicating high downlink interference" disclosed in the third embodiment, the NCT configured by the eNB2 that has received the number of OFDM symbols for PDCCH of the eNB1 prohibits scheduling and mapping of the PDSCH to the OFDM symbols. The NCT of the same carrier frequency may prohibit scheduling and mapping of the PDSCH to the OFDM symbols.

Also in the case where the load information message contains the notification of the "parameter indicating high downlink interference" disclosed in the third embodiment, the eNB2 receives the number of OFDM symbols for PDCCH from neighbor base stations including the eNB1, and schedules and maps the PDSCH to the OFDM symbol being not used in the PDCCH.

In the case where the "parameter indicating high downlink interference" disclosed in the third embodiment is not notified, the eNB2 schedules and maps the PDSCH to the OFDM symbol that is not used for the PDCCH in the own cell.

In the case where the downlink interference of a neighbor cell is not high, the PDSCH can be scheduled and mapped to the OFDM symbol that is not used for the PDCCH in the own cell. This allows the resources to be used further effectively and improves frequency use efficiency compared with the method (1).

(3) The eNB1 with high downlink interference requests the eNB2 not to schedule and map the PDSCH to the area to which the own PDCCH is mapped. In the case where the eNB2 includes an NCT, the eNB1 with high downlink interference may request the eNB2 not to schedule and map the PDSCH to the area to which the own PDCCH is mapped. The "request not to schedule and map the PDSCH to the area to which the own PDCCH is mapped" may be added to the "Invoke Indication IE" parameter of the load information message. It is not necessary to add new signaling, preventing the communication system from becoming complicated. The eNB2 may notify the eNB1 of the response to whether or not the eNB2 has responded to the request.

The methods (2) and (3) above can be used in combination.

Figure 33:
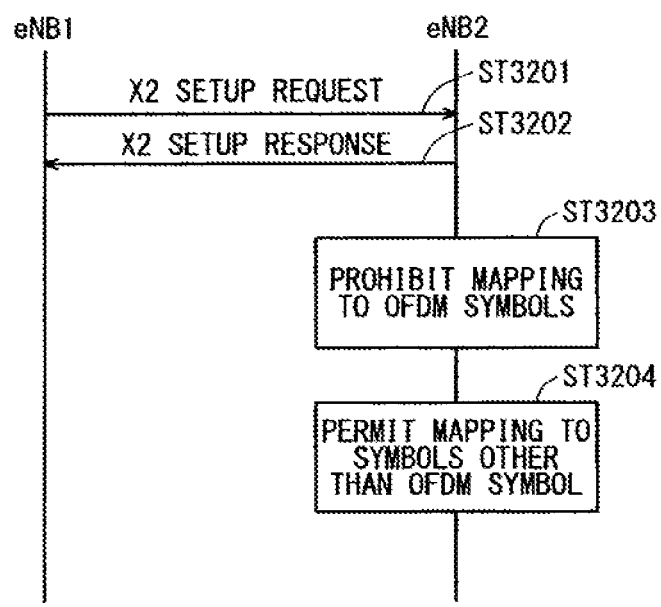
FIG. 33 shows an example sequence in a case where a specific method (1) of operating an eNB1 and an eNB2 is used in a communication system according to a first modification of the third embodiment of the present invention.

FIG. 33 shows an example sequence in the case where the specific method (1) of operating the eNB1 and the eNB2 is used in the communication system according to the first modification of the third embodiment of the present invention.

In Step ST3201, the eNB1 notifies the eNB2, using an X2 SETUP Request, of the information on the number of OFDM symbols for PDCCH of the eNB1.

In Step ST3202, the eNB2 notifies the eNB1, using an X2 SETUP Response, of the information on the number of OFDM symbols for PDCCH of the eNB2.

In Step ST3203, the eNB2 prohibits scheduling and mapping of the PDSCH to the OFDM symbols for PDCCH of the neighbor cells including the eNB1.

In Step ST3204, the eNB2 permits scheduling and mapping of the PDSCH to the symbols excluding the OFDM symbols for PDCCH of the neighbor cells including the eNB1.

The eNB1 performs the processes similar to those of Steps ST3203 and ST3204, which is not shown in FIG. 33.

Figure 34:
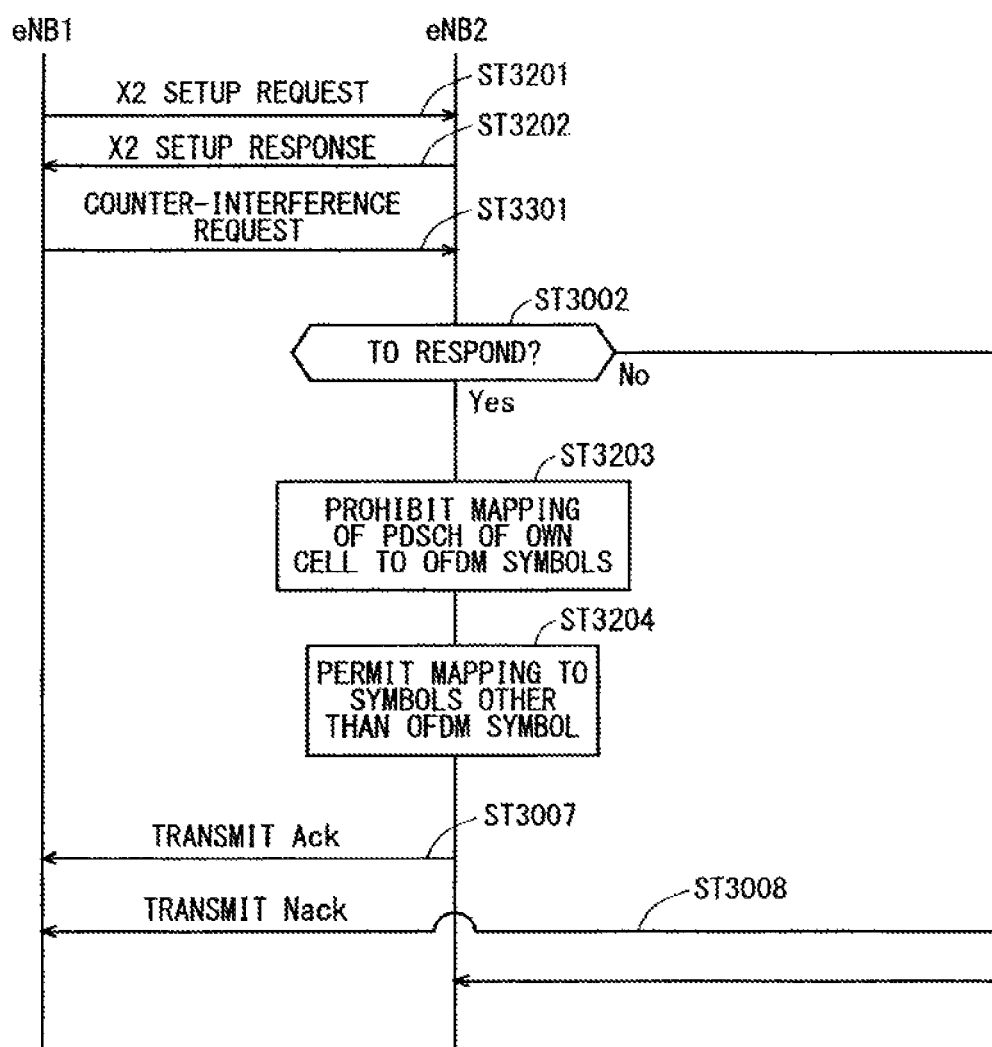
FIG. 34 shows an example sequence in a case where specific methods (2) and (3) of operating an eNB1 and an eNB2 are used in combination in the communication system according to the first modification of the third embodiment of the present invention.

FIG. 34 shows an example sequence in the case where the specific methods (2) and (3) of operating the eNB1 and the eNB2 are used in combination in the communication system according to the first modification of the third embodiment of the present invention. The sequence shown in FIG. 34 is similar to the sequences shown in FIGS. 31 and 33, and thus, the same steps will be denoted by the same step numbers and common description will be omitted.

In Step ST3301, the eNB1 whose downlink interference has become higher notifies the eNB2 being a neighbor cell that its downlink interference has become higher. Upon this, the eNB1 issues a counter-interference request to the eNB2. In this case, the eNB1 may also notify "the request not to schedule and map the PDSCH to the area to which the own PDCCH is mapped."

In Step ST3002, the eNB2 that has been notified from the eNB 1 that the downlink interference of the eNB1 has become higher in Step ST3301 judges whether or not to respond to the counter-interference request. This judgment may be made in consideration of, for example, the status of the cell configured by the eNB2, the resource status, and the processing load. When judging to respond to the counter-interference request, the eNB1 moves to Step ST3203. When judging that it will not or cannot respond to the counter-interference request, the eNB1 moves to Step ST3008.

The first modification of the third embodiment can achieve the following effects in addition to the effects of the third embodiment. Frequency use efficiency can be improved by performing inter-cell interference coordination in the case where the neighbor cell suffers from interference or by effectively using resources in the case where the neighbor cell is free from interference. This satisfies improved support for HetNet and improved frequency use efficiency, which are the objects of introducing an NCT.

Fourth Embodiment

The problem to be solved in a fourth embodiment will be described.

An object of introducing an NCT is to reduce the power consumption of a system (see Non-Patent Document 11). It is proposed to reduce CRSs in an NCT, as a specific measure for energy saving of a communication system (see Non-Patent Document 15). Non-Patent Documents 11 and 15 however do not disclose, for example, the method of causing base stations to cooperate with each other for energy saving of a communication system.

The method disclosed below is an example of the method of causing base stations to cooperate with each other for energy saving of a system. The "deactivation indication" parameter is exchanged between base stations in switching off a cell. This indicator is notified in a base station update message (ENB CONFIGURATION UPDATE).

The base station notifies a neighbor base station of a cell activation request message (CELL Activation Request) that requests to switch on the cell.

The method of causing base stations to cooperate with each other for energy saving of a communication system, described above, does not take an NCT into consideration. This embodiment thus aims to disclose the support for energy saving of a communication system in which base stations cooperate with each other in consideration of an NCT.

The fourth embodiment including modifications take an NCT as a cell for convenience. This allows for easy use of the parameter system regarding the cell (served cell) configured by the base station, which is used in the existing X2 signaling between base stations.

The solution in the fourth embodiment will be disclosed below. Whether the cell being a switching off target is a legacy carrier or an NCT is notified between base stations. The information on whether or not the cell is an NCT may be notified. Description will now be given of the case where a cell 1 configured by the eNB1 is switched off and the eNB2 is notified.

In the case where, for example, the resources for the cell configured by the eNB2 become insufficient or the processing load becomes high, the eNB2 considers switching on the cell of a neighbor base station.

In the consideration, the eNB2 judges whether it is suitable to switch on a legacy carrier or to switch on an NCT. This judgment may be made based on, for example, the policy for energy saving of a communication system of an operator. This policy may be notified the eNB from an operation administration and maintenance (OAM).

The eNB2 notifies that it will request to switch on an NCT or a legacy carrier in accordance with the judgment results.

The following two (1) and (2) will be disclosed as specific examples of the method of notifying whether the cell being a switching off target is a legacy carrier or an NCT between base stations.

(1) Notification of the information on whether or not an NCT is configured is newly provided between base stations. The configuration of an NCT or the system information of an NCT may be notified together in the above-mentioned notification. A specific example of the configuration of an NCT is similar to that of the third embodiment, which will not be described here. This notification may be made by adding the notification of whether or not an NCT is configured for the existing X2 signaling. It is not necessary to add new signaling for the configuration of an NCT, preventing the communication system from becoming complicated.

Specific examples of the existing X2 signaling include "X2 SETUP Request," "X2 SETUP RESPONSE," and "ENB CONFIGURATION UPDATE" (for example, see Chapter 9.2.8 of Non-Patent Document 16). The information on an NCT may be added to "Served Cell Information" during the signaling, thereby adding the information on whether the cell is a legacy carrier or an NCT. This allows the eNB2 to judge, for every cell configured by the eNB1, whether the cell is a legacy carrier or an NCT.

In switching off the cell configured by itself, the eNB1 notifies the eNB2 being a neighbor cell of switching off in a "Deactivation indication" parameter that is mapped to the "Served Cell Modify" parameter of "ENB CONFIGURATION UPDATE", as in the traditional technique.

The eNB2 can judge whether the cell that has been switched off is a legacy carrier or an NCT based on the information on whether or not the cell configures an NCT notified from the eNB1.

(2) The information on whether the cell being a switching off target is a legacy carrier or an NCT is newly provided to be notified, when switch-off is notified. In switching off the cell that is configured by itself, the eNB1 notifies the eNB2 being a neighbor cell of the switch-off in a "Deactivation indication" parameter to be mapped to the "Served Cell Modify" parameter of "ENB CONFIGURATION UPDATE." In this case, the information on whether the cell is a legacy carrier or an NCT is added. The information on whether or not the cell is an NCT may be added.

Signaling indicating simultaneous switching off of the NCTs among the cells configured by the eNB1 may be newly provided. In notifying the simultaneous switching off of the NCTs, "ENB CONFIGURATION UPDATE" to be notified by means of an X2 interface being the existing signaling may be used.

The following two (1) and (2) will be disclosed as specific examples of the method of requesting to switch on an NCT or a legacy carrier between base stations.

(1) The information on whether or not an NCT is configured is newly provided between base stations. The system information of an NCT may be notified together in the above-mentioned notification. A specific example is similar to the description disclosed in the method (1) of notifying whether the cell being a switching off target is a legacy carrier or an NCT between base stations, which will not be described here.

The eNB2 can judge, for every cell configured by the eNB1, whether the cell is a legacy carrier or an NCT. Thus, as in the traditional technique, switching on of a relevant cell is requested in the "CELL Activation Request" message in accordance with the judgment result on whether or not it is suitable to switch on a legacy carrier or to switch on an NCT.

(2) The information indicating the request to switch on a legacy carrier or to switch on an NCT is newly provided and notified in the notification that the cell is switched on. This notification may use "CELL Activation Request" that is notified by means of an X2 interface being the existing signaling.

The eNB1 may notify the eNB2 of a response as to whether or not the eNB1 has responded to the request. For example, in the case where the eNB2 notifies the eNB1 of the information indicating the request to switch on an NCT, the eNB1 notifies that it will not respond to the request if, for example, the eNB1 does not configure an NCT or there is no NCT being a switching off target. In the case where the eNB2 notifies the eNB1 of the information indicating the request to switch on an NCT, the eNB1 notifies that it has responded to the request if, for example, there is an NCT being a switching off target.

Alternatively, signaling notifying that NCTs are switched on simultaneously may be newly provided. "CELL Activation Request" to be notified by means of an X2 interface being the existing signaling may be used to notify that NCTs are switched on simultaneously.

The method of notifying that the cell being a switching off target is a legacy carrier or an NCT between base stations (hereinafter, also referred to as a "notification method") and the method of requesting to switch on an NCT or a legacy carrier between base stations (hereinafter, also referred to as a "request method") may be appropriately combined together. However, the specific example (1) of the notification method and the specific example (1) of the request method are similar to each other in that a notification of the information on whether or not an NCT is configured between base stations is newly provided, and accordingly, these examples are highly compatible with each other. The specific example (2) of the notification method and the specific example (2) of the request method are similar to each other in that a notification of the information on whether or not an NCT is configured between base stations is not newly provided, and accordingly, these examples are highly compatible with each other as a combination.

FIG. 35 shows an example sequence in the case where the specific example (I) of the notification method and the specific example (1) of the request method are used in combination in the communication system according to the fourth embodiment of the present invention. The sequence shown in FIG. 35 is similar to the sequence shown in FIG. 32, and thus, the same steps will be denoted by the same step numbers and common description will be omitted.

In Step ST3101, the eNB1 notifies the eNB2 of the information on whether or not the eNB1 configures an NCT in an X2 SETUP Request. For example, the eNB1 notifies that it configures a cell 1, a cell 2, and a cell 3 and that the cell 1 is an NCT and the cells 2 and 3 are legacy carriers.

In Step ST3102, the eNB2 notifies the eNB1 of the information on whether or not the eNB2 configures an NCT in an X2 SETUP Response.

In Step ST3401, the eNB1 notifies switching off the NCT, for example, switching off the cell 1.

In Step ST3402, the eNB2 recognizes that the cell 1 being an NCT configured by the eNB1 has been switched off using the information received in Step ST3101 and the information received in Step ST3401.

In Step ST3403, the eNB2 judges whether or not an event that requests a neighbor cell to be switched on has occurred. As a specific example, the eNB2 judges whether or not the resources thereof have become insufficient. When judging that the resources have become insufficient, the eNB2 moves to Step ST3404. When judging that the resources have not become insufficient, the eNB2 repeats the judgment of Step ST3403.

In Step ST3404, the eNB2 check the policy on energy saving (ES) of the operator system. This policy is notified the eNB2 from an OAM or the like. For example, it is set in the ES-related operator policy that an NCT is preferentially switched on.

In Step ST3405, the eNB2 judges whether or not there is an NCT being switched off in its neighborhood. The eNB2 moves to Step ST3406 when judging that there is such an NCT or moves to Step ST3408 when judging there is no such an NCT.

In Step ST3406, the eNB2 selects an NCT to be switched on from the NCTs being switched off in its neighborhood. Also in this case, the eNB2 may make judgment based on the ES-related operator policy. For example, the eNB2 selects to switch on the cell 1 being an NCT configured by the eNB1.

In Step ST3407, the eNB2 instructs the eNB1 to switch on an NCT, for example, switch on the cell 1.

In Step ST3408, the eNB2 selects a legacy carrier to be switched on from the legacy carriers being switched off in its neighborhood. Also in this case, the eNB2 may make judgment based on the ES-related operator policy.

In Step ST3409, the eNB2 instructs the base station configuring the legacy carrier selected in Step ST3408 to switch on the legacy carrier.

FIG. 36 shows an example sequence in the case where the specific example (2) of the notification method and the specific example (2) of the request method are used in combination in the communication system according to the fourth embodiment of the present invention. The sequence shown in FIG. 36 is similar to the sequence shown in FIG. 32, and thus, the same steps will be denoted by the same step numbers and common description will be omitted.

In Step ST3501, the eNB1 notifies switching off the NCT, for example, switching off the cell 1. At that time, the eNB1 also notifies that the cell 1 is an NCT. That is, the eNB1 may notify switching off the cell 1 being an NCT.

In Step ST3502, the eNB2 selects a base station to be notified of switch-on from the base stations including cells being switched off. Also in this case, the eNB2 may make judgment based on the ES-related operator policy. For example, the eNB2 selects to switch on the eNB1.

In Step ST3503, the eNB2 instructs the eNB1 to switch on an NCT, specifically, to switch on the cell 1, among the cells configured by the eNB1.

The eNB1 that has received the instruction to switch on an NCT in Step ST3503 switches on the cell 1 being an NCT and, in Step ST3504, notifies the eNB2 "Ack" indicating that the eNB1 has responded to the request.

In Step ST3505, the eNB2 judges whether or not to have received "Ack" as a response signal from the eNB1. The eNB2 ends the process when judging to have received "Ack" or moves to Step ST3506 when judging to not have received "Ack."

In Step ST3506, the eNB2 selects a base station to be notified of switch-on from the base stations including cells being switched off. In this case, the eNB2 may select a base station from the base stations excluding the eNB2.

The fourth embodiment described above can achieve the following effect. Energy saving of the system is enabled, in which base stations cooperate with each other in consideration of an NCT.

First Modification of Fourth Embodiment

The first modification of the fourth embodiment will disclose another solution to the same problem as that of the fourth embodiment described above.

The solution in the first modification of the fourth embodiment will be disclosed below. Description will be given of the case where the eNB2 notifies the eNB 1 of switch-on.

In the case where the resources of the cell configured by the eNB2 become insufficient or the processing load becomes high, the eNB2 considers switching on a cell of the neighbor base station.

In the consideration, the eNB2 judges whether it is suitable to switch on a legacy carrier or to switch on an NCT. This judgment may be made based on the policy on energy saving of the communication system of the operator. This policy may be notified the eNB from, for example, an OAM.

The eNB2 inquires about whether the cell being switched off, which is configured by the neighbor base station, is an NCT or a legacy carrier being switched off. The eNB2 may inquire about whether or not there is an NCT being switched off.

"Resource Status Request" (see Chapter 8.3.6.2 of Non-Patent Document 16) notified by means of an X2 interface being the existing signaling may be used in this inquiry. In this case, an indicator for inquiring about "whether or not there is an NCT being switched off" may be provided in the existing signaling. This eliminates the need for adding new signaling, allowing for easy construction of a communication system. In addition, a communication system having excellent backward compatibility can be constructed.

"Resource Status Response" (see Chapter 8.3.6.2 of Non-Patent Document 16) notified by means of an X2 interface being the existing signaling may be used in the response to the inquiry. In this case, an indicator indicating "whether or not there is an NCT being switched off" may be provided in the existing signaling. This eliminates the need for adding new signaling, allowing for easy construction of a communication system. In addition, a communication system having excellent backward compatibility can be constructed. In the notification of a response to the inquiry, a cell identity may be notified together. This enables a cell to be specified and switched on.

The eNB2 determines a base station that is notified of switch-on in accordance with the policy on energy saving of a communication system of the operator and a response to the request. For example, in the policy on energy saving of a communication system of the operator, t is set that an NCT is preferentially switched on. In that case, in a response to the inquiry, the eNB2 instructs the base station that has responded that "there is an NCT being switched off" to switch on an NCT.

FIG. 37 shows an example sequence of the communication system in the solution according to the first modification of the fourth embodiment of the present invention. The sequence shown in FIG. 37 is similar to the sequence shown in FIG. 35, and thus, the same steps will be denoted by the same step numbers and common description will be omitted.

In Step ST3601, the eNB2 inquiries neighbor base stations including the eNB1 of whether or not there is an NCT being switched off.

In Step ST3602, the eNB1 notifies the eNB2 of a response to the inquiry. The eNB1 responds "that there is an NCT being switched off" or "that there is the cell 1 as an NCT being switched off."

In Step ST3603, the eNB2 selects a base station to be notified of switch-on, in consideration of the ES-related operator policy and the response in Step ST3602. For example, the eNB2 selects the eNB1 as a base station to be notified of switch-on.

In Step ST3604, the eNB2 instructs the eNB 1 to switch on the cell 1 that is an NCT being switched off.

The first modification of the fourth embodiment above can achieve effects similar to those of the fourth embodiment.

Second Modification of Fourth Embodiment

The second modification of the fourth embodiment will disclose another solution to the same problem as that of the fourth embodiment described above.

The solution in the second modification of the fourth embodiment will be disclosed below. The base station may change the legacy carrier to an NCT for energy saving. This allows for energy saving of a communication system through, for example, a reduction of CRSs.

If the resources become insufficient or the processing load becomes high, the base station may change an NCT to a legacy carrier. This increases legacy carriers that can serve as a serving cell for a UE being served thereby, reducing the processing load of the base station.

When switch is made between a legacy carrier and an NCT, the information on whether or not the relevant NCT configures an NCT of the own base station, the configuration of an NCT, or the system information of an NCT will change. This information may be notified between base stations. A notification as to whether or not an NCT is configured for the existing X2 signaling may be added to the above-mentioned notification. This eliminates the need for adding new signaling to configure an NCT, preventing a communication system from becoming complicated. Specific examples of the existing X2 signaling include "ENB CONFIGURATION UPDATE" (for example, see Chapter 9.2.8 of Non-Patent Document 16).

The second modification of the fourth embodiment above can achieve the following effect. Energy saving of a system that takes an NCT into consideration is enabled.

The embodiments and the modifications thereof are merely illustrations of the present invention, and the embodiments and the modifications thereof can be combined freely within the scope of the present invention. The elements of the embodiments and the modifications thereof can be modified or omitted as required. Therefore, the communication systems of Release 11 and the following releases in which legacy carriers and NCTs coexist can be operated normally and efficiently.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1401 NCT point; 1402, 1504 HARQ-MAC; 1403, 1505 PHY; 1501 existing cell; 1502 RRC; 1503 MAC.

The invention claimed is:
1. A mobile communication system, comprising:
a source base station configured to notify, to a target base station, a transmission configuration for a reference signal in response to the target base station taking over communication with a user equipment from the source base station,
wherein the transmission configuration for the reference signal is used by the target base station to transmit, to the user equipment, the reference signal to be measured by the user equipment.
2. The mobile communication system according to claim 1, wherein the transmission configuration is a configuration related to a frequency of performing transmission of the reference signal.
3. The mobile communication system according to claim 2, wherein the transmission configuration is a configuration in which the frequency of performing transmission of the reference signal is less frequently than normal.

4. The mobile communication system according to claim 1, wherein the source base station notifies the target base station of the presence or absence of the transmission configuration.

5. The mobile communication system according to claim 1, wherein the source base station notifies the target base station of a frequency of a carrier for transmitting the reference signal to the user equipment.

6. The mobile communication system according to claim 1, wherein the source base station requests the target base station to take over communication with the user equipment from the source base station.

7. A source base station, comprising:
circuitry configured to notify, to a target base station, a transmission configuration for a reference signal in response to the target base station taking over communication with a user equipment from the source base station,
wherein the transmission configuration for the reference signal is used by the target base station to transmit, to the user equipment, the reference signal to be measured by the user equipment.

8. A target base station, comprising:
circuitry configured to receive a transmission configuration for a reference signal from a source base station in response to the target base station taking over communication with a user equipment from the source base station,
wherein the transmission configuration for the reference signal is used by the target base station to transmit, to the user equipment, the reference signal to be measured by the user equipment.

9. A user equipment, comprising:
circuitry configured to
receive and measure a reference signal transmitted from a target base station according to a transmission configuration for the reference signal,
wherein the target base station receives the transmission configuration for the reference signal from a source base station in response to the target base station taking over communication with the user equipment from the source base station.

* * * * *